(12) United States Patent
Robbins et al.

(10) Patent No.: US 10,750,761 B2
(45) Date of Patent: Aug. 25, 2020

(54) COLORANT COMPOSITIONS AND METHODS OF USE THEREOF

(71) Applicants: MARS, INCORPORATED, McLean, VA (US); The Ohio State Innovation Foundation, Columbus, OH (US)

(72) Inventors: Rebecca J. Robbins, Hackettstown, NJ (US); Thomas M. Collins, Hackettstown, NJ (US); Maria Monica Giusti, Dublin, OH (US); Gregory Sigurdson, Columbus, OH (US)

(73) Assignee: MARS, INCORPORATED, McLean, VA (US)

( * ) Notice: Subject to any disclaimer, the term of this patent is extended or adjusted under 35 U.S.C. 154(b) by 143 days.

(21) Appl. No.: 15/199,790

(22) Filed: Jun. 30, 2016

(65) Prior Publication Data

US 2017/0000169 A1 Jan. 5, 2017

Related U.S. Application Data

(60) Provisional application No. 62/187,090, filed on Jun. 30, 2015, provisional application No. 62/279,262, filed on Jan. 15, 2016.

(51) Int. Cl.
*A23G 3/48* (2006.01)
*C09B 61/00* (2006.01)
*A23L 5/43* (2016.01)

(52) U.S. Cl.
CPC ............... *A23G 3/48* (2013.01); *A23L 5/43* (2016.08); *C09B 61/00* (2013.01); *A23V 2002/00* (2013.01); *A23V 2200/04* (2013.01)

(58) Field of Classification Search
CPC .. A23G 3/48; A23L 5/43; C09B 61/00; A23V 2002/00; A23V 220/04
(Continued)

(56) References Cited

U.S. PATENT DOCUMENTS 3,361,631 A 1/1968 Weinstein
3,456,050 A 7/1969 Rieckmann et al.
(Continued)

FOREIGN PATENT DOCUMENTS

EP 1 279 703 A1 1/2003
EP 2 545 787 A1 1/2013
(Continued)

OTHER PUBLICATIONS

M. Buchweitz et al.; Application of ferric anthocyanin chelates as natural blue food colorants in polysaccharide and gelatin based gels; Food Research International; 51 (2013) 274-282. (Year: 2013).*
(Continued)

*Primary Examiner* — Jyoti Chawla

(57) ABSTRACT

Natural blue colorant compositions and methods of use thereof are provided. The colorant compositions include at least one acylated anthocyanin, such as a diacylated anthocyanin. The colorant composition can further include a buffer solution having a pH from about 6.0 to about 8.0 and a metal ion or salt form thereof. The colorant compositions can be derived from a natural product and provide a stable, blue colorant that can be used in food products.

29 Claims, 42 Drawing Sheets
(3 of 42 Drawing Sheet(s) Filed in Color)

(58) Field of Classification Search
USPC .......................................................... 426/89
See application file for complete search history.

(56) References Cited

U.S. PATENT DOCUMENTS

| | | | |
|---|---|---|---|
| 3,480,468 | A | 11/1969 | Carletti et al. |
| 4,172,902 | A | 10/1979 | Asen et al. |
| 4,640,218 | A | 2/1987 | Motoyama et al. |
| 4,681,766 | A | 7/1987 | Huzinec et al. |
| 4,878,921 | A | 11/1989 | Koga et al. |
| 6,541,048 | B2 | 4/2003 | Zyck et al. |
| 6,572,900 | B1 | 6/2003 | Zyck et al. |
| 6,572,906 | B1 | 6/2003 | Higashimura et al. |
| 6,881,430 | B2 | 4/2005 | Kohler et al. |
| 6,939,572 | B2 | 9/2005 | Nguyen |
| 6,994,889 | B2 | 2/2006 | Satomi et al. |
| 7,144,593 | B2 | 12/2006 | Yukawa et al. |
| 7,192,456 | B2 | 3/2007 | Ichi et al. |
| 7,229,490 | B2 | 6/2007 | Isager et al. |
| 7,261,769 | B2 | 8/2007 | Bhaskaran et al. |
| 7,279,189 | B2 | 10/2007 | Lauro |
| 7,338,791 | B2 | 3/2008 | Koffas et al. |
| 7,378,118 | B2 | 5/2008 | Song et al. |
| 8,053,634 | B2 | 11/2011 | Tanaka et al. |
| 8,361,167 | B2 | 1/2013 | Blackburn et al. |
| 8,425,960 | B2 | 4/2013 | Inisan et al. |
| 8,557,319 | B2 | 10/2013 | Wu et al. |
| 8,575,334 | B2 | 11/2013 | Giusti et al. |
| 8,642,340 | B2 | 2/2014 | Matthews et al. |
| 8,765,180 | B2 | 7/2014 | Kochler et al. |
| 8,962,327 | B2 | 2/2015 | Yoon et al. |
| 2004/0022904 | A1 | 2/2004 | Nguyen |
| 2004/0105919 | A1 | 3/2004 | Chisholm |
| 2005/0208189 | A1 | 9/2005 | Kurschner et al. |
| 2008/0160084 | A1 | 7/2008 | Hyunh et al. |
| 2009/0298952 | A1 | 12/2009 | Brimmer et al. |
| 2011/0129584 | A1 | 6/2011 | Myers et al. |
| 2012/0034658 | A1 | 2/2012 | Yoon et al. |
| 2013/0165531 | A1 | 6/2013 | Shi et al. |
| 2013/0184359 | A1 | 7/2013 | Nafisl-Movaghar |
| 2013/0202703 | A1 | 8/2013 | Sadano |
| 2013/0216665 | A1 | 8/2013 | Mason et al. |
| 2013/0281548 | A1* | 10/2013 | Jin .......................... A61K 8/73 514/777 |
| 2014/0161938 | A1 | 6/2014 | Braga et al. |

FOREIGN PATENT DOCUMENTS

| | | |
|---|---|---|
| JP | H07-188572 A | 7/1995 |
| JP | 2010-522794 A | 7/2010 |
| RU | 2202575 C1 | 4/2003 |
| RU | 2302423 C2 | 7/2007 |
| RU | 2010/147323 A | 6/2012 |
| WO | WO 95/07622 A1 | 3/1995 |
| WO | WO 2003/064538 A1 | 8/2003 |
| WO | WO 2004/012526 A2 | 2/2004 |
| WO | WO 2005/007088 A2 | 1/2005 |
| WO | WO 2008/111589 A1 | 9/2008 |
| WO | WO 2009/071148 A1 | 6/2009 |
| WO | WO 2009/100165 A2 | 8/2009 |
| WO | WO 2010/114568 A1 | 10/2010 |
| WO | WO 2010/131049 A2 | 11/2010 |
| WO | WO 2012/043173 A1 | 4/2012 |
| WO | WO 2012/172429 A2 | 12/2012 |
| WO | WO 2013/106179 A1 | 7/2013 |
| WO | WO 2014/023712 A1 | 2/2014 |
| WO | WO 2014/150230 A1 | 9/2014 |
| WO | WO 2014/152417 A2 | 9/2014 |
| WO | WO 2014/152478 A2 | 9/2014 |

OTHER PUBLICATIONS

Application of ferric anthocyanin (Year: 2011).*
U.S. Appl. No. 14/773,103, Feb. 7, 2017 Issue Fee Payment.
U.S. Appl. No. 14/773,103 (US 2016/0017150), filed Sep. 4, 2015 (Jan. 21, 2016).
U.S. Appl. No. 14/773,111 (US 2016/0015067), filed Sep. 4, 2015 (Jan. 21, 2016).
U.S. Appl. No. 14/773,103, Aug. 11, 2016 Final Office Action.
U.S. Appl. No. 14/773,103, Jun. 7, 2016 Response to Non-Final Office Action.
U.S. Appl. No. 14/773,103, Mar. 7, 2016 Non-Final Office Action.
McCallum, et al., "Improved High Performance Liquid Chromatographic Separation of Anthocyanin Compounds from Grapes using a Novel Mixed-Mode Ion-Exchange Reversed-Phase Column," J. Chromatography A., 1148:38-45 (2007).
U.S. Appl. No. 14/773,103, Nov. 7, 2016 Notice of Allowance.
U.S. Appl. No. 14/773,103, Oct. 7, 2016 Response after Final Office Action.
Anonymous: "Blaukraut, Rotkraut und Rotkohl-3 Namen für ein Gemüse," Farben und Leben Online, Mar. 10, 2010, Retrieved from the Internet: URL:http://web.archive.org/web/20100310100941/http://www.farbenundleben.de/kultur/blaukraut.htm [retrieved on Sep. 5, 2016] p. 2. (with English translation retrieved on Oct. 19, 2016).
International Search Report and Written Opinion dated Sep. 14, 2016 in International Application No. PCT/US2016/040563.
Sigurdson et al., "Evaluating the role of metal ions in the bathochromic and hyperchromic responses of cyanidin derivatives in acidic and alkaline pH," Food Chemistry 208:26-34 (Mar. 29, 2016).

* cited by examiner

COLORANT COMPOSITIONS AND METHODS OF USE THEREOF

CROSS-REFERENCE TO RELATED APPLICATIONS

This application claims priority to U.S. Provisional Application No. 62/187,090, filed Jun. 30, 2015, and U.S. Provisional Application No. 62/279,262, filed Jan. 15, 2016, which are incorporated by reference herein in their entireties.

FIELD

The present disclosure relates to natural blue colorant compositions that comprise one or more acylated anthocyanin, and methods of use thereof. The colorant compositions of the present disclosure can comprise a diacylated anthocyanin and/or a pH buffer and/or a metal ion, and can be used to produce various edible products including hard coated confectionery products.

BACKGROUND

The use and demand of alternatives for synthetic food colorants has been increasing due to possible health concerns and consumer demand. However, natural food colorants have not been able to achieve the same color characteristics as their synthetic counterparts, for example, FD&C Blue No. 1. The lack of a suitable natural blue colorant has also made the development of a desirable natural green hue, from a combination of natural blue and yellow colorants, difficult.

Anthocyanins are known as natural food colorants responsible for reds and blues of fruits and vegetables. It is known in the art that anthocyanin-containing juices and extracts generally exhibit red hues at low pH and the hue shifts towards purple as pH increases. International Patent Publication No. WO 2014/152417 discloses the isolation of fractions of anthocyanin molecules from vegetable and fruit extracts, including red cabbage, at select pHs to provide different color characteristics than those provided by the source vegetable or fruit.

As a class, anthocyanins encompass a large number of structurally diverse compounds based on differences in primary structure, glycosylation and acylation patterns. Anthocyanins comprise an anthocyanidin esterified to one or more sugar molecules. Examples of sugar molecules found in anthocyanin structures are arabinose, galactose, glucose, rhamnose, rutinose, sambubiose, sophorose and xylose. An anthocyanin may be substituted with hydrogen, hydroxyl, and/or methoxyl groups at various positions. Anthocyanins can also be acylated, where they may have one or more molecules esterified to the sugar molecules at the 2-, 3-, 4- and/or 6-position of a monosaccharide.

The currently available blue colorant compositions that are produced from natural sources have not been satisfactory for use in food products. For example, natural blue colorant compositions have been shown to be unstable and undergo color shifts when incorporated into a food product. Therefore, there remains a need for a natural blue anthocyanin colorant composition that provides the similar color characteristics and stability as a synthetic counterpart, such as FD&C Blue No. 1.

SUMMARY OF THE INVENTION

The present disclosure relates to colorant compositions, e.g., blue colorant compositions, comprising acylated anthocyanins, and methods of generating and using such compositions. Specifically, the present disclosure is directed to natural colorant compositions e.g., natural blue colorant compositions, comprising at least one acylated anthocyanin, e.g., at least one diacylated anthocyanin. The present disclosure further provides methods of generating food products containing the natural colorant compositions.

In certain embodiments, a natural blue colorant composition is provided, including a fraction of a natural juice or extract comprising at least one acylated anthocyanin, a buffer solution having a pH of from about 6.0 to about 8.0, and a metal ion or salt thereof.

In certain embodiments, the acylated anthocyanin can comprise at least one diacylated anthocyanin. In certain embodiments, the diacylated anthocyanin can be one or more of

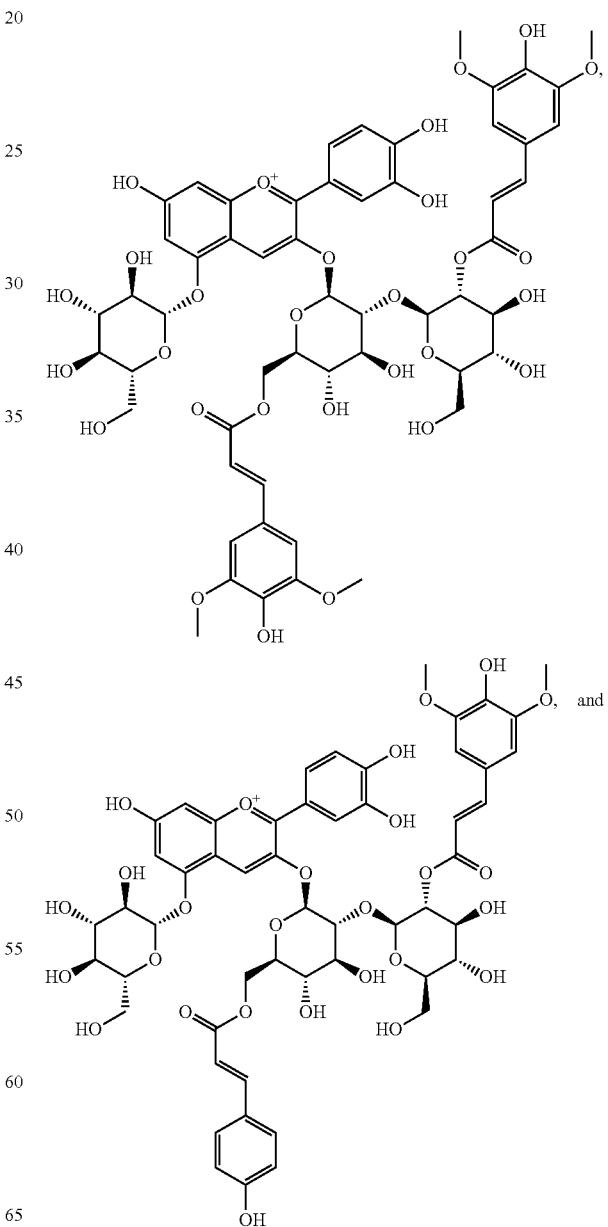

-continued

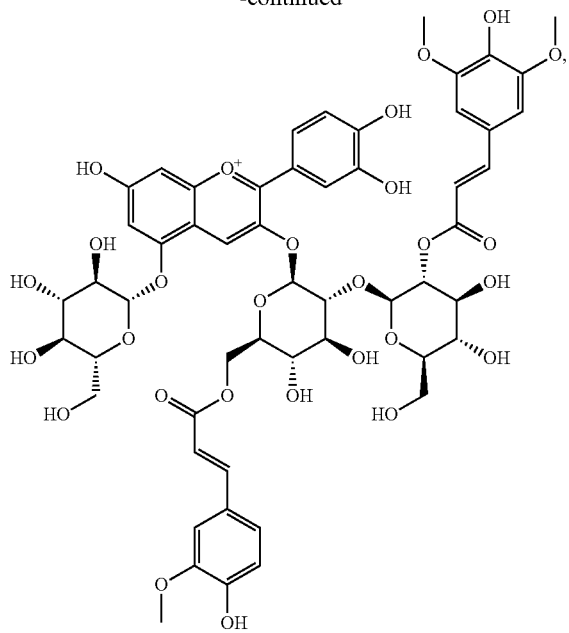

and salt forms thereof, and combinations thereof.

In certain embodiments, the metal ion can be a trivalent metal ion. The trivalent metal ion can be selected from the group consisting of a $Fe^{3+}$, $Al^{3+}$, $Ga^{3+}$, and combinations thereof. In certain embodiments, the trivalent metal ion can be $Fe^{3+}$, $Al^{3+}$, or a combination thereof. In certain embodiments, the buffer solution has a pH of from about 7.0 to about 8.0.

In certain embodiments, the concentration of the acylated anthocyanin can be from about 1 μM to about 200 μM. In certain embodiments, the metal ion or salt thereof can have a concentration of less than about 10 times, or from about 0.25 to about 0.5 times the concentration of the acylated anthocyanin. In certain embodiments, the metal ion or salt thereof can have a concentration that is less than or equal to the concentration of the acylated anthocyanin.

In certain embodiments, the buffer solution includes a buffer selected from the group consisting of potassium phosphate, tris(hydroxymethyl)-aminomethane, sodium hydroxide, and combinations thereof.

As embodied herein, the natural blue colorant composition can provide a color having a ΔE value of about 12 or less when compared to a color defined by L*a*b* values of 50 ppm and 100 ppm FD&C Blue No. 1 in an aqueous solution. In certain embodiments, the ΔE value can be about 11 or less. The natural blue colorant composition can exhibit color stability for greater than about 14 days.

In certain embodiments, the fraction is obtained from a natural product, or an extract or juice thereof, selected from the group consisting of red cabbage, purple sweet potato, red potato, blue potato, red radish, black carrot, purple carrot, purple corn, red corn, red onion, purple broccoli, red broccoli, purple cauliflower, rhubarb, black bean, red leaf lettuce, black rice, eggplant, strawberry, raspberry, cranberry, lingonberry, red grape, apple, black currant, red currant, cherry, blueberry, elderberry, bilberry, crowberry, blackberry, chokeberry, gooseberry, acai, nectarine, peach, plum, blood orange, blue tomato, "Heavenly Blue" Morning Glory flower petal, "Better Times" Rose flower petal, and combinations thereof. In particular embodiments, the fraction is obtained from red cabbage.

The present disclosure further provides a green colorant composition. The green colorant composition can include a natural blue colorant composition and one or more yellow colorants. The one or more yellow colorants can be natural yellow colorants.

The present disclosure further provides a food product comprising a natural blue colorant composition. In certain embodiments, the food product can be a confectionary product. The confectionary product can further include a yellow colorant. In certain embodiments, the natural blue colorant composition can be present in a coating applied to a surface of the confectionary product.

In certain embodiments, a natural blue colorant can include a fraction of a natural juice or extract including at least one diacylated anthocyanin selected from the group shown above, and salt forms thereof, and combinations thereof, where the diacylated anthocyanin has a concentration of from about 1 μM to about 200 μM. The natural blue colorant can further include a buffer solution, where the buffer solution has a pH of from about 7.0 to about 8.0, and a metal ion comprising $Fe^{3+}$ or a salt form thereof, where the metal ion has a concentration of from about 0.25 to about 0.5 times the concentration of the diacylated anthocyanin.

In certain embodiments, a natural blue colorant can include a fraction of a natural juice or extract including at least one diacylated anthocyanin selected from the group shown above, and salt forms thereof, and combinations thereof, where the diacylated anthocyanin has a concentration of from about 1 μM to about 200 μM. The natural blue colorant can further include a buffer solution, where the buffer solution has a pH of from about 7.0 to about 8.0, and a metal ion comprising $Al^{3+}$ or a salt form thereof, where the metal ion has a concentration of less than or equal to the concentration of the diacylated anthocyanin.

The presently disclosed subject matter further includes methods of preparing a natural blue colorant composition. For example, a method of preparing a natural blue colorant composition can include obtaining a fraction of a natural juice or extract comprising at least one acylated anthocyanin from a natural product, diluting the acylated anthocyanin in a buffer solution having a pH of from about 6.0 to about 8.0, and admixing a metal ion or salt thereof in the buffer solution.

In certain embodiments, the acylated anthocyanin can comprise at least one diacylated anthocyanin. In certain embodiments, the diacylated anthocyanin can be one or more of

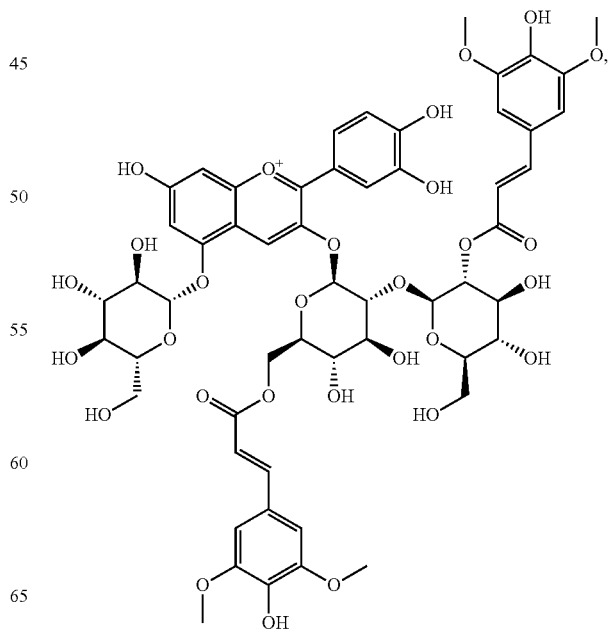

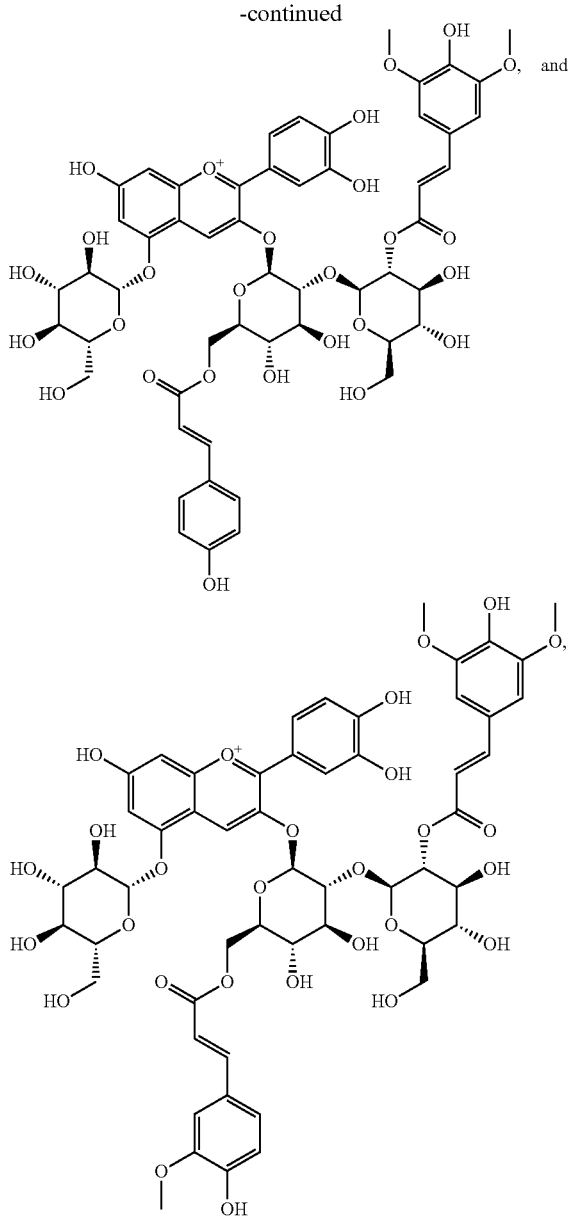

or salt forms thereof, or combinations thereof.

In certain embodiments, the natural product can be red cabbage. The buffer solution can have a pH of from about 7.0 to about 8.0. The metal ion or salt thereof can include $Fe^{3+}$, $Al^{3+}$, or a combination thereof.

In certain embodiments, the concentration of the acylated anthocyanin can be from about 1 µM to about 200 µM. In certain embodiments, the metal ion or salt thereof can have a concentration of less than about 10 times, or from about 0.25 to about 0.5 times the concentration of the acylated anthocyanin. In certain embodiments, the metal ion or salt thereof can have a concentration that is less than or equal to the concentration of the acylated anthocyanin.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11A depicts ΔE, FIG. 11B depicts hue, and FIG. 11C depicts $\lambda_{max}$.

FIG. 14A depicts ΔE, FIG. 14B depicts hue, and FIG. 14C depicts $\lambda_{max}$.

FIG. 15A depicts absorbance at a pH of 6; FIG. 15B depicts absorbance at a pH of 7; and FIG. 15C depicts absorbance at a pH of 8.

FIG. 17A depicts absorbance at a pH of 6; FIG. 17B depicts absorbance at a pH of 7; and FIG. 17C depicts absorbance at a pH of 8.

FIG. 19A shows the absorbance on day zero and FIG. 19B shows the absorbance on day 28.

FIG. 21A shows the absorbance of chelates having a metal ion concentration of 0.5 times the anthocyanin concentration and FIG. 21B shows the absorbance of chelates having a metal ion concentration of 10 times the anthocyanin concentration.

FIG. 22A shows the absorbance on day zero and FIG. 22B shows the absorbance on day 28.

FIG. 24A shows the absorbance of chelates having a metal ion concentration of 0.5 times the anthocyanin concentration and FIG. 24B shows the absorbance of chelates having a metal ion concentration of 10 times the anthocyanin concentration.

FIG. 27A provides the hue angles of $Al^{3+}$ chelates and FIG. 27B provides the hue angles of $Fe^{3+}$ chelates.

FIG. 28A provides the hue angles of $Al^{3+}$ chelates and FIG. 28B provides the hue angles of $Fe^{3+}$ chelates.

FIG. 29A provides the chroma of $Al^{3+}$ chelates and FIG. 29B provides the chroma of $Fe^{3+}$ chelates.

FIG. 30A provides the chroma of $Al^{3+}$ chelates and FIG. 30B provides the chroma of $Fe^{3+}$ chelates.

FIG. 31A shows $\lambda_{max}$ of Peak 4 after treatment with $Al^{3+}$ and FIG. 31A shows $\lambda_{max}$ of Peak 4 after treatment with $Fe^{3+}$.

FIGS. 32A-32C show $\lambda_{max}$ of Peaks 4, 5, and 6, respectively, after treatment with $Al^{3+}$. FIGS. 32D-32F show $\lambda_{max}$ of Peaks 4, 5, and 6, respectively, after treatment with $Fe^{3+}$.

FIGS. 33A-33C show $\lambda_{max}$ of Peaks 4, 5, and 6, respectively, after treatment with $Al^{3+}$. FIGS. 33D-33F show $\lambda_{max}$ of Peaks 4, 5, and 6, respectively, after treatment with $Fe^{3+}$.

DETAILED DESCRIPTION

Figure 1:
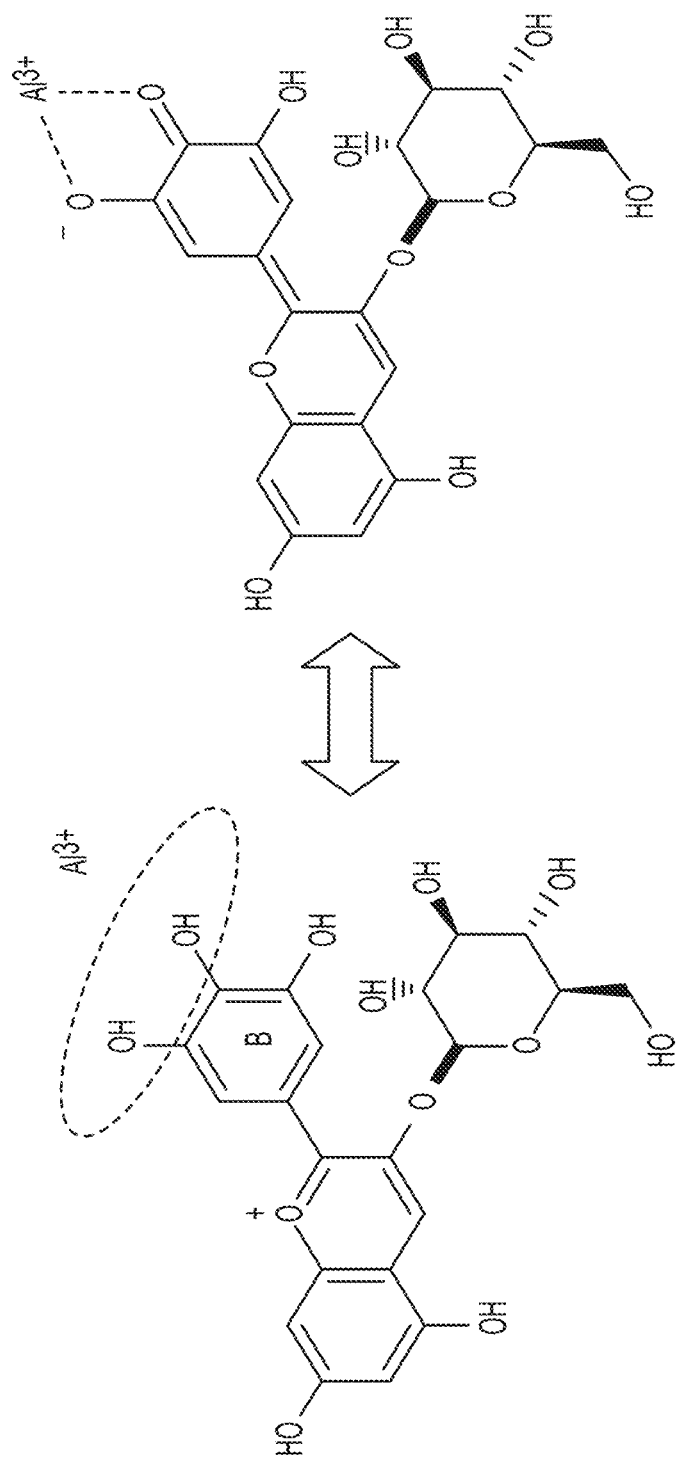
FIG. 1 depicts $Al^{3+}$ complexed with delphinidin-3-O-glucoside (Dpn-3-glu).

The present disclosure relates to colorant compositions, e.g., blue colorant compositions, that include at least one acylated anthocyanin. The colorant composition can further include a metal ion and/or a buffer having a particular pH. In certain embodiments, the colorant compositions can be used in wide variety of food products. For example, and not by way of limitation, a colorant composition of the present disclosure can be used in a coating of a hard panned confection.

1. Definitions

The terms used in this specification generally have their ordinary meanings in the art, within the context of this invention and in the specific context where each term is used. Certain terms are discussed below, or elsewhere in the specification, to provide additional guidance to the practitioner in describing the compositions and methods of the invention and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art.

As used herein, the term "acylated anthocyanin" refers to an anthocyanin molecule having one or more molecules esterified to one or more sugar molecules at the 2-, 3-, 4-, and/or 6-position of a monosaccharide.

As used herein, the term "monoacylated anthocyanin" refers to an anthocyanin molecule that has one molecule esterified to a sugar molecule at a single position of the sugar molecule.

As used herein, the term "diacylated anthocyanin" refers to an anthocyanin molecule that has one molecule esterified to the monosaccharide at two positions of the monosaccharide.

As used herein, the term "monovalent metal ion" refers to a metal atom having one valence electron. Non-limiting examples of monovalent metal ions include $Na^+$ and $K^+$.

As used herein, the term "multivalent metal ion" refers to a metal atom having more than one valence electron. Non-limiting examples of multivalent metal ions include divalent metal ions, trivalent metal ions, $Cr^{+6}$, $Cr^{+4}$ and $Mn^{+4}$.

As used herein, the term "divalent metal ion" refers to a metal atom having two valence electrons. Non-limiting examples of divalent metal ions include $Ca^{2+}$, $Mg^{2+}$, $Cu^{2+}$, and $Fe^{2+}$.

As used herein, the term "trivalent metal ion" refers to a metal atom having three valence electrons. Non-limiting examples of trivalent metal ions include $Al^{3+}$, $Fe^{3+}$, and $Ga^{3+}$.

As used herein, the term "colorant" refers to any substance that imparts color by absorbing or scattering light at different wavelengths.

As used herein, the term "colorant composition" refers to any composition that imparts color by absorbing or scattering light at different wavelengths.

As used herein, the term "natural colorant" refers to any substance that exists in or is produced by nature or is obtained from a natural source. In certain embodiments, the term "natural colorant" refers to a colorant that comprises one of more anthocyanins obtained from a natural source, e.g., a vegetable, a plant, or a flower (or a flower petal).

As used herein, the term "natural colorant composition" refers to any composition that comprises a colorant that exists in or is produced by nature or is obtained from a natural source. In certain embodiments, the term "natural colorant composition" refers to a colorant composition that comprises one of more anthocyanins obtained from a natural source, e.g., a vegetable, a plant, or a flower (or a flower petal).

As used herein, the term "blue colorant" refers to a colorant that reflects light at wavelengths in the region of 450 to 495 nanometers and has a maximum UV/VIS wavelength absorbance ranging from 615 to 635 nanometers.

As used herein, the term "blue colorant composition" refers to a colorant composition that reflects light at wavelengths in the region of 450 to 495 nanometers and has a maximum UV/VIS wavelength absorbance ranging from 615 to 635 nanometers.

As used herein, the term "green colorant" refers to a colorant that reflects light at wavelengths in the region of 490 to 570 nanometers and has a maximum UV/VIS wavelength absorbance ranging from 380 to 420 nanometers or from 630 to 750 nanometers.

As used herein, the term "green colorant composition" refers to a colorant composition that reflects light at wavelengths in the region of 490 to 570 nanometers and has a maximum UV/VIS wavelength absorbance ranging from 380 to 420 nanometers or from 630 to 750 nanometers.

As used herein, the term "yellow colorant" refers to a colorant that reflects light at wavelengths in the region of 570 to 585 nanometers and has a maximum UV/VIS wavelength absorbance ranging from 420 to 430 nanometers.

As used herein, the term "yellow colorant composition" refers to a colorant composition that reflects light at wavelengths in the region of 570 to 585 nanometers and has a maximum UV/VIS wavelength absorbance ranging from 420 to 430 nanometers.

As used herein, "maximum absorbance," "lambda max," or "$\lambda_{max}$," refers to the wavelength in nanometers at which the maximum fraction of light is absorbed by a substance, colorant and/or colorant composition.

As used herein, "FD&C Blue No. 1" includes the various names given to the identical synthetic blue colorant, Brilliant Blue FCF and European Commission E133. The lambda max of FD&C Blue No. 1 is 630 nm.

As used interchangeably herein, the terms "color" and "color characteristics" refer to the color properties such as hue, chroma, purity, saturation, intensity, vividness, value, lightness, brightness and darkness, and color model system parameters used to describe these properties, such as Commission Internationale de l'Eclairage CIE 1976 CIELAB color space L*a*b* values and CIELCH color space L*C*h° values. The CIELAB and CIELCH color models provide more perceptually uniform color spaces than earlier color models. In certain embodiments, the colorant compositions of the present disclosure can be analyzed with a spectrophotometer, and CIELAB L*a*b* and CIELCH L*C*h° values can be calculated from the spectral data, as described in greater detail below. The L*a*b* and L*C*h° values provide a means of representing color characteristics and assessing the magnitude of difference between two colors. Methods for determining the CIELAB and CIELCH values of a presently disclosed colorant composition are disclosed in International Patent Publication Nos. WO 2014/150230 and WO 2014/152417, the contents of which are hereby incorporated by reference in their entireties.

As used herein, "hue" or "hue angle" refers to the color property that gives a color its name, for example, red, blue and violet.

As used herein, "chroma" is a color property indicating the purity of a color. In certain embodiments, a higher chroma is associated with greater purity of hue and less dilution by white, gray or black.

As used herein, "value" is a color property indicating the lightness or darkness of a color wherein a higher "value" is associated with greater lightness.

As used herein "admixing," for example, "admixing a colorant composition of the present disclosure with a food product," refers to the method where a colorant composition of the present disclosure is mixed with or added to the completed product or mixed with some or all of the components of the product during product formation or some combination of these steps. When used in the context of admixing the term "product" refers to the product or any of its components. Admixing can include a process that includes adding the colorant composition to the product, spraying the colorant composition on the product, coating the colorant composition on the product, painting the colorant composition on the product, pasting the colorant composition on the product, encapsulating the product with the colorant composition, mixing the colorant composition with the product or any combination thereof. The colorant compositions, e.g., those that are admixed with the product, can be a liquid, dry powder, spray, paste, suspension or any combination thereof.

"Fractionation" is the process of selecting and separating a portion of compounds from the complex mixture of an anthocyanin-containing vegetable, fruit, or flower juice or extract. A "fraction" is the product of fractionation. Anthocyanin fractions are separated from the juice or extract at a select pH based on differences in charge and polarity of the different anthocyanin molecules present. An "fraction of a natural juice or extract" is the product of the fraction of a juice or extract from a natural source, e.g., a vegetable, fruit, or flower. A fraction of a natural juice or extract contains a mixture of anthocyanins that is different from the mixture of anthocyanins in the anthocyanin-containing juice or extract from which the fraction was separated.

As used herein, "food grade," refers to any substance, metal ion and/or colorant composition that is of a grade acceptable for use in edible food products.

As used herein, "food product" refers to an ingestible product, such as, but not limited to, human food, animal foods and pharmaceutical compositions.

As used herein, "sugar syrup" refers to a liquid material comprising at least a sugar and water. In certain embodiments, a sugar syrup can include a syrup where a sugar is dissolved in the water in an amount of at least 60% sugar solids by weight of the syrup. In certain embodiments, other components can also be present within the sugar syrup. For example, and not by way of limitation, a colorant composition of the present disclosure can be present within a sugar syrup.

As used herein, "coating layer" refers to a layer obtained by one application of a coating material, e.g., a sugar syrup, to a substrate, e.g., a food product, being coated.

As used herein, "coating" refers to the total amount of coating material, e.g., one or more sugar syrups, applied to a substrate, e.g., a food product, upon completion of a coating process. In certain embodiments, the coating process can include one or more steps of applying a coating material, e.g., a sugar syrup containing one or more colorant compositions of the present disclosure, to the substrate.

As used herein, "beverage category" refers to beverages, beverage mixes and concentrates, including but not limited to, alcoholic and non-alcoholic ready to drink and dry powdered beverages. Additional non-limiting examples of beverages include carbonated and non-carbonated beverages, e.g., sodas, fruit or vegetable juices.

As used herein, "frozen food category" refers to chilled or frozen food products. Non-limiting examples of food products of the frozen food category include ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yogurt, artisanal ice cream, frozen ready meals, frozen pizza, chilled pizza, frozen soup, frozen pasta, frozen processed red meat, frozen processed poultry, frozen processed fish/seafood, frozen vegetables, frozen processed vegetables, frozen meat substitutes, frozen potatoes, frozen bakery products and frozen desserts.

As used herein, "snack food category" refers to any food that can be a light informal meal including, but not limited to sweet and savory snacks and snack bars. Examples of snack foods include, but are not limited to, fruit snacks, chips/crisps, extruded snacks, tortilla/corn chips, popcorn, pretzels, nuts and other sweet and savory snacks. Examples of snack bars include, but are not limited to granola/muesli bars, breakfast bars, energy bars, fruit bars and other snack bars.

As used herein, "confectionery product" or "confection" refers to a sweet or candy food product. Non-limiting examples of confectionery products include cakes, cookies, pies, candies, chocolates, chewing gums, gelatins, ice creams, sorbets, puddings, jams, jellies, salad dressings, and other condiments, cereal, and other breakfast foods, canned fruits and fruit sauces.

2. Acylated Anthocyanins

The present disclosure relates to colorant compositions that include at least one acylated anthocyanin, e.g., a diacylated anthocyanin. In certain embodiments, the colorant composition is a natural colorant composition, in which the anthocyanin is naturally derived, e.g., from a natural vegetable, plant, or flower (or flower petal) source. In certain embodiments, the colorant composition is a blue colorant composition, in which the anthocyanin produces a blue color. The color compositions disclosed herein can include one or more acylated anthocyanins, e.g., diacylated anthocyanins, and/or one or more metal ions, or salt forms thereof, and/or one or more buffers.

The colorant compositions of the present disclosure can be added to food products, for example, to alter the color characteristics of the food product. For example, and not by way of limitation, the colorant composition can be used within a coating for confections to produce a blue colored coating. Alternatively or additionally, the blue colorant composition can be combined with another colorant, e.g., a yellow colorant, to produce a colorant composition of a different color, e.g., a green colorant composition.

In certain embodiments, an anthocyanin of the present disclosure, e.g., an acylated anthocyanin, can be substituted with hydrogen, hydroxyl and/or methoxyl groups at various positions. An anthocyanin includes an anthocyanidin esterified with one or more sugar molecules to form a glycoside. Anthocyanidins can have the general structure:

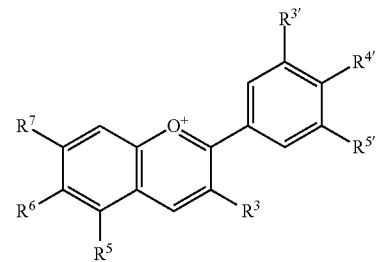

For example, and not by way of the limitation, the anthocyanin can be an anthocyanin of Formula I (also referred to herein as cyanidin-3-O-glucoside (Cy-3-glu)):

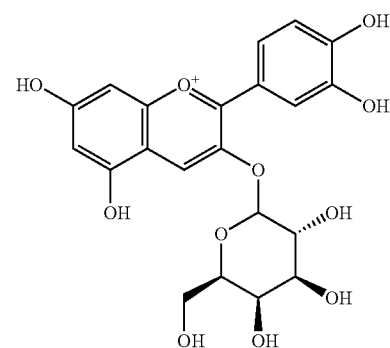 [SMILES: OC[C@H]1OC(Oc2cc3c(O)cc(O)cc3[o+]c2-c2ccc(O)c(O)c2)[C@H](O)[C@@H](O)[C@H]1O]

In certain embodiments, the anthocyanin can be a derivative, e.g., glycoside, of cyanidin, delphinidin, aurantinidin, europinidin, pelargonidin, malvidin, peonidin, petunidin, rosinidin or combinations thereof.

In certain embodiments, the anthocyanin of the present disclosure can be acylated. For example, and not by way of limitation, the anthocyanin can have one or more molecules esterified to the sugar molecules at the 2-, 3-, 4-, and/or 6-position of a monosaccharide. In certain embodiments, the anthocyanin of the present disclosure can include one or more acyl groups, i.e., be acylated. In certain embodiments, the acyl group is derived from coumaric, ferulic, caffeic, sinapic, gallic, malonic, acetic, malic, succinic, vanillic, hydroxycinnamic, oxalic acids or combinations thereof.

In certain embodiments, the acylated anthocyanin is a monoacylated cyanidin glucoside, a diacylated cyanidin glucoside or a mixture thereof. In certain embodiments, the anthocyanin of the present disclosure can be an anthocyanin of Formula I that includes one or more acyl groups. In certain embodiments, the acylated anthocyanin can be monoacylated or diacylated forms of cyanidin, delphinidin, aurantinidin, europinidin, pelargonidin, malvidin, peonidin, petunidin or rosinidin derivatives, e.g., glucosides and galactosides.

In certain embodiments, an anthocyanin of the present disclosure is a diacylated anthocyanin of Formula II (also referred to herein as Cy-3-diglu-p-coumaric-sinapic-5-glu):

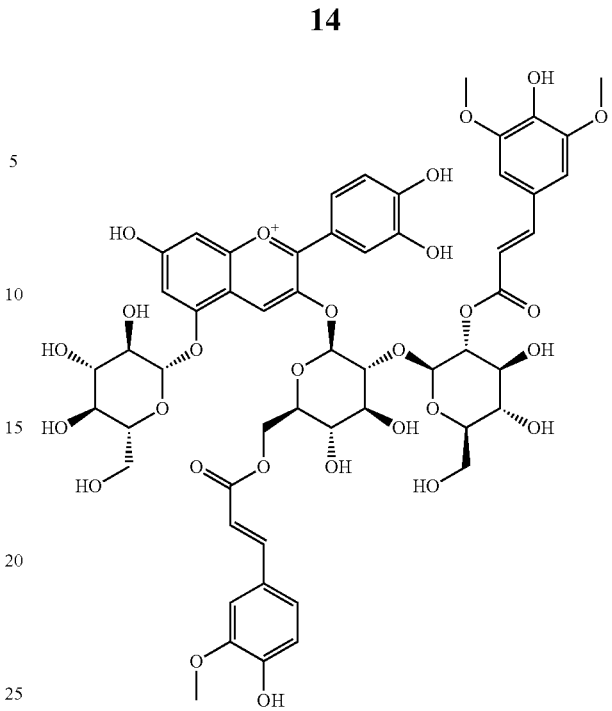

In certain embodiments, an anthocyanin of the present disclosure is a diacylated anthocyanin of Formula IV (also referred to herein as Cy-3-diglu-p-sinapic-sinapic-5-glu):

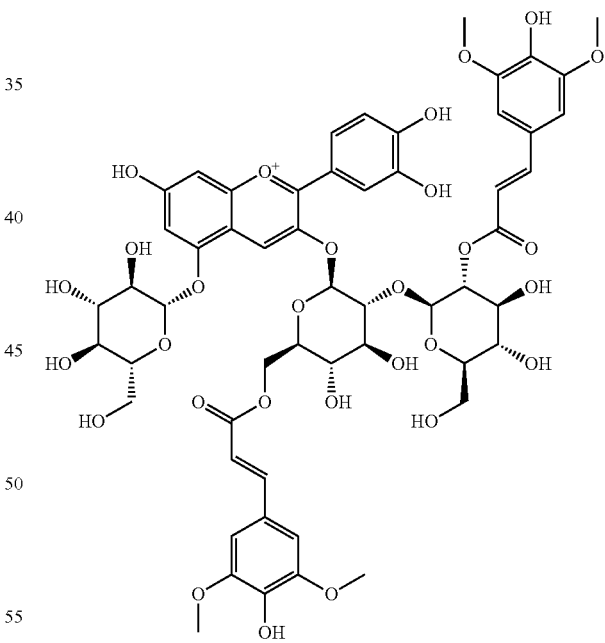

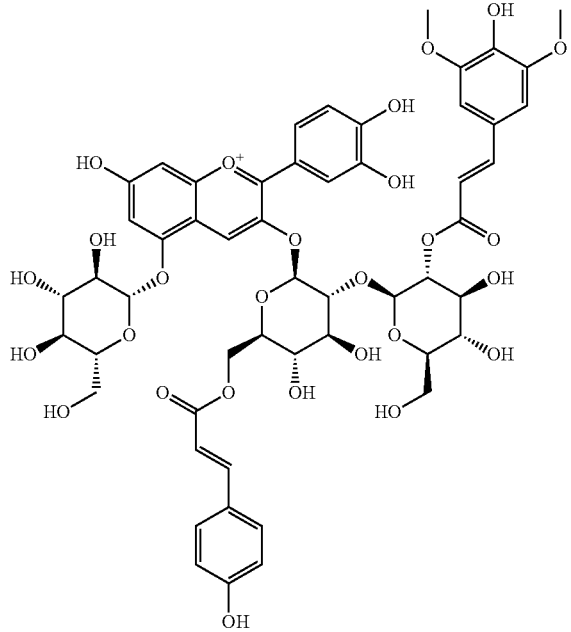 [SMILES: COc1cc(/C=C/C(=O)OC[C@H]2O[C@@H](Oc3cc4c(O[C@@H]5O[C@H](CO)[C@@H](O)[C@H](O)[C@H]5O)cc(O)cc4[o+]c3-c3ccc(O)c(O)c3)[C@H](O[C@@H]3O[C@H](CO)[C@@H](O)[C@H](O)[C@H]3OC(=O)/C=C/c3cc(OC)c(O)c(OC)c3)[C@@H](O)[C@@H]2O)ccc1O]

In certain embodiments, an anthocyanin of the present disclosure is a diacylated anthocyanin of Formula III (also referred to herein as Cy-3-diglu-p-ferulic-sinapic-5-glu):

The anthocyanins of the present disclosure can be obtained from natural sources and/or juices or extracts thereof. For example, and not by way of limitation, the anthocyanins of the present disclosure can be obtained from vegetables (or extracts or juices thereof) such as red cabbage, purple sweet potato, red potato, blue potato, red radish, black carrot, purple carrot, purple corn, red corn, red onion, purple broccoli, red broccoli, purple cauliflower, rhubarb, black bean, red leaf lettuce, black rice, eggplant or combinations thereof. In certain embodiments, the anthocyanins can be obtained from fruits (or extracts or juices thereof) such as, but not limited to, strawberry, raspberry, cranberry, lingonberry, red grape, apple, black currant, red currant, cherry, blueberry, elderberry, bilberry, crowberry, blackberry, chokeberry, gooseberry, acai, nectarine, peach, plum, blood orange, blue tomato or combinations thereof. In certain embodiments, the anthocyanins of the present disclosure can be obtained from flower petals (or extracts or juices thereof) such as those of "Heavenly Blue" Morning Glory, "Better Times" Rose or combinations thereof.

In certain embodiments, a vegetable, fruit, and flower petal juice can be obtained by pressing liquid out of the fruit, vegetable, or flower. In certain embodiments, a vegetable, fruit, and flower petal extract can be obtained by washing a macerated fruit, vegetable, or flower with a solvent (e.g., water or alcohol). Juices and extract can contain anthocyanins as well as other naturally occurring compounds, including, for example, carbohydrates, acids, flavonoids, metal ions, phenolic acids, phenolic acid esters, and vitamins.

In certain embodiments, vegetable, fruit, and flower petal juices or extracts can include processed juices and extracts. Non-limiting examples of processed juices and extracts include reconstituted juices and extracts, deodorized juices and extracts, and juices and extracts subjected to other processes for removing specific or broad classes of compounds.

In certain embodiments, the anthocyanin is obtained from red cabbage or an extract or juice thereof.

3. Colorant Compositions

The present disclosure provides colorant compositions that comprise one or more acylated anthocyanins, e.g., diacylated anthocyanins, disclosed above, and/or a metal ion (or salt form thereof) and/or a buffer of a particular pH. In certain embodiments, a color composition of the present disclosure can be a blue colorant composition, e.g., the anthocyanins present with the color composition produce a blue color.

In certain embodiments, one or more of the colorant compositions of the present disclosure can be added to a food product, in an amount effective to increase, enhance and/or modify the color characteristics of a food product. For example, and not by way of limitation, a colorant composition of the present disclosure can enhance the blue color characteristics of the food product. In certain embodiments, colorant compositions of the present disclosure can be used to increase, enhance and/or modify the color characteristics of a food product, such as, but not limited to, a chocolate confection.

In certain embodiments, the colorant composition can comprise one or more acylated anthocyanins, e.g., diacylated anthocyanins, at a concentration of about 1 µM to about 1 M. In certain embodiments, the colorant composition can comprise one or more acylated anthocyanins, e.g., diacylated anthocyanins, at a concentration of about 1 µM to about 200 µM. For example, and not by way of limitation, the anthocyanins can be present in the colorant composition at a concentration from about 1 µM to about 150 µM, from about 1 µM to about 125 from about 1 µM to about 100 µM, from about 1 µM to about 75 µM, from about 1 µM to about 50 from about 1 µM to about 25 µM, from about 1 µM to about 20 µM, from about 1 µM to about 15 µM, from about 1 µM to about 10 µM, from about 1 µM to about 5 µM, from about 5 µM to about 200 µM, from about 10 µM to about 200 µM, from about 15 µM to about 200 µM, from about 20 µM to about 200 µM, from about 25 µM to about 200 µM, from about 50 µM to about 200 µM, from about 75 µM to about 200 µM, from about 100 µM to about 200 from about 125 µM to about 200 µM, from about 150 µM to about 200 µM or from about 175 µM to about 200 µM. In certain embodiments, the colorant composition can comprise one or more anthocyanins at a concentration of about 25 µM to about 75 µM. In certain embodiments, the colorant composition can comprise one or more acylated anthocyanins, e.g., diacylated anthocyanins, at a concentration of about 50 µM.

In certain embodiments, the one or more anthocyanins comprise about 1% to about 100% by weight of the total colorant composition. In certain embodiments, the one or more anthocyanins comprise about 10% to about 90% by weight of the colorant composition. In certain embodiments, the one or more anthocyanins comprise about 20% to about 80% by weight of the colorant composition. In certain embodiments, the one or more anthocyanins comprise about 30% to about 70% by weight of the colorant composition. In certain embodiments, the one or more anthocyanins comprise about 40% to about 60% by weight of the colorant composition. In certain embodiments, the one or more anthocyanins comprise about 1% to about 20%, about 5% to about 15% or about 8% to about 12% by weight of the colorant composition. In certain embodiments, the one or more anthocyanins comprise about 10% by weight of the total colorant composition.

In certain embodiments, the colorant compositions of the present disclosure exhibit increased color stability, e.g., increased blue color stability. As shown in the Examples below, the stability of the color composition can depend on the acylation of the anthocyanin, the concentration of the metal ion in relation to the concentration of the anthocyanins in the composition, and the pH of the buffer. For example, and not by way of limitation, a composition comprising a diacylated anthocyanin, a metal ion, and a buffer having a pH of about 6 exhibits greater color stability than a color composition comprising a monoacylated anthocyanin, a metal ion, and a buffer having a pH of about 6. In certain embodiments, a colorant composition, e.g., a colorant composition that comprises an diacylated anthocyanin, a metal ion, and a buffer that has a pH range of about 7, exhibits greater color stability than a composition that comprises a monoacylated anthocyanin. In certain embodiments, a composition comprising a diacylated anthocyanin, a metal ion, and a buffer having a pH of about 7 exhibits greater color stability than a color composition comprising a diacylated anthocyanin, a metal ion, and a buffer having a pH of about 8. In certain embodiments, a composition that comprises an acylated anthocyanin, a metal ion, and a buffer that has a pH range of about 5 to about 8 exhibits greater color stability than a colorant composition that includes the acylated anthocyanin alone. In certain embodiments, a colorant composition, e.g., a colorant composition that comprises an acylated anthocyanin, a metal ion, and a buffer that has a pH range of about 5 to about 8, exhibits greater color stability than a composition that comprises a non-acylated anthocyanin.

In certain embodiments, a colorant composition of the present disclosure in solution exhibits color stability, e.g., blue color stability, for a time period greater than about 1 day, greater than about 2 days, greater than about 3 days, greater than about 4 days, greater than about 5 days, greater than about 6 days, greater than about 7 days, greater than about 8 days, greater than about 9 days, greater than about 10 days, greater than about 11 days, greater than about 12 days, greater than about 13 days, greater than about 14 days, greater than about 15 days, greater than about 16 days, greater than about 17 days, greater than about 18 days, greater than about 19 days, greater than about 20 days, greater than about 21 days, greater than about 22 days, greater than about 23 days, greater than about 24 days, greater than about 25 days, greater than about 26 days, greater than about 27 days, or greater than about 28 days.

In certain embodiments, the colorant composition of the present disclosure can further include one or more stabilizers to enhance stability.

3.1. Metal Ions

In certain embodiments of the present disclosure, the colorant composition comprises at least one acylated anthocyanin, e.g., a diacylated anthocyanin, as disclosed above, and at least one metal ion or salt form thereof. In certain embodiments, the metal ion can bind to one or more hydroxyl groups present on the anthocyanin molecule (see, e.g., FIG. 1), for example, to increase the color stability of the color composition and/or enhance the blue color of the color composition.

In certain embodiments, the metal ion can be a cation. In certain embodiments, the metal ion can be a multivalent metal ion such as, but not limited to, a divalent metal ion or a trivalent metal ion. Non-limiting examples of a divalent cation include $Mg^{2+}$, $Ca^{2+}$, $Zn^{2+}$, $Cd^{2+}$, $Cu^{2+}$, $Cr^{2+}$, $Fe^{2+}$, $Co^{2+}$, or $Ni^{2+}$. In certain embodiments, the metal cation is a trivalent cation such as $Al^{3+}$, $Au^{3+}$, $Cr^{3+}$, $Mn^{3+}$, $Ga^{3+}$, $Fe^{3+}$, $Co^{3+}$, $Ni^{3+}$, $Ce^{3+}$, $Sb^{3+}$, or $Bi^{3+}$. In certain embodiments, the metal ion is $Al^{3+}$. In certain embodiments, the metal ion is $Ga^{3+}$. In certain embodiments, the metal ion is $Fe^{3+}$.

In certain embodiments, the metal ion can be present in the colorant composition as a metal salt. For example, and not by way of limitation, the metal salt can be $Al_2(SO_4)_3$, $FeCl_3$, $GaCl_3$, and/or $CrCl_3$.

In certain embodiments, thereof can be a food grade metal ion or salt form thereof. In certain embodiments, the metal ion or salt form thereof can be selected to be suitable for use in an edible product, e.g., $Al^{3+}$ or $Fe^{3+}$.

In certain embodiments, the concentration of the metal ion (or salt thereof) in the colorant composition can be from about 0.01 times to about 100 times the concentration of anthocyanins. For example, and not by way of limitation, the concentration of the metal ion, or salt form thereof, can be from about 0.01 times to about 10 times the anthocyanin concentration. In certain embodiments, the concentration of the metal ion, or salt form thereof, can be from about 0.01 times to about 10 times, from about 0.01 times to about 8 times, from about 0.01 times to about 5 times, from about 0.01 times to about 3 times, from about 0.01 times to about 2 times, from about 0.01 times to about 1 times, from about 0.01 times to about 0.75 times, from about 0.01 times to about 0.5 times, from about 0.1 times to about 5 times, from about 0.1 times to about 2 times, from about 0.1 times to about 1 times, from about 0.1 times to about 0.75 times, from about 0.1 times to about 0.5 times, from about 0.25 times to about 5 times, from about 0.25 times to about 2 times, from about 0.25 times to about 1 times, from about 0.25 times to about 0.75 times, from about 0.25 times to about 0.5 times the anthocyanin concentration.

In certain embodiments, the concentration of the metal ion, or salt thereof, in the colorant composition can be less than about 0.5 times, about 0.75 times, about 1.0 times, about 1.5 times, about 2.0 times, about 2.5 times, about 3.0 times, about 3.5 times, about 4.0 times, about 4.5 times, about 5.0 times, about 5.5 times, about 6.0 times, about 7.0 times, about 7.5 times, about 8.0 times, about 8.5 times, about 9.0 times, about 9.5 times or about 10.0 times the anthocyanin concentration. In certain embodiments, the concentration of the metal ion, or salt thereof, in the colorant composition can be from about 0.25 to about 0.75 times the anthocyanin concentration. In certain embodiments, the concentration of the metal ion, or salt thereof, in the colorant composition can be about 0.25 times, about 0.5 times, or about 0.75 times the anthocyanin concentration. In certain embodiments, the concentration of the metal ion, or salt form thereof, in the colorant composition is about 1.0 times the anthocyanin concentration. In certain embodiments, the concentration of the metal ion, or salt thereof, in the colorant composition can be equal to or less than about 1.0 times the anthocyanin concentration (i.e., equal to or less than the anthocyanin concentration).

3.2. Buffers

In certain embodiments, a composition of the present disclosure comprises at least one acylated anthocyanin, e.g., a diacylated anthocyanin, and a buffer of a particular pH.

In certain embodiments, a composition of the present disclosure comprises at least one acylated anthocyanin, e.g., a diacylated anthocyanin, and/or a metal ion, or salt thereof, and/or a buffer solution of a particular pH.

Non-limiting examples of the buffer solution include potassium and sodium-based buffers. In certain embodiments, the buffer can include potassium phosphate, tris (hydroxymethyl)-aminomethane, sodium acetate, or combinations thereof.

In certain embodiments, the buffer has a pH of about 1.0 to about 14.0. For example, and not by way of limitation, the pH of the buffer can be from about 3.0 to about 11.0. In certain embodiments, for a blue colorant composition, the pH can be from about 5.0 to about 8.0, or from about 6.0 to about 8.0, or from about 7.0 to about 8.0. In certain non-limiting embodiments, the pH of the buffer present within a colorant composition, e.g., a blue colorant composition, is about 6.0. In certain embodiments, the pH of the buffer present within a colorant composition, e.g., a blue colorant composition, is about 6.5. In certain embodiments, the pH of the buffer present within a colorant composition, e.g., a blue colorant composition, is about 7.0. In certain embodiments, the pH of the buffer present within a colorant composition, e.g., a blue colorant composition, is about 7.5. In certain embodiments, the pH of the buffer present within a colorant composition, e.g., a blue colorant composition, is about 8.0.

In certain embodiments, the pH of the buffer depends on the concentration of the metal ion in the colorant composition. For example, and not by way of limitation, if the composition contains higher concentrations of the metal ion, e.g., a metal ion concentration greater than or equal to the concentration of anthocyanins, the pH of the buffer can be lower than the naturally occurring pH, for example, a pH of about 6.0 and still achieve the desired color. Alternatively, at a higher pH, for example, a pH of about 8.0, lower concentrations of the metal ion, e.g., a metal ion concentration less than or equal to the concentration of anthocyanins, can be used to achieve the desired color.

3.3 Color Characteristics

As embodied herein, color characteristics of the presently disclosed colorant compositions, e.g., blue colorant compositions, can be determined. Such color characteristics can include hue, chroma, purity, saturation, intensity, vividness, value, lightness, brightness and darkness, and color model system parameters used to describe these properties, such as Commission Internationale de l'Eclairage CIE 1976 CIELAB color space L*a*b* values and CIELCH color space L*C*h° values. For example, L*a*b* values consist of a set of coordinate values defined in a three-dimensional Cartesian coordinate system. L* is the value, or lightness, coordinate. $L^*$ provides a scale of lightness from black (0 $L^*$ units) to white (100 $L^*$ units) on a vertical axis, $a^*$ and $b^*$ are coordinates related to both hue and chroma, $a^*$ provides a scale for greenness (–$a^*$ units) to redness (+$a^*$ units), with neutral at the center point (0 $a^*$ units), on a horizontal axis; $b^*$ provides a scale for blueness (–$b^*$ units) to yellowness (+$b^*$ units), with neutral at the center point (0 $b^*$ units), on a second horizontal axis perpendicular to the first horizontal axis. The three axes cross where $L^*$ has a value of 50 and $a^*$ and $b^*$ are both zero.

$L^*C^*h°$ values consist of a set of coordinate values defined in a three-dimensional cylindrical coordinate system. $L^*$ is the value, or lightness, coordinate. $L^*$ provides a scale of lightness from black (0 $L^*$ units) to white (100 $L^*$ units) on a longitudinal axis. $h°$ is the hue coordinate. $h°$ is specified as an angle from 0° to 360° moving counterclockwise around the $L^*$ axis. Pure red has a hue angle of 0°, pure yellow has a hue angle of 90°, pure green has a hue angle of 180°, and pure blue has a hue angle of 270°. The $C^*$ coordinate represents chroma and is specified as a radial distance from the $L^*$ axis. $C^*$ provides a scale from achromatic, i.e., neutral white, gray, or black, at the $L^*$ axis (0 $C^*$ units) to greater purity of hue as the coordinate moves away from the $L^*$ axis (up to 100 or more $C^*$ units). $C^*$ and $h°$ can be calculated from $a^*$ and $b^*$ using Equations 1 and 2:

$$C^*=(a^{*2}+b^{*2})^{0.5} \quad (1)$$

$$h°=\arctan(b^*/a^*) \quad (2)$$

"Delta E," "$\Delta E_{ab}^*$," or "$\Delta E$" is a measure of the magnitude of total color difference between two colors represented in CIELAB $L^*a^*b^*$ color space. It has been reported that an experienced color observer cannot distinguish any difference between two colors when the $\Delta E$ is about 2.3 or less. The $\Delta E$ of two different colors with $L^*a^*b^*$ values, $L^*_1a^*_1b^*_1$ and $L^*_2a^*_2b^*_2$, is calculated using Equation 3:

$$\Delta E_{ab}^*=\sqrt{(L^*_1-L^*_2)^2+(a^*_1-a^*_2)^2+(b^*_1-b^*_2)^2} \quad (3)$$

The CIELAB $L^*a^*b^*$ and CIELCH $L^*C^*h°$ values of FD&C Blue No. 1 at seven different concentrations in aqueous solution are presented in Table 1.

TABLE 1

| Concentration | $L^*$ | $a^*$ | $b^*$ | $C^*$ | $h°$ |
|---|---|---|---|---|---|
| 1000 ppm | 10.49 | 15.82 | −44.99 | 47.69 | 289.37 |
| 500 ppm | 24.07 | 9.80 | −58.18 | 59.00 | 279.56 |
| 100 ppm | 52.43 | −29.57 | −57.38 | 64.55 | 242.74 |
| 50 ppm | 63.64 | −43.71 | −48.31 | 65.14 | 227.86 |
| 10 ppm | 84.25 | −37.23 | −23.42 | 43.99 | 212.17 |
| 5 ppm | 90.65 | −24.40 | −14.28 | 28.27 | 210.33 |
| 1 ppm | 97.69 | −6.43 | −3.57 | 7.36 | 209.02 |

These $L^*a^*b^*$ and $L^*C^*h°$ values for FD&C Blue No. 1 can be used as target values for a natural blue colorant alternative to FD&C Blue No. 1. Natural blue colorants having $L^*a^*b^*$ values that fall within a $\Delta E$ of 2.3 or less from these target values would be expected to provide color characteristics sufficiently similar to those provided by FD&C Blue No. 1 that a human eye could not distinguish the difference in color provided by the natural colorant versus the synthetic. However, natural blue colorants having $L^*a^*b^*$ values that fall outside a $\Delta E$ of 2.3 can also be used as a natural substitute for FD&C Blue No. 1. The closer the $L^*a^*b^*$ values for a natural blue colorant come to the synthetic target values (i.e., yielding smaller values of $\Delta E$), the better replacement the natural blue colorant will be for FD&C Blue No. 1 in an edible application.

Mathematical models can be generated to represent the color characteristics provided by FD&C Blue No. 1 at any concentration in the $L^*a^*b^*$ and $L^*C^*h°$ color spaces. For example, the color characteristics may be represented by a segmented line model connecting the $L^*a^*b^*$ or $L^*C^*h°$ data points of Table 1. A line (L) connecting two points ($P_1$ and $P_2$) representing two different concentrations of FD&C Blue No. 1 in $L^*a^*b^*$ space can be calculated with the following Equation 4:

$$L=\{P_1+t^*(P_2-P_1)\} \quad (4)$$

wherein $P_1$ is $(L^*_1, a^*_1, b^*_1)$; $P_2$ is $(L^*_2, a^*_2, b^*_2)$; and $t$ is any real number.

Consequently, a segmented line model for FD&C Blue No. 1 in $L^*a^*b^*$ color space can be interpolated based on the $L^*a^*b^*$ values for the seven different concentration points using Equation 4 as follows.

For concentrations between 500 and 1000 ppm, 0<t<1:

$$L^*=10.49+13.58^*t$$

$$a^*=15.82+-6.02^*t$$

$$b^*=-44.99+-13.19^*t$$

For concentrations between 100 and 500 ppm, 0<t<1:

$$L^*=24.07+28.36^*t$$

$$a^*=9.80+-39.37^*t$$

$$b^*=-58.18+0.80^*t$$

For concentrations between 50 and 100 ppm, 0<t<1:

$$L^*=52.43+11.21^*t$$

$$a^*=-29.57+-14.14^*t$$

$$b^*=-57.38+9.07^*t$$

For concentrations between 10 and 50 ppm, 0<t<1:

$$L^*=63.64+20.61^*t$$

$$a^*=-43.71+6.48^*t$$

$$b^*=-48.31+24.89^*t$$

For concentrations between 5 and 10 ppm, 0<t<1:

$$L^*=84.25+6.40^*t$$

$$a^*=-37.23+12.83^*t$$

$$b^*=-23.42+9.14^*t$$

For concentrations between 1 and 5 ppm, 0<t<1:

$$L^*=90.65+7.04^*t$$

$$a^*=-24.40+17.97^*t$$

$$b^*=-14.28+10.71^*t$$

In addition, colors having $L^*a^*b^*$ values falling within a specific $\Delta E$ range of the FD&C Blue No. 1 model can be mathematically modeled in $L^*a^*b^*$ color space. Selecting a specific $\Delta E$ value, e.g., 15, with respect to FD&C Blue No. 1 and plotting that $\Delta E$ in $L^*a^*b^*$ color space results in a tube-like structure around the FD&C Blue No. 1 segmented line model.

To determine whether a point ($X_0$) in $L^*a^*b^*$ color space falls within a specific $\Delta E$ value from the FD&C Blue No. 1 model, the minimum distance, $d_{min}$, between the point and the model (represented by line segment $X_1$ to $X_2$) must be calculated. Equation 5 can be used to calculate $d_{min}$:

$$d_{min} = \frac{|(x_0 - x_1) \times (x_0 - x_2)|}{|x_2 - x_1|} \quad (5)$$

wherein x denotes the cross product of two vectors and vertical bars denote the magnitude of a vector expression.

If the value of $d_{min}$ is less than or equal to the chosen $\Delta E$ value, then the point in L*a*b* color space falls within that specific $\Delta E$ value from the FD&C Blue No. 1 model.

The colorant compositions disclosed herein include natural blue colorant compositions comprising a fraction of diacylated anthocyanins sourced from a natural product, wherein the colorant composition can provide color characteristics having a $\Delta E$ value of 12 or less compared to the color characteristics defined by the segmented line defined by the L*a*b* values of 50 ppm and 100 ppm FD&C Blue No. 1 in aqueous solution. In other embodiments the $\Delta E$ value may be less than 11, 10, 9, 8, 7, 6, 5, 4, or 3. The colorant composition may also be measured against a plurality of segmented lines defined by different concentrations of FD&C Blue No. 1 in aqueous solution, e.g., 1 ppm and 5 ppm, 5 ppm and 10 ppm, 10 ppm and 50 ppm, 100 ppm and 500 ppm, 500 ppm and 1000 ppm, or any combination selected therefrom. However, if $\Delta E$ value is used to describe the colorant composition, only one segmented line is required to define the colorant composition.

4. Food Products

The colorant composition of the present disclosure can be used in a wide variety of food products. Non-limiting examples of suitable food products include chocolates, chewing gum compositions, hard and soft confectionery products, dairy products, food products of the beverage category including juice products and soft drinks, food products of the frozen food category including frozen dairy products, pharmaceuticals and food categories described herein.

4.1. Confectionery Products

In certain embodiments, a colorant composition of the presently disclosed subject matter can be incorporated into a confectionery product. Non-limiting examples of confectionery products include cakes, cookies, pies, candies, chocolates, chewing gums, gelatins, ice creams, sorbets, puddings, jams, jellies, salad dressings, and other condiments, cereal, and other breakfast foods, canned fruits and fruit sauces.

In certain embodiments, a colorant composition of the present disclosure can be incorporated into the confections by admixing the colorant composition into a confectionery product, e.g., a hard or soft confectionery product. For example, and not by way of limitation, the present disclosure provides methods for enhancing or modulating the blue color of an edible product that comprises (a) providing at least one food product, or a precursor thereof, and (b) combining the food product or precursor thereof with one or more blue colorant compositions, disclosed herein, so as to form a modified edible food product. Additionally, the methods can be used for enhancing or modulating the green color of an edible product by (a) providing at least one food product, or a precursor thereof, and (b) combining the food product or precursor thereof with one or more green colorant compositions, e.g., a blue colorant composition and a yellow colorant composition, so as to form a modified edible food product.

In certain embodiments, certain amounts of a colorant composition of the present disclosure can be incorporated into a confectionery product. The amount of the colorant composition that is used can depend on a number of factors including, but not limited to, the type of bulking agent or carrier employed, method of application, use rate, the type of colorant employed and the intensity of color desired. In certain embodiments of the present disclosure, the colorant composition is admixed with a confection, where the colorant composition is present in an amount of from about 0.0001 to about 10% weight/weight (w/w), or from about 0.001 to about 8% w/w, or from about 0.01 to about 6% w/w, or from about 0.025 to about 4% w/w, or from about 0.05 to about 2% w/w, or from about 0.075 to about 1% w/w, or from about 0.1 to about 0.5% w/w, and values in between.

In certain embodiments, the colorant composition of the present disclosure can be incorporated in a confectionery product of the dragée type, which can include a core and a layer of granulated sugar. Non-limiting examples of the type of cores in a dragée type confectionery product can include a natural center (e.g., almond, hazelnut or groundnut) or a "confectionery" center (e.g., caramel, fondant or chocolate). The cores can then be coated with chocolate, with successive layers of sugars or other substances such as polyols, gums and natural polymers, that can further include one or more color compositions of the present disclosure. In certain embodiments, the present disclosure provides for confectionery products that are coated with a blue color composition disclosed herein.

In certain embodiments, the methods for manufacturing compositions of the dragée type can comprise the deposition of a plurality of sublayers, for example between about 5 and about 30, by a succession of phases of application and drying carried out, for example, in a pan. In a hard panning process, multiple applications of a highly concentrated sugar syrup can be used to build up the uncolored portion of a sugar coating on an edible product center. This can be followed by multiple applications of a concentrated sugar syrup containing a colorant composition of the present disclosure. In certain embodiments, the hard panning process comprises the repetitive application of thin layers of a coating solution or composition onto an intermixed mass of centers, and the drying of each layer of coating solution or composition during which the sugar in the coating crystallizes between the applications of layers. Additional non-limiting examples of methods for producing hard panned confectionaries are provided in International Patent Publication Nos. WO 2014/150438 and WO 2014/152417, the disclosures of which are incorporated herein by reference.

If the coating is to be colored, a colorant composition of the present disclosure can be added to the coating solution in the later stages of the coating process. For example, and not by way of limitation, the colorant composition can be a natural blue colorant composition comprising an acylated anthocyanin, a metal ion, or salt form thereof, and a buffer having a pH of about 6 to about 8. For a hard panned confectionary, following the application of a number of layers of the uncolored sugar syrup to build up the sugar coating, a number of applications of a sugar syrup comprising a colorant composition, disclosed herein, are applied to provide the color coat. In certain embodiments, the color coat can require 30 or more applications of a colored coating solution to achieve the desired color.

In certain embodiments, when a colorant composition is included in one or more sugar syrups used for hard panned coating, the hard panned coating has a visible color provided by the colorant composition. A hard panned confection comprising an edible product center coated with this same hard panned coating also has a visible color provided by the colorant composition. In certain embodiments, the hard panned coating has a blue color, and a hard panned confection coated with this same hard panned coating has a blue color. The blue color can be provided, at least in part, by a blue colorant composition, disclosed herein, incorporated in the coating.

In certain embodiments, the hard panned coating has a green color, and a hard panned confection coated with this same hard panned coating has a green color. In certain embodiments, the green color can be provided by the combination of a blue colorant composition, disclosed herein, and a natural yellow colorant incorporated in the coating. Examples of natural yellow colorants can include, but are not limited to, curcuminoids (e.g., from turmeric), carotenoids (e.g., from saffron and gac), annatto (e.g., from achiote) and combinations thereof. In certain embodiments, the natural yellow colorant is derived from turmeric.

In certain embodiments, the present disclosure provides edible products in the form of a hard coated confectionery product comprising a center core and at least one coating layer that comprises the colorant composition disclosed herein and crystallized sugar. For example, and not by way of limitation, the present disclosure provides a hard panned confection that comprises (a) an edible core and (b) a hard panned coating that comprises a plurality of coating layers, wherein at least one of the coating layers comprises a color composition of the present disclosure. For example, and not by way of limitation, the edible core can comprise chocolate.

5. Methods of Preparation

5.1. Fractionation of Anthocyanins

In certain embodiments, the anthocyanins of the present disclosure can be obtained from natural sources such as, but not limited to, vegetables, fruits, and flowers as disclosed above.

In certain embodiments, the anthocyanins can be present in a fraction extracted from a natural source, such as a vegetable, fruit, or flower, or juice or extract thereof. For example, the anthocyanins can be present in a fraction of a juice or extract from the natural source. The fraction can include one or more diacylated anthocyanins.

In certain embodiments, the fraction can be derived from the natural source using any suitable method known in the art. For example, and not by way of limitation, a fraction, e.g., containing a diacylated anthocyanin, can be purified from a natural source using solid phase extraction. In certain embodiments, a fraction can be purified from a natural source using semi-preparative high performance liquid chromatography (HPLC). In certain embodiments, a fraction of the present disclosure can be purified by a pH differential method. Additional methods of purification can be found in International Patent Publication No. WO 2014/152417, the disclosure of which is hereby incorporated by reference in its entirety.

In certain embodiments, the natural source can be fractionated based on the degree of acylation of the anthocyanins. For example, one or more fractions can correspond to the degree of acylation of the anthocyanins within the natural source. For example, the fractionation can result in a first fraction comprising anthocyanins having one degree of acylation, e.g., monoacylated anthocyanins, and a second fraction comprising anthocyanins having another degree of acylation, e.g., diacylated anthocyanins.

5.2. Isolation of Anthocyanins

In certain embodiments, a fraction of anthocyanins can be further purified such that one or more species of anthocyanins are isolated from other anthocyanins. For example, a fraction can include two or more, or three or more different anthocyanins, e.g., diacylated anthocyanins, that can be further isolated from each other.

In certain embodiments, an acylated anthocyanin, e.g., a diacylated anthocyanin, can be further isolated using semi-preparative high performance liquid chromatography (HPLC). Additionally or alternatively, an anthocyanin, e.g., a diacylated anthocyanin, can be further isolated using solid phase extraction. In certain embodiments, the purity of an acylated anthocyanin, e.g., a diacylated anthocyanin, of the present disclosure can be evaluated by analytic high performance liquid chromatography.

5.3. Preparation of the Colorant Compositions

In certain embodiments, the colorant compositions of the present disclosure can be prepared from one or more anthocyanins purified from a natural source, as disclosed above.

In certain embodiments, the colorant compositions, e.g., blue colorant compositions, of the present disclosure can be prepared by diluting fraction comprising at least one acylated anthocyanin, e.g., at least one diacylated anthocyanins, in a buffer solution and admixing a metal salt. For example, and not by way of limitation, an acylated anthocyanin, e.g., a diacylated anthocyanin, can be diluted to a concentration of about 50 μM in a buffer solution to generate a diluted anthocyanin composition. In certain embodiments, the buffer solution can have a pH from about 6.0 to about 8.0. In certain embodiments, a metal salt solution, as a source of metal ions, can be added to the diluted anthocyanin composition. In certain embodiments, the metal salt can be added to the diluted anthocyanin composition in concentrations from about 0.01 times to about 100 times the anthocyanin concentration to prepare the colorant composition.

The color compositions of the present disclosure can be prepared and used in any form. For example, and not by way of limitation, a color composition of the present disclosure can be liquid, crystal, paste, suspension or powder.

EXAMPLES

The presently disclosed subject matter will be better understood by reference to the following Examples, which are provided as exemplary of the invention and should not be construed as limiting the scope of the invention in any way.

Example 1—Metallo-Anthocyanin Complexes

The use and demand of alternatives for synthetic food colorants has been increasing due to possible health concerns and consumer demand. Anthocyanins are known as natural food colors responsible for reds and blues of fruits and vegetables. In acidic conditions common to foods, anthocyanins (ACNs) appear red-purple; however, self-association, co-pigmentation, and metal chelation can expand this color range to blue-purple. Metal ions (M+) can displace hydrogen ions from B-ring hydroxyl groups, transforming red cations to quinoidal anions (see, e.g., FIG. 1).

This Example shows the effect pH and the formation of metal ion complexes has on the color produced by acylated anthocyanin compounds.

Materials and Methods

Cyanidin (Cy) derivatives were purified from chokeberry and red cabbage using solid-phase extraction with a C18 resin, ethyl acetate and methanol as previously described (Rodriguez et al., 2001). Monoacylated and diacylated rich anthocyanin (ACN) fractions were isolated from red cabbage by semi-preparative high performance liquid chromatography (HPLC). The monomeric ACN were quantitated by the pH differential method and diluted to 50 concentrations in buffers ranging from pH 5-8. To each sample, $Cr^{3+}$, $Al^{3+}$, $Ga^{3+}$ or $Fe^{3+}$ salts were added in 1 times to 100 times the ACN concentration. Each sample was evaluated by UV-Visible light spectrophotometry for transmittance, and the CIE-Lab color values were calculated.

Results

Effect of Acylation on $Al^{3+}$-Anthocyanin Complexes.

Figure 2:
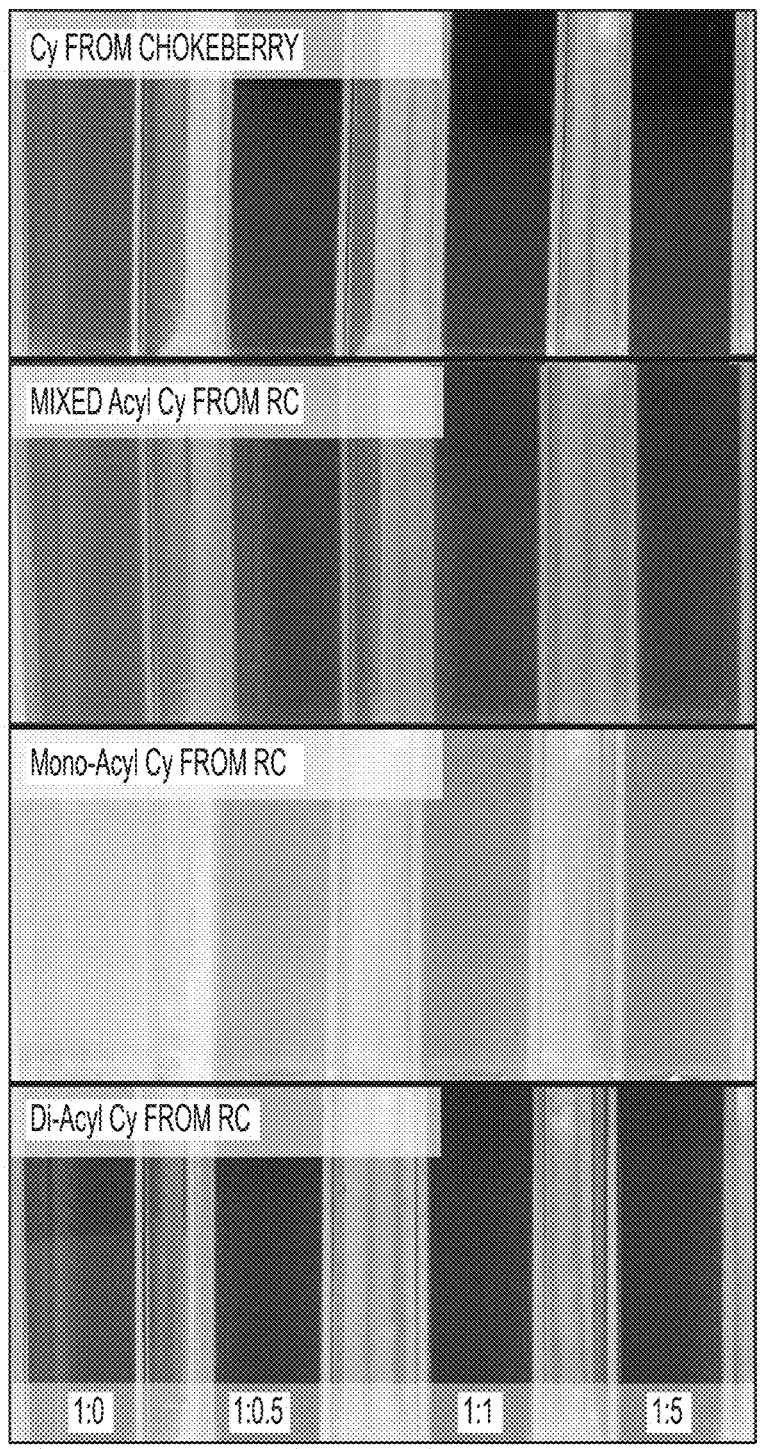
FIG. 2 shows the color of chokeberry and red cabbage anthocyanins at pH 6 in the presence of $Al^{3+}$ at a concentration of zero to 5 times the concentration of the total amount of anthocyanins.
Figure 3:
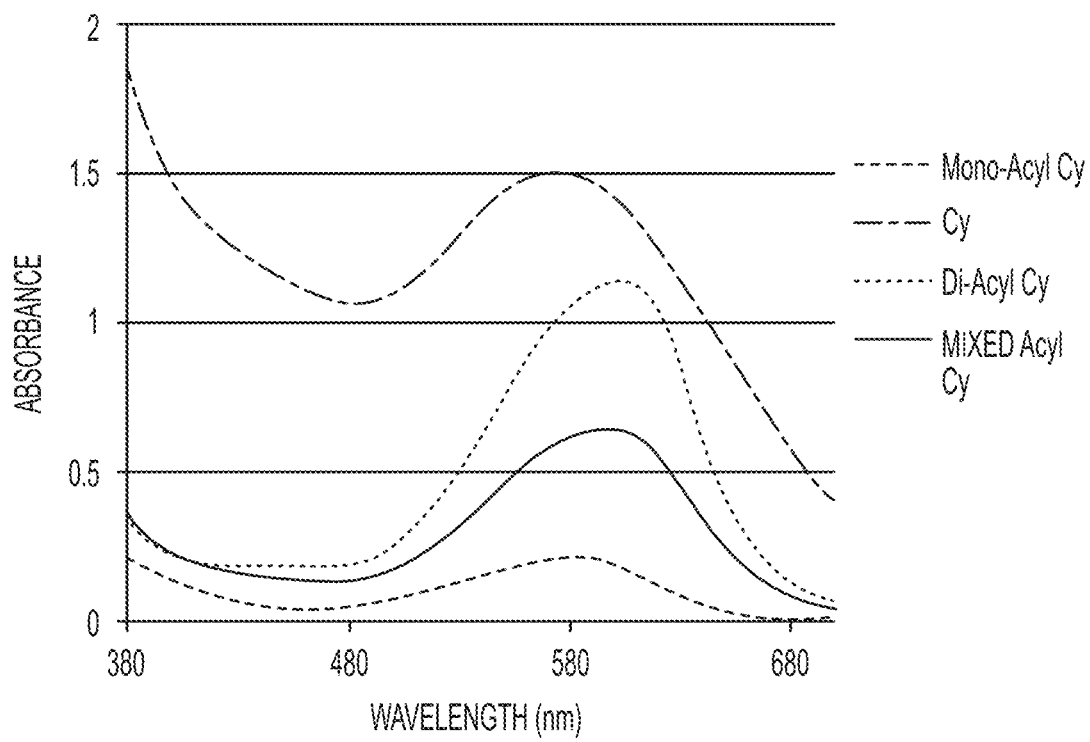
FIG. 3 shows the visible absorbance and $\lambda_{max}$ of 50 µM cyanidin (Cy) with $Al^{3+}$ at a pH of 6.
Figure 3:
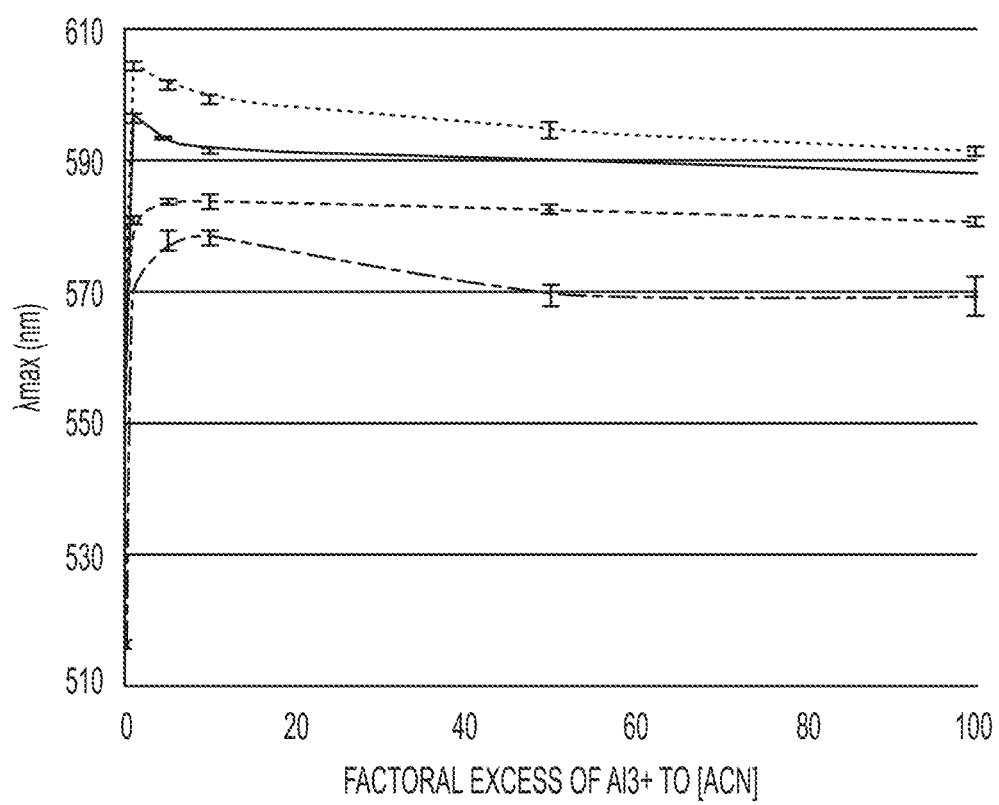
Figure 4:
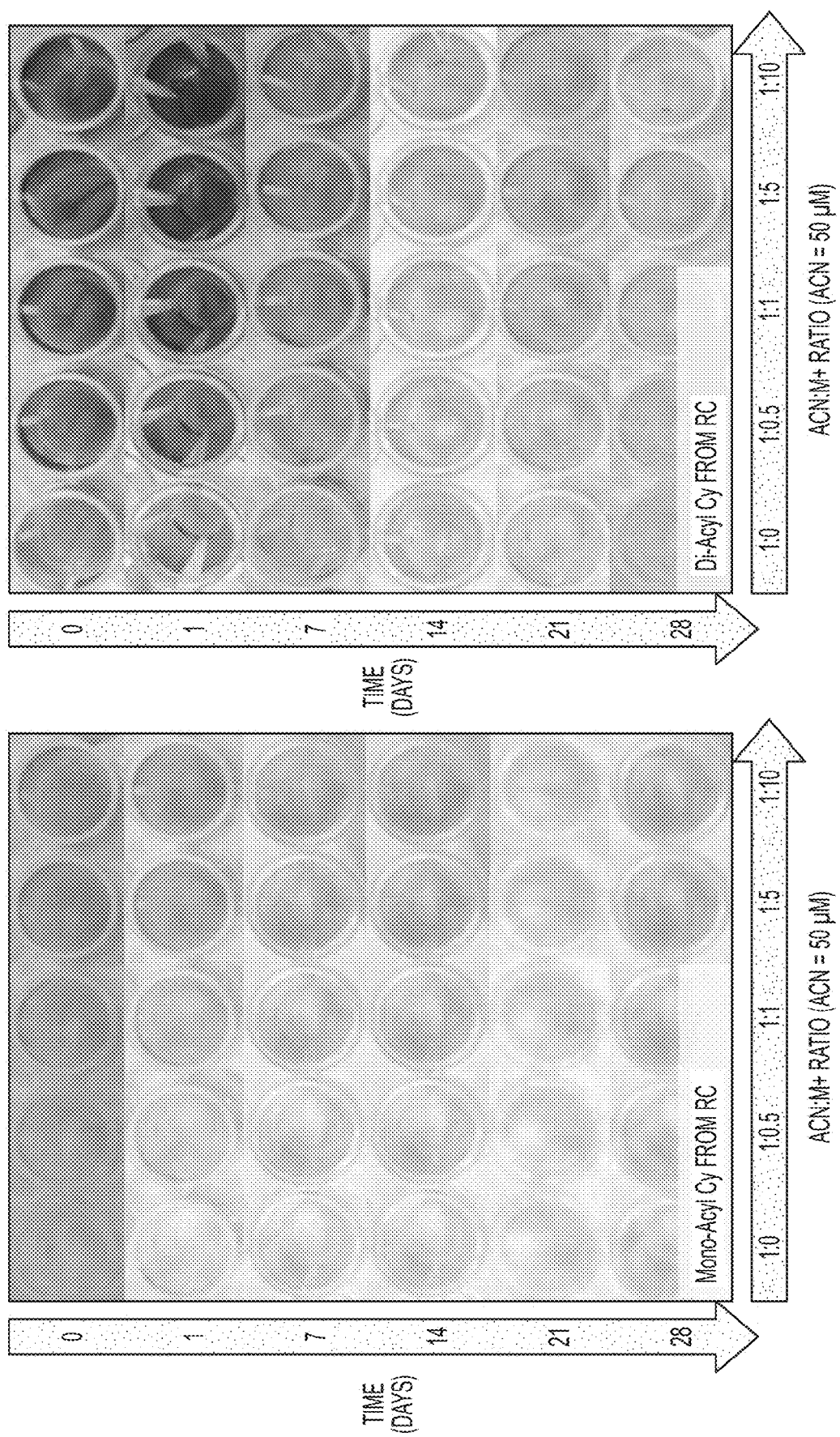
FIG. 4 shows monoacylated and diacylated red cabbage anthocyanins at a pH of 6, complexed with $Al^{3+}$ at a concentration of zero to 10 times the concentration of anthocyanins. The anthocyanins complexed with the metal ion were stored for 28 days at about 23° C.

As shown in FIG. 2, acylation of anthocyanins was determined to be important for the development of attractive blue colors similar to those of synthetic blue dyes in foods. Diacylated cyanidin (Cy) from red cabbage produced a more attractive blue color than non-acylated cyanidin from chokeberry (FIG. 2). Bathochromic shifts were greatest for Cy>Di-Acyl Cy>Mono-Acyl Cy, but $\lambda_{max}$ was still greater for acylated Cy (FIG. 3). With increasing acylation, $\lambda_{max}$ was greatest and the observed color was increasingly blue. In ACN:$Al^{3+}$ ratios of 1:1, both bathochromic and hyperchromic shifts ranged depending on pH (5-8), and were greatest for Cy (8-54 nm; 0.14-0.83, respectively) followed by diacylated Cy (12-30 nm; 0.04-0.58) followed by monoacylated Cy (2-31 nm; –0.04-0.36) (FIG. 4). The $\lambda_{max}$ increased with pH and ranged from 567-624 nm for diacylated Cy, which is greater than 552-604 nm for monoacylated Cy and 548-568 nm for Cy.

With ACN:$M^{3+}$ ratios of 1:1, the largest bathochromic and hyperchromic shifts occurred with non-acylated cyanidin (–1-62 nm)>diacylated cyanidin (–3-42 nm)>monoacylated cyanidin (11-47 nm). The $\lambda_{max}$ of these samples was highest for diacylated cyanidin>monoacylated cyanidin>cyanidin and increased with increasing pH, developing more blue colors. Largest bathochromic shifts were induced by $Fe^{3+}$ (–1-62 nm)≈$Ga^{3+}$ (–3-61 nm)>$Al^{3+}$ (–2-54 nm) but greatest change in absorbance was caused by $Al^{3+}$ or $Ga^{3+}$.

Effect of pH on $Al^{3+}$-Anthocyanin Complexes.

Figure 6:
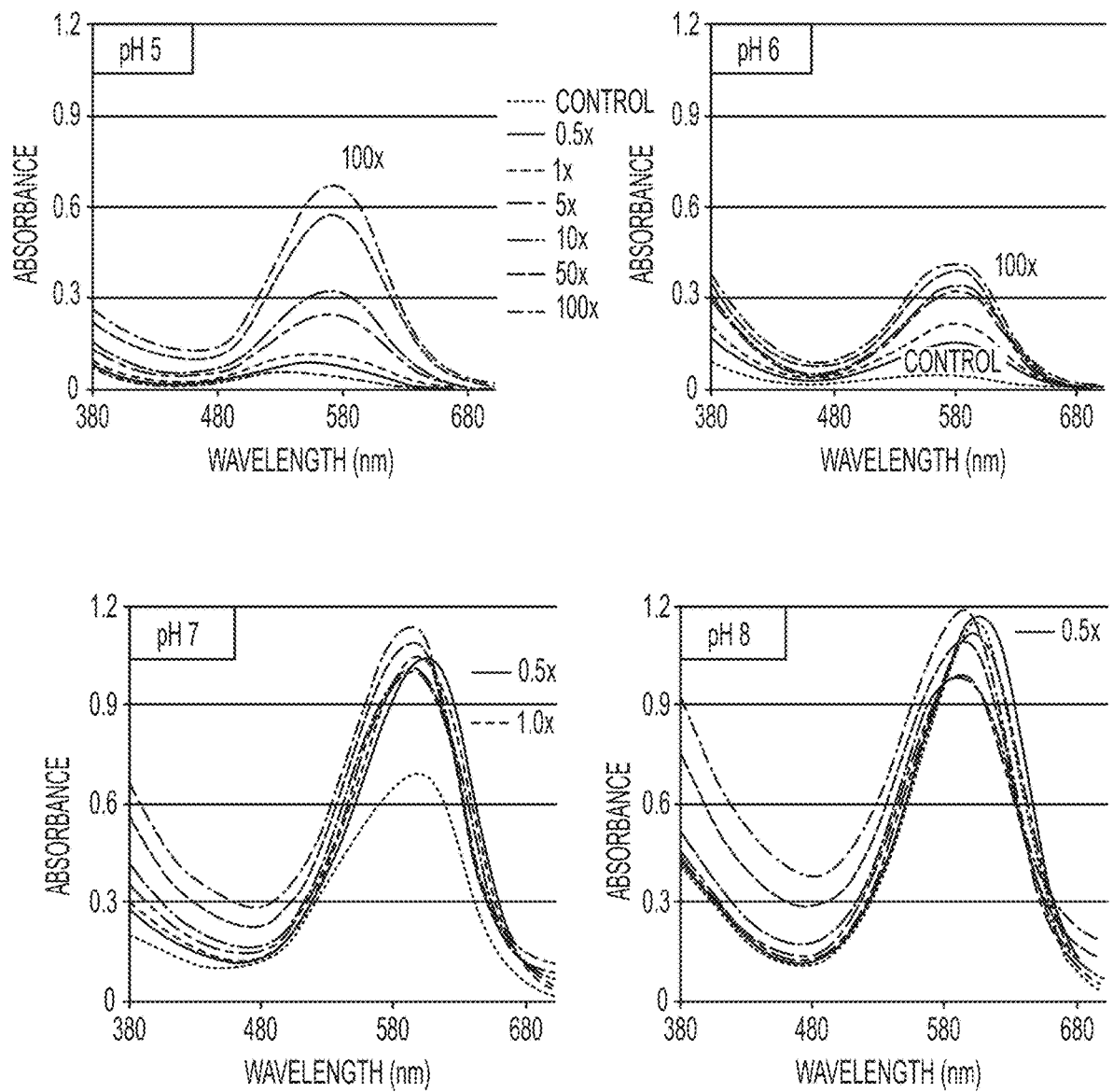
FIG. 6 shows the visible absorbance of 50 µM monoacylated red cabbage anthocyanins in buffers pH 5-8, complexed with $Al^{3+}$ zero to 100 times the concentration of the total amount of anthocyanins.
Figure 7:
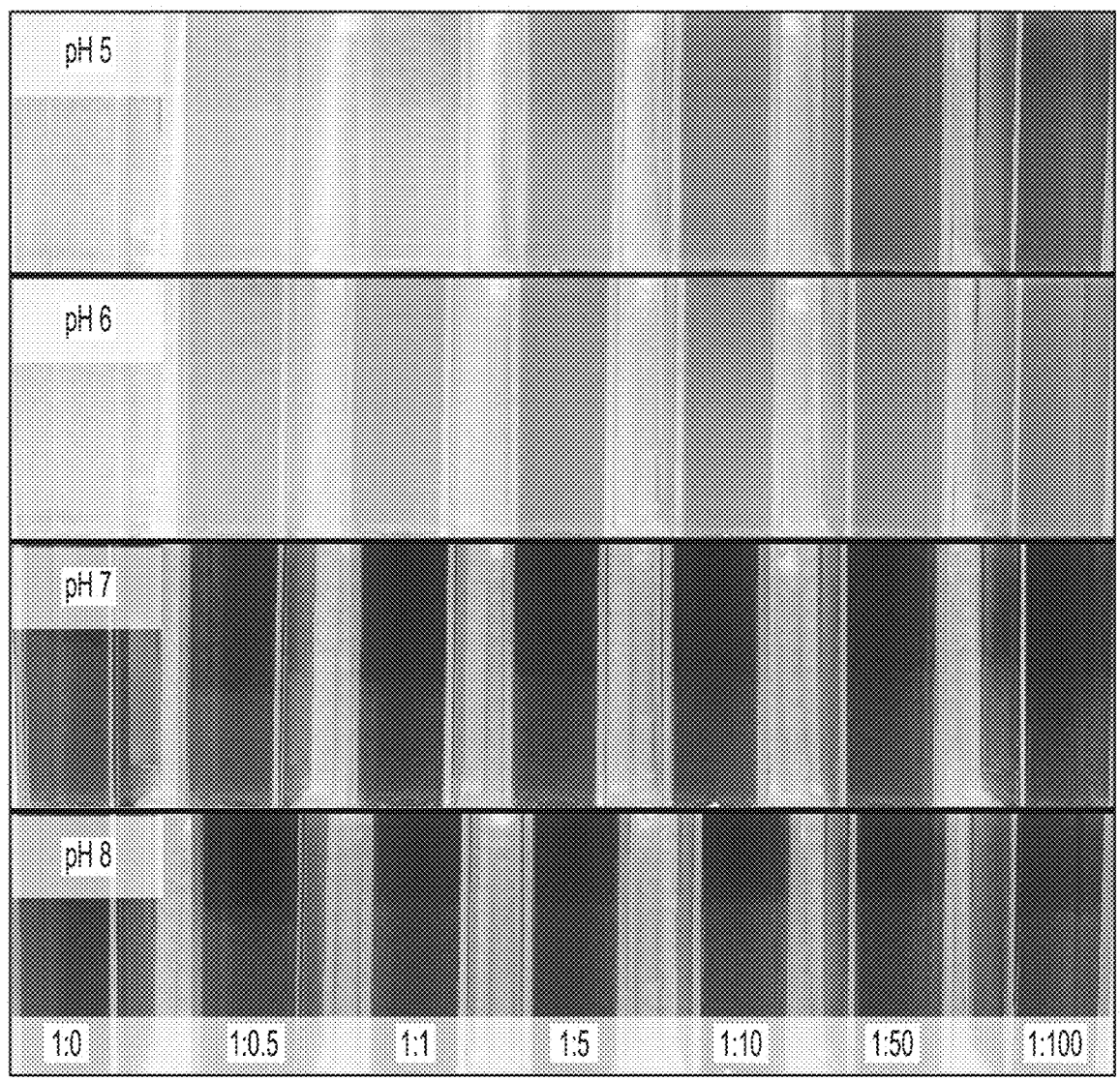
FIG. 7 shows monoacylated red cabbage anthocyanins with $Al^{3+}$ zero to 100 times the concentration of the total amount of anthocyanins.
Figure 8:
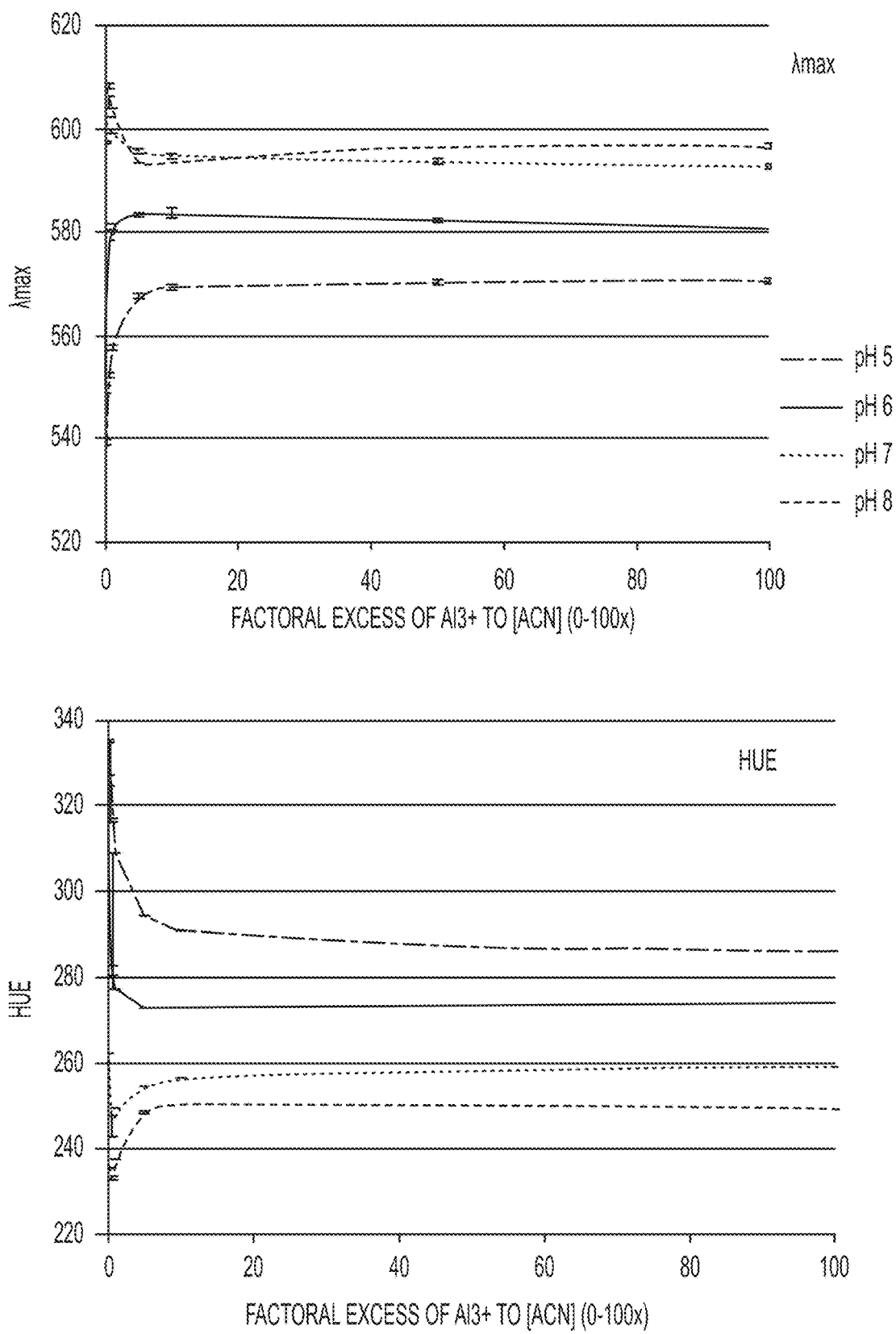
FIG. 8 shows the $\lambda_{max}$ and hue of monoacylated red cabbage anthocyanins with $Al^{3+}$ 0-100 times the concentration of the total amount of anthocyanins.

Increasing the pH of the samples led to larger $\lambda_{max}$ (hues became more blue) but decreased bathochromic shift induced by the metal ion ($M^{3+}$). By increasing the pH of the samples, lower concentrations of $M^{3+}$ ([$M^{3+}$]) were needed for bluing effect (FIGS. 6-8). Hypsochromic effects occurred with large [$M^{3+}$] with increasing pH and absorbance was increased with [$M^{3+}$] chelation. Precipitation occurred with increasing pH and [$M^{3+}$].

Effect of pH on Other [$M^{+3}$]-Anthocyanin Complexes.

The $\lambda_{max}$ of the samples was also dependent on $M^{3+}$ structure. Increased $M^{3+}$ electron density promoted larger bathochromic shifts and $\lambda_{max}$. The largest bathochromic shifts were induced by $Fe^{3+}$ (–1-62 nm)≈$Ga^{3+}$ (–3-61 nm)>$Al^{3+}$ (–2-54 nm) with $\lambda_{max}$ greatest for ACN-$Fe^{3+}$>$Ga^{3+}$>$Al^{3+}$. The greatest change in absorbance was caused by $Al^{3+}$ or $Ga^{3+}$.

Stability.

Figure 5:
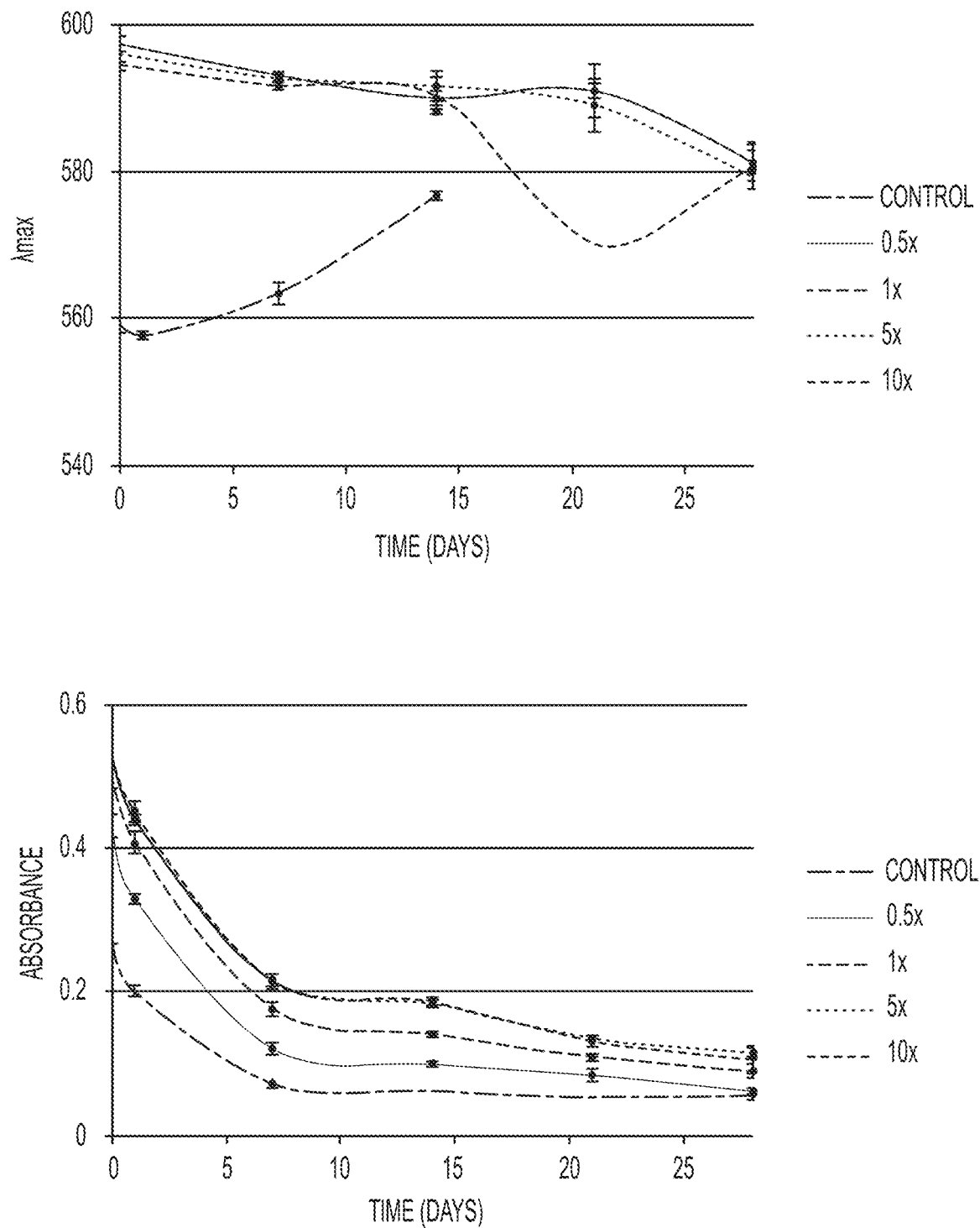
FIG. 5 shows the $\lambda_{max}$ and absorbance of diacylated red cabbage anthocyanins, pH 6, in the presence of $Al^{3+}$ 0-10 times the concentration of anthocyanins and stored for 28 days.

With increasing degree of acylation, the pigments were found to exhibit more intense color for longer periods of time. Metal chelation by anthocyanins not only allowed for development of blue colors by anthocyanins at lower pH than naturally occurring but also provided beneficial effects on the color stability of these pigments. Although $\lambda_{max}$ and absorbance decreased over time, anthocyanin color stability was increased in the presence of $M^{3+}$ (FIG. 4). As shown in FIG. 4, at a pH of 6.0, anthocyanin color stability was shown to increase with increasing [$M^{3+}$]. At a pH of 6.0, highest color intensity was maintained with [$M^{3+}$]≥5×[ACN] (FIG. 5). Interestingly, the anthocyanin-$M^{3+}$ precipitates showed higher stability than the pigments in solution.

Conclusion

The pH environment, metal ion and anthocyanin structure affected the color of anthocyanin-$M^{3+}$ chelates. In the presence of the $M^{3+}$, anthocyanin samples underwent bathochromic and hyperchromic shifts in absorbance, becoming bluer and more intensely colored. Acylation of anthocyanins was found to be important for the development of blue colors similar to synthetic counterparts. Although the largest bathochromic and hyperchromic shifts occurred with non-acylated cyanidin>diacylated cyanidin>monoacylated cyanidin, diacylated cyanidins consistently created bluer colors than either non-acylated or monoacylated cyanidins. Increasing pH from 5-8 led to the development of more blue colors as $\lambda_{max}$ increased with pH, reducing the amount of $M^{3+}$ necessary to achieve blue colors. $\lambda_{max}$ of ACN-$M^{+3}$ was greatest for diacylated cyanidin>monoacylated cyanidin>cyanidin. Increasing degree of acylation and the presence of $M^{3+}$ improved the longevity of the pigment in terms of intensity and desirable color formation. The anthocyanin-$M^{3+}$ chelates based pigments developed in this Example showed desirable hues with increased stability that could act as alternatives to synthetic blue colorants.

Example 2—Effects of Degree and Structure of Acylation

Anthocyanins (ACN) are a versatile class of naturally occurring pigments that produce red-purple-blue hues in nature. The pH conditions of many food products result in ACN typically appearing red-purple. However, through metal ion chelation and molecular co-pigmentation, ACN can express blue-purple colors.

This Example shows the effect of the degree and structure of acylation, as intramolecular co-pigments, on the spectral responses and stability of metallo-anthocyanin complexes.

Materials and Methods

Non-, mono-, and di-acylated cyanidin (Cy) derivatives were isolated from food sources by semi-preparative high performance liquid chromatography (HPLC). The monomeric ACN were diluted to 50 µM concentrations in buffers ranging of pH 6 and 7. To each sample, $Al^{3+}$ or $Fe^{3+}$ salts were added in 1 times to 5 times the ACN concentration. Each sample was evaluated by UV-Visible light spectrophotometry for transmittance (380-700 nm), and the CIE-Lab color values were calculated during dark, ambient storage (48 hours).

Results pH.

At a pH of 6 with equimolar $Al^{3+}$ ratios, the $\lambda_{max}$ (nm) of the tested samples were as follows: malonic acid monoacylated Cy (563 nm)<triglycosylated Cy (576 nm)<monoacylated with hydroxycinnamic acids (sinapic (579 nm)<coumaric (580 nm)<ferulic (583 nm))<diacylated Cy (sinapic-sinapic (596 nm)>ferulic-sinapic (609 nm)>p-coumaric-sinapic (610 nm)). Similar patterns were observed at pH 7 regarding $\lambda_{max}$ and also with the bathochromic shifts induced by metal chelation.

[$M^{+3}$]-Anthocyanin Complexes.

With metals ($Al^{3+}$ or $Fe^{3+}$), all ACN became increasingly purple and blue. Diacylated Cy showed the most blue colors. At pH of 7, all ACN showed blue hues (negative a* and b* values), with the exception of Cy bearing aliphatic acylation which expressed a*=1.0 and b*=−16.4.

Stability. Degradation of ACN-metal chelates was found to follow $1^{st}$ order kinetics. Pigment stability was improved with increasing proportion of metal ions and degree of acylation. At pH of 7, the half-lives (hr) of $Al^{3+}$ chelates (5×[ACN]) were as follows: diacylated Cy (p-coumaric-sinapic (149.1 hr)>ferulic-sinapic (40.2 hr)≈sinapic-sinapic (41.0 hr))>monoacylated (malonic (62.4 hr)>ferulic (52.9 hr)>sinapic (31.9 hr)>p-coumaric (22.5 hr)).

Conclusion

Metal chelation induced color evolution of ACN towards more purple and blue hues. Stability of these naturally occurring pigments was also increased, fulfilling current demands for alternatives to synthetic colorants.

REFERENCES

Yoshida K, Mihoko M, Kondo T. 2009. Blue flower color development by anthocyanins: from chemical structure to cell physiology. Nat Prod Rep 26(7):857-964.

Takeda K, Yamashita T, Takahashi A, Timberlake C F. 1990. Stable blue complexes of anthocyanin-aluminum-3-p-coumaroyl- or 3-caffeoyl-quinic acid involved in the blueing of *Hydrangea* flower. Phytochemistry 29(4): 1089-91.

Schreiber H D, Swink A M, Godsey T D. 2010. The chemical mechanism for Al3+ complexing with delphinidin: A model for the bluing of *hydrangea* sepals. J Inorg Biochem 104: 732-9.

Bayer E, Egeter H, Fink A, Nether K, Wegman K. 1966. Complex Formation and Flower Color. Angew Chem Interna Edit 5(9):797-8.

Buchweitz M, Carle R, Kammerer D R. 2012. Bathochromic and stabilizing effects of sugar beet pectin and an isolated pectic fraction on anthocyanins exhibiting pyrogallol and catechol moieties. J Food Chem 135:3010-9.

Rodriguez-Saona L E, Wrolstad R E. 2001. Extraction, Isolation, and Purification of Anthocyanins. In Handbook Food Anal Chem. Ed R E Wrolstad, S J Schwartz. N.Y., USA: John Wiley and Sons, Inc. 7-18.

Giusti, M M; Wrolstad, R E. 2005. Characterization and measurement of anthocyanins by UV-visible spectroscopy. In Handbook Food Anal Chem. Ed R E Wrolstad, S J Schwartz. N.Y., USA: John Wiley and Sons, Inc. 19-31.

Example 3—Metallo-Anthocyanin Complexes with Red Cabbage Extract

Anthocyanins are known to be present within red cabbage extract, which can be used to produce red to blue-purple natural colorants. As described above, metal ions (M+) can displace hydrogen ions from B-ring hydroxyl groups in anthocyanins, transforming red cations to quinoidal anions (see, e.g., FIG. 1).

This Example shows the effect pH and the formation of metal ion complexes has on the color produced by anthocyanin compounds as compared to FD&C Blue No. 1.

Materials and Methods

Red cabbage extract was diluted to an anthocyanin concentration of 50 µM in a buffer solution to a pH ranging from 3 to 8. For solutions having a pH from 3 to 6, a sodium acetate buffer solution was used. For solutions having a pH from 7 to 8, a Tris(hydroxymethyl)-aminomethane buffer solution was used.

Four different metal salts were added to the solutions at various concentrations: $Al_2(SO_4)_3$, $FeCl_3$, $GaCl_3$, and $CrCl_3$. The ratio between the anthocyanin concentration and the metal ion (i.e., $Al^{3+}$, $Fe^{3+}$, $Ga^{3+}$, or $Cr^{3+}$) concentration ranged from 1:0 to 1:500.

The CIELAB L*a*b* and CIELCH L*C*h° values for the solutions were calculated from spectral data obtained from a Konica Minolta Spectrophotometer CM-3500d operated in transmittance mode, with CIE Standard Illuminant D65 and 10° observer angle. The ΔE values described in this Example are as compared to FD&C Blue No. 1 in an aqueous solution at a concentration of from 5 ppm to 10 ppm, and calculated using the methods described above.

Results pH.

Figure 9:
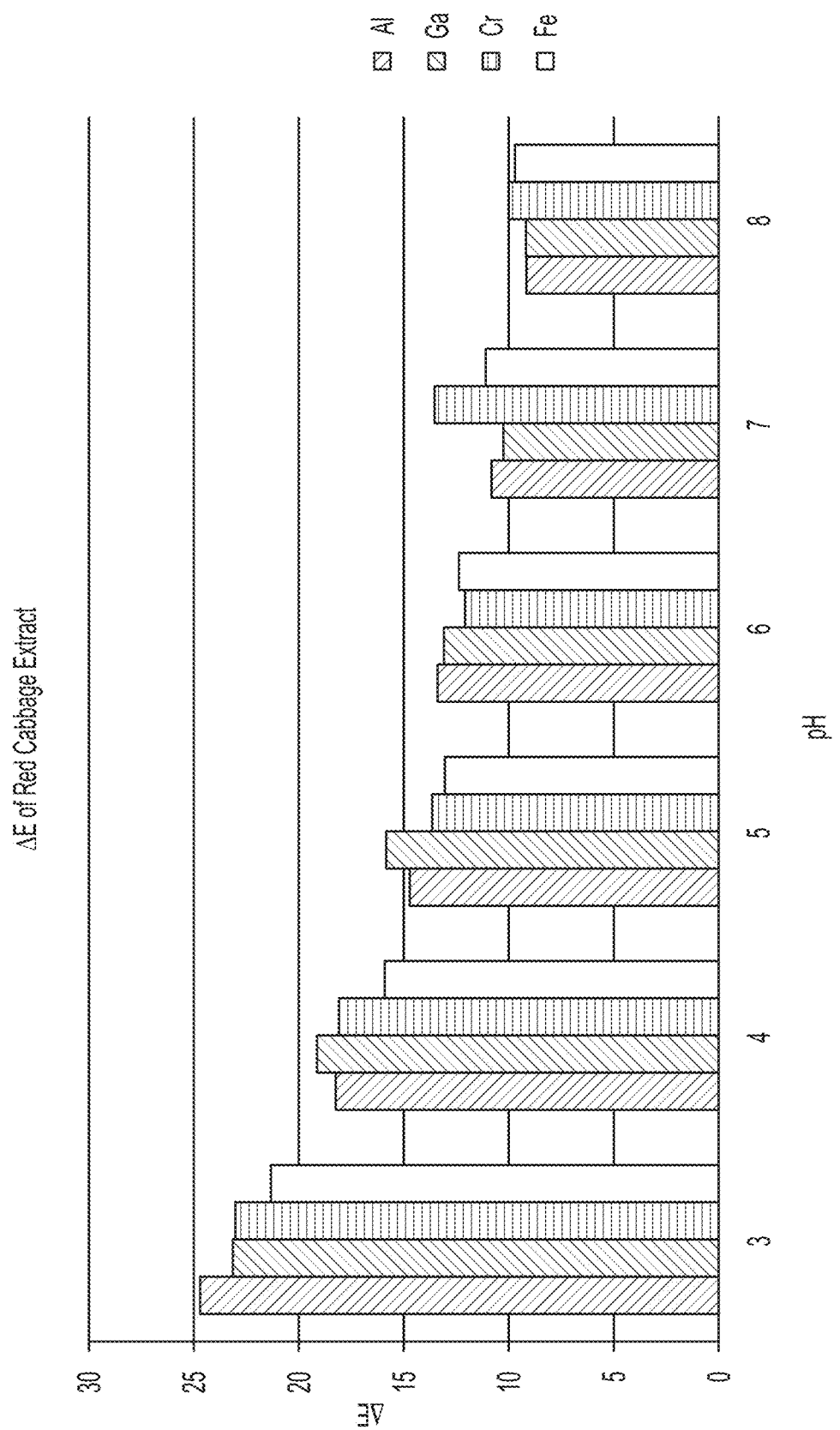
FIG. 9 depicts the calculated ΔE of red cabbage extract in a solution having pH from 3 to 8 with various metal ions ($Al^{3+}$, $Ga^{3+}$, $Cr^{3+}$, and $Fe^{3+}$) at a concentration equimolar to the concentration of anthocyanins in the red cabbage extract.

In general, increasing the pH from 3 to 8 was found to decrease the ΔE across all metal ions. A pH from about 6 to about 8 yielded the lowest ΔE, with a pH of 7 or 8 resulting in particularly low ΔE values. At a pH of 7 and an equimolar ratio between the anthocyanin concentration and the metal ion concentration, the ΔE of the tested samples were as follows: $Ga^{3+}$ (10.25)<$Al^{3+}$ (10.82)<$Fe^{3+}$ (11.08)<$Cr^{3+}$ (13.53). At a pH of 8 and an equimolar ratio, the ΔE of the tested samples were as follows: $Al^{3+}$ (9.16)<$Ga^{3+}$ (9.18)<$Fe^{3+}$ (9.71)<$Cr^{3+}$ (9.99). These data are shown in FIG. 9, along with ΔE values for solutions having a pH from 3 to 6 and an equimolar ratio.

[$M^3$].

Figure 10:
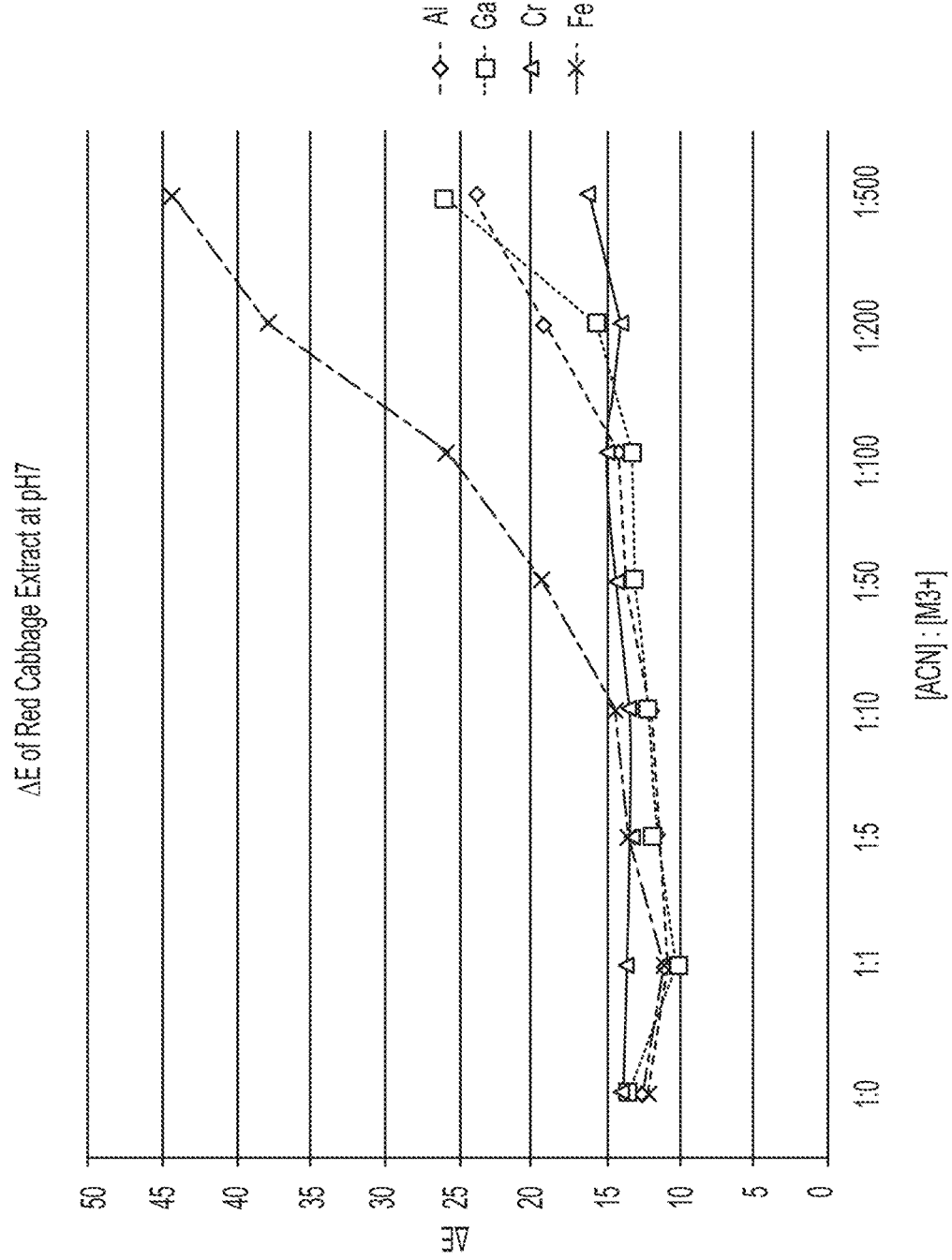
FIG. 10 depicts the calculated ΔE of red cabbage extract in a solution having pH of 7 with various metal ions ($Al^{3+}$, $Ga^{3+}$, $Cr^{3+}$, and $Fe^{3+}$) at a concentration from zero to 500 times concentration of anthocyanins in the red cabbage extract.

A lower concentration of metal ions was generally found to decrease ΔE. As shown in FIG. 10, ΔE was decreased when the concentration of metal ions ([$M^{3+}$]) was lower relative to the concentration of anthocyanins ([ACN]), particularly for $Ga^{3+}$, $Fe^{3+}$, and $Al^{3+}$. Moreover, at these lower concentrations, $Ga^{3+}$, $Fe^{3+}$, and $Al^{3+}$ had improved ΔE values as compared to $Cr^{3+}$.

Conclusion

The color characteristics of anthocyanins can be induced towards more purple and blue hues by selecting a particular metal ion, increasing the pH, or decreasing metal ion concentration. Trivalent metal ions, such as $Ga^{3+}$, $Fe^{3+}$, and $Al^{3+}$ can be used in a metallo-anthocyanin complex, for example, at a pH from about 6 to about 8, to achieve color characteristics similar to FD&C Blue No. 1.

Example 4—Metallo-Anthocyanin Complexes with Fractionation of Red Cabbage Extract As described above in Example 2, anthocyanins having a diacylated structure were found to produce a desirable blue color characteristics.

This Example shows the effect pH and the formation of metal ion complexes has on the color produced by such diacylated anthocyanin compounds as compared to FD&C Blue No. 1.

Materials and Methods

A concentrated red cabbage extract (with an anthocyanin concentration of >150 mg cy-3-glu/L) was fractionated based on anthocyanin structure. A Shimadzu LC (Shimadzu Corporation, Tokyo, Japan) system consisting of a SIL-20A prominence auto sampler and a SPD-M20A photo diode array detector (PDA) was used. The column oven and auto sampler were set at room temperature. A Sun Fire Prep C18 OBD 5 µm column (19×100 mm, Waters Corp., MA, USA) was used. The chromatographic conditions were set as follows: flow rate of 12 mL/min; mobile phase A was 4.5% formic acid in LCMS grade water; B was LCMS acetonitrile; gradient of 0-15 min, 9-25% B; 15-20 min, 25-100% B; 20-25 min, 100% B. Injection volume was 2000 µL.

Two fractions (a first with $\lambda_{max}$ of about 520 nm and a second with $\lambda_{max}$ of about 530 nm), each containing three peaks, were collected one at a time. The procedure was performed manually. The fractions containing the 520 nm and 530 nm peaks were collected between 11.50-12.50 min and 12.82-13.86 min, respectively. Spectral data and peaks elusions were monitored at 520 nm using a LC solution software.

The fractions were diluted to an anthocyanin concentration of 50 µM in a buffer solution to a pH ranging from 6 to 8. For a pH of 6, a sodium acetate buffer was used. For a pH of 7 or 8, a potassium phosphate buffer was used. The fractions were chelated with $Fe^{3+}$ at concentrations from zero ("control") to one times ("equimolar" or "1×") the anthocyanin concentration. The fractions were also chelated with $Al^{3+}$ at concentrations from zero ("control") to 100 times ("100×") the anthocyanin concentration. The CIELAB L*a*b* and CIELCH L*C*h° values for the solutions were calculated as described in connection with Example 3. The $\Delta E$ values described in this Example are as compared to FD&C Blue No. 1 in an aqueous solution at a concentration of from 50 ppm to 100 ppm, and calculated using the methods described above.

Figure 11A:
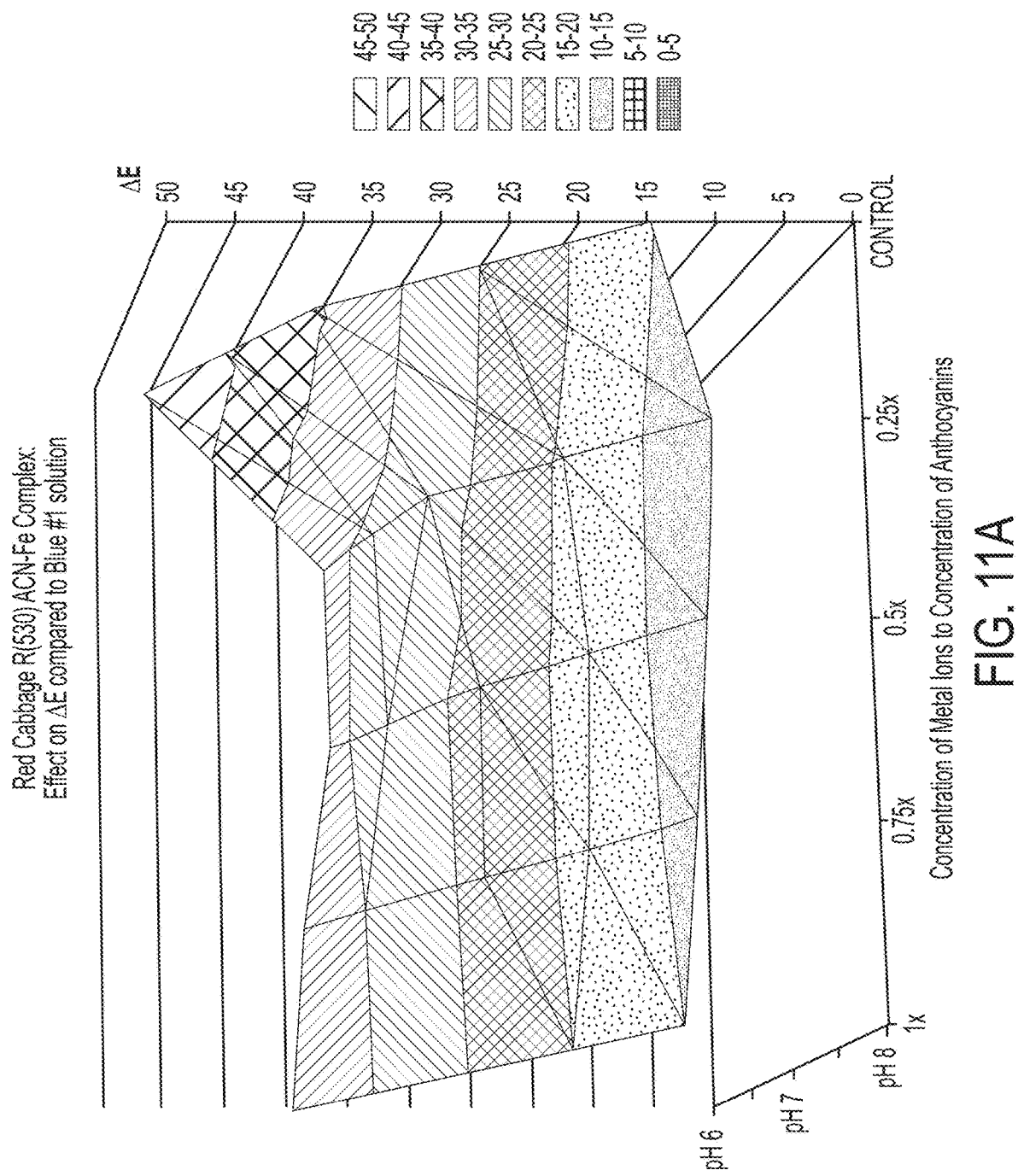
FIGS. 11A-11C provide three-dimensional depictions of color characteristics based on pH and metal ion concentration for $Fe^{3+}$ chelates, where
Figure 11B:
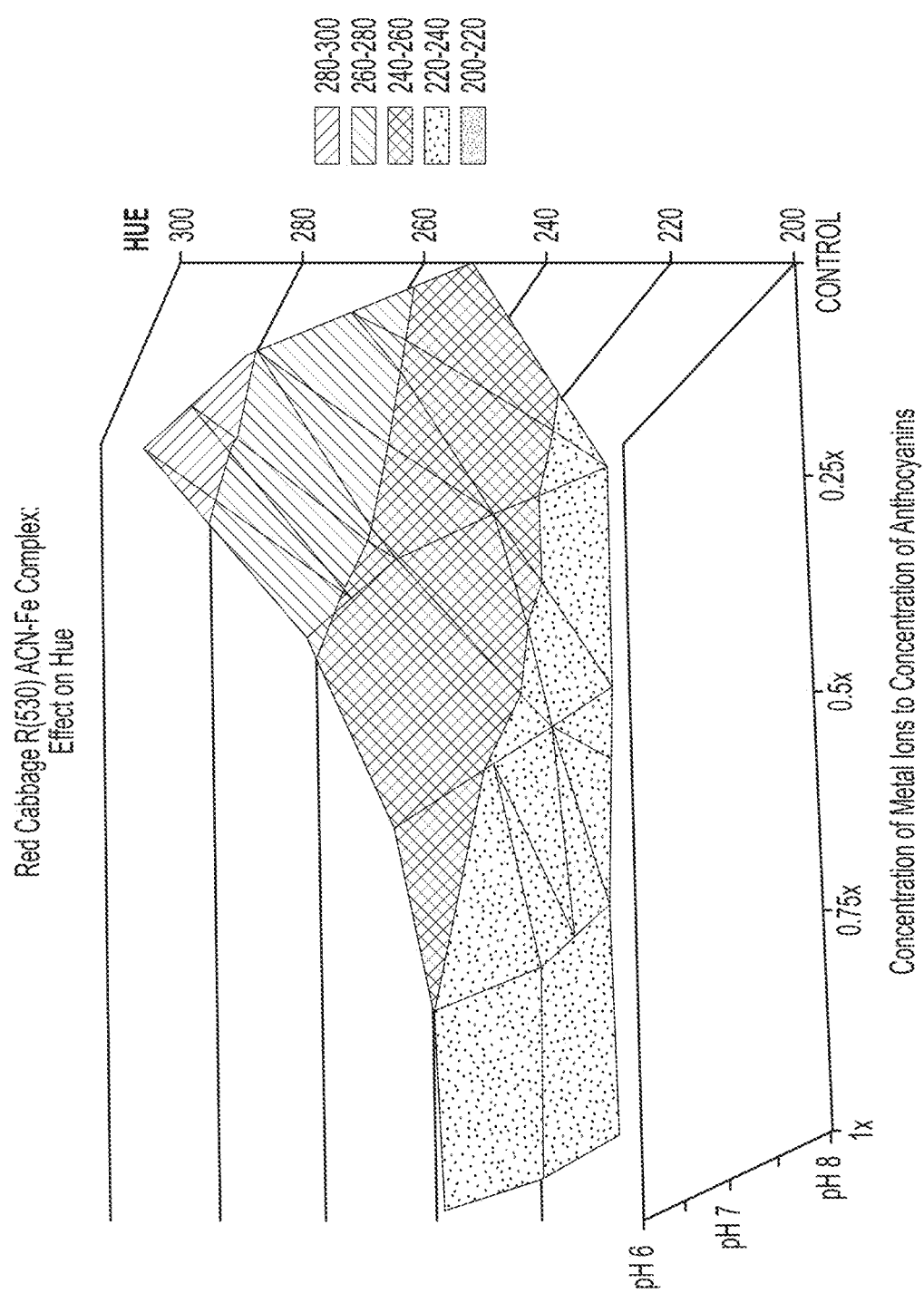
Figure 11C:
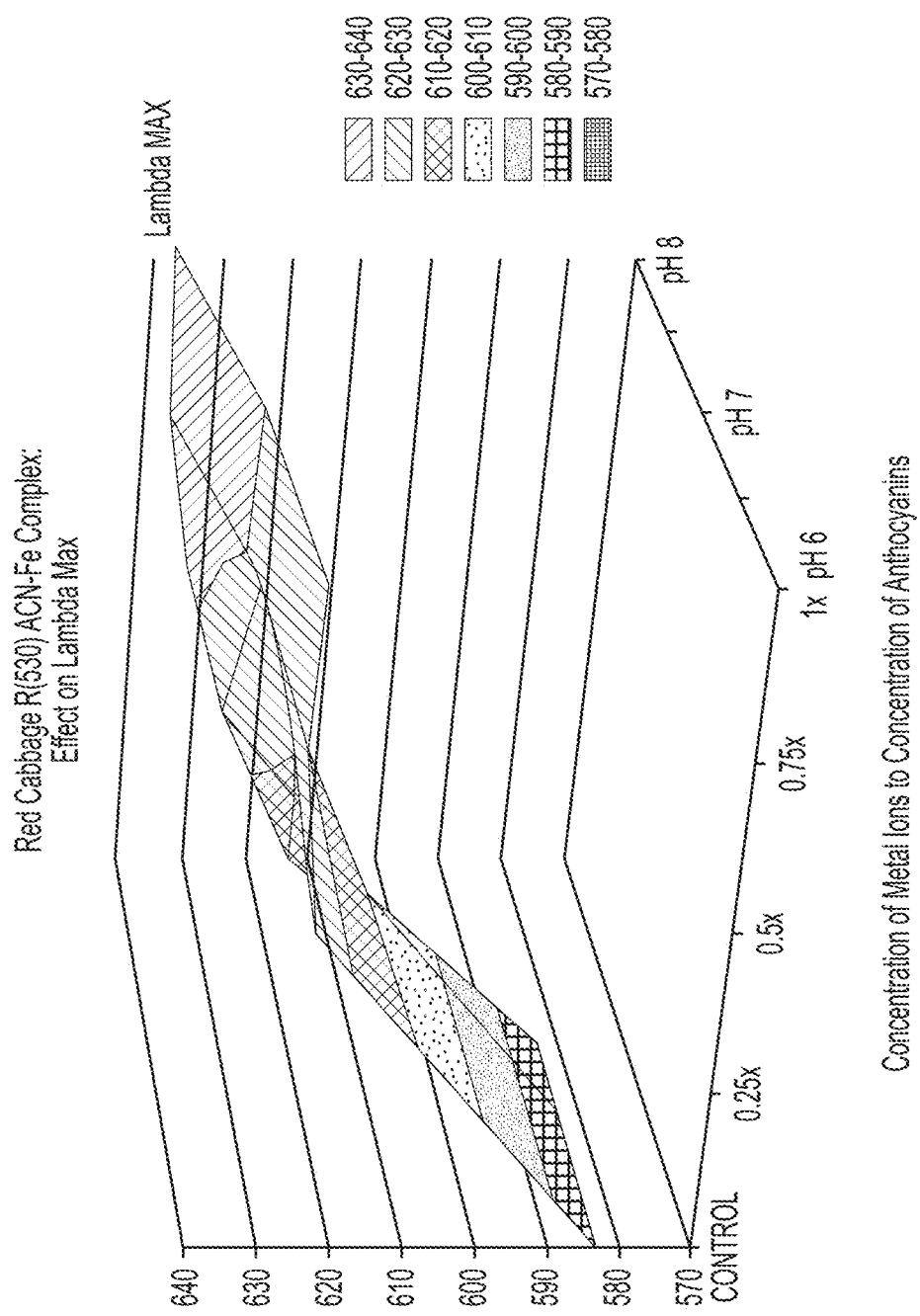

Results $Fe^{3+}$ metal ions. Tables 2-4 below show the effect $\Delta E$, Hue (h°), and $\lambda_{max}$, respectively, for metallo-anthocyanin complexes with $Fe^{3+}$ and diacylated anthocyanins at various pH values and concentrations. These data are also presented in three-dimensions in FIGS. 11A-11C. A pure blue has a hue angle of 270, and FD&C Blue No. 1 has a hue angle from about 210 to about 230 when in solution. Additionally, FD&C Blue No. 1 has a $\lambda_{max}$ of 630 nm, and ideally a natural blue colorant composition will have a similar $\lambda_{max}$.

TABLE 2

$\Delta E$ for $Fe^{3+}$ chelated diacylated anthocyanins.

| | Concentration ([Fe$^{3+}$]:[ACN]) | | | | |
|---|---|---|---|---|---|
| pH | Control | 0.25x | 0.5x | 0.75x | 1x |
| 6 | 45.3 | 31.2 | 30.9 | 33.4 | 34.5 |
| 6.5 | 40.6 | 29.1 | 27.2 | 28.5 | 29.5 |
| 7 | 35.9 | 27.0 | 23.6 | 23.6 | 24.5 |
| 7.5 | 25.6 | 19.2 | 17.8 | 18.4 | 19.7 |
| 8 | 15.3 | 11.4 | 11.9 | 13.3 | 14.9 |

TABLE 3

Hue for $Fe^{3+}$ chelated diacylated anthocyanins

| | Concentration ([Fe$^{3+}$]:[ACN]) | | | | |
|---|---|---|---|---|---|
| pH | Control | 0.25x | 0.5x | 0.75x | 1x |
| 6 | 292 | 262 | 246 | 239 | 239 |
| 6.5 | 287 | 259 | 243 | 236 | 236 |
| 7 | 281 | 256 | 239 | 233 | 234 |
| 7.5 | 267 | 244 | 236 | 234 | 234 |
| 8 | 253 | 233 | 233 | 235 | 235 |

TABLE 4

$\lambda_{max}$ for $Fe^{3+}$ chelated diacylated anthocyanins.

| | Concentration ([Fe$^{3+}$]:[ACN]) | | | | |
|---|---|---|---|---|---|
| pH | Control | 0.25x | 0.5x | 0.75x | 1x |
| 6 | 583 | 605 | 626 | 629 | 628 |
| 6.5 | 583 | 608 | 624 | 629 | 629 |
| 7 | 583 | 610 | 621 | 629 | 630 |
| 7.5 | 598 | 618 | 627 | 633 | 634 |
| 8 | 613 | 625 | 632 | 636 | 637 |

In general, increasing the pH from 6 to 8 was found to decrease the $\Delta E$ for $Fe^{3+}$ chelated anthocyanins. The solutions having a pH of 8 had the lowest $\Delta E$ across all concentrations.

A lower concentration of metal ions was generally found to decrease $\Delta E$, depending on the pH. For example, for $Fe^{3+}$ at a pH of 8, the relative $\Delta E$ of the tested samples were as follows: 0.25×<0.5×<0.75×<1×<Control.

Figure 12:
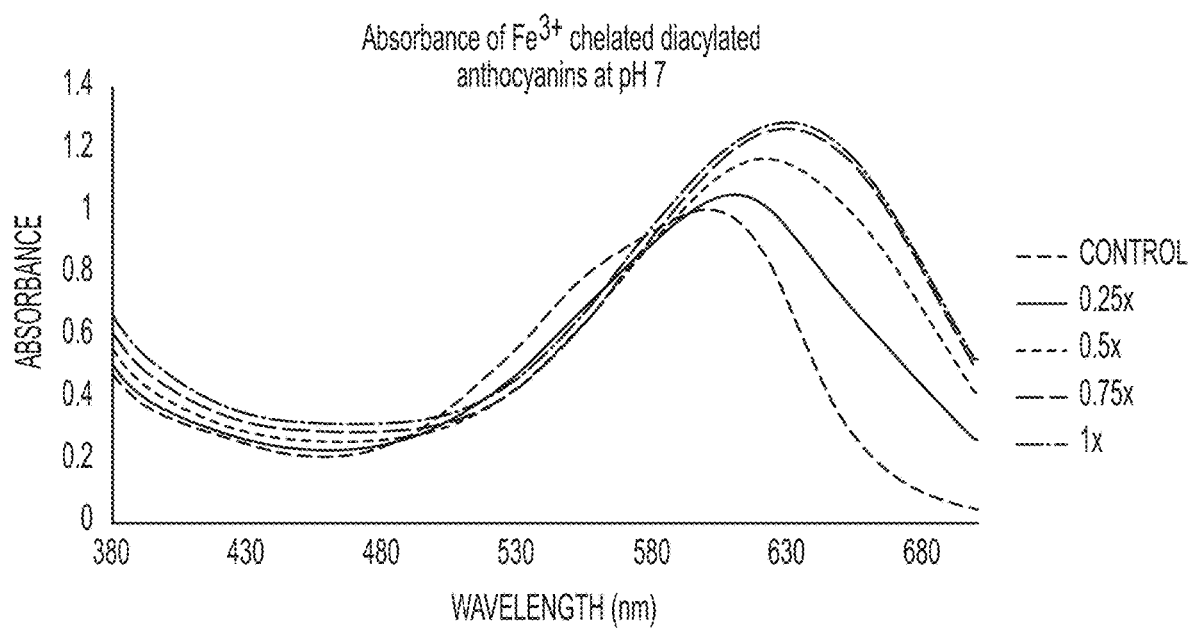
FIG. 12 depicts absorbance for $Fe^{3+}$ chelated anthocyanins with metal ion concentrations of zero to one times the anthocyanin concentration at a pH of 7.

Moreover, the additional of $Fe^{3+}$ metal ions at various concentrations was found to create bathochromic and hyperchromic shifts in absorbance, resulting in bluer and more intense colors relative to the control (FIG. 12).

$Al^{3+}$ Metal Ions.

Figure 14A:
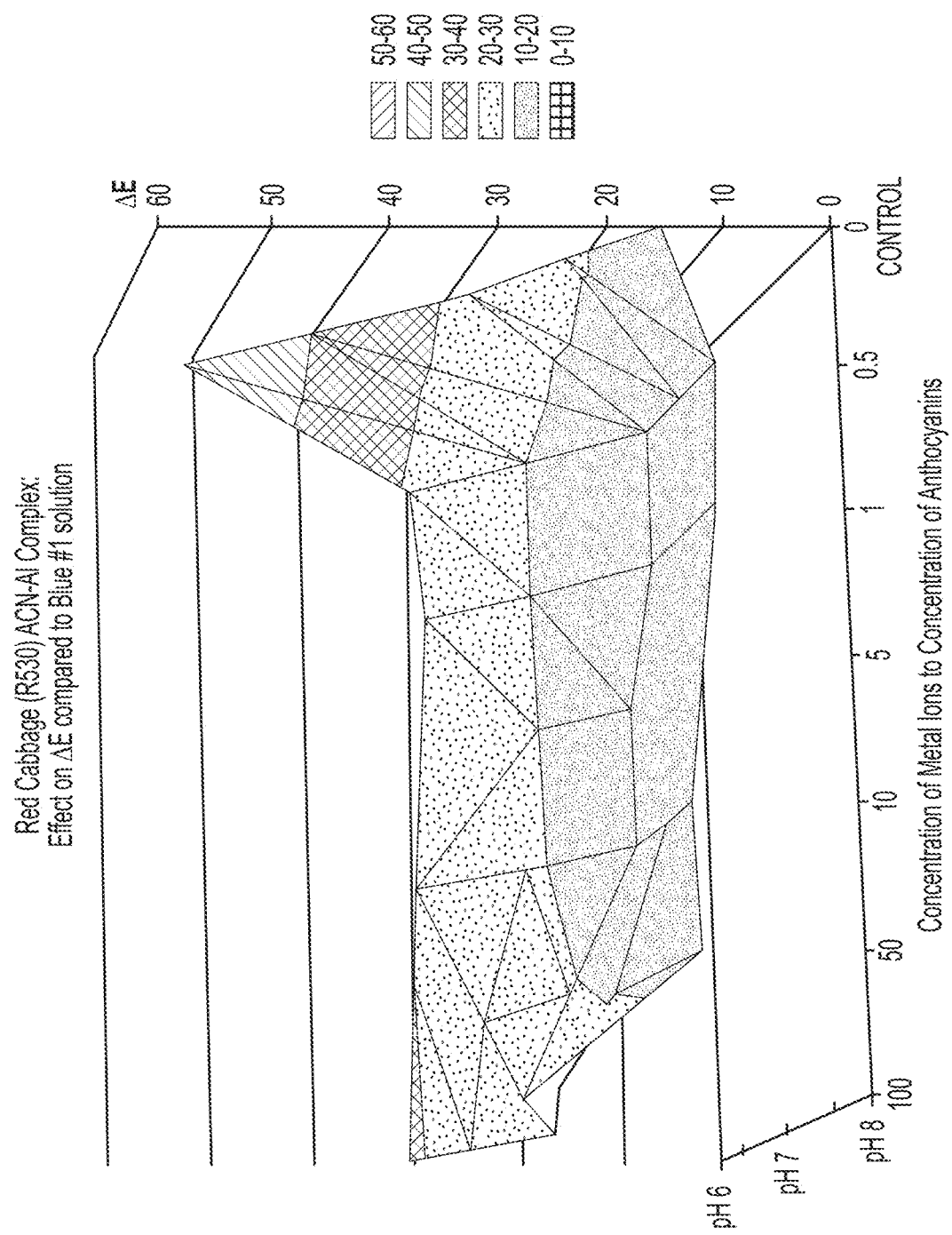
FIGS. 14A-14C provide three-dimensional depictions of color characteristics based on pH and metal ion concentration for $Al^{3+}$ chelates, where
Figure 14B:
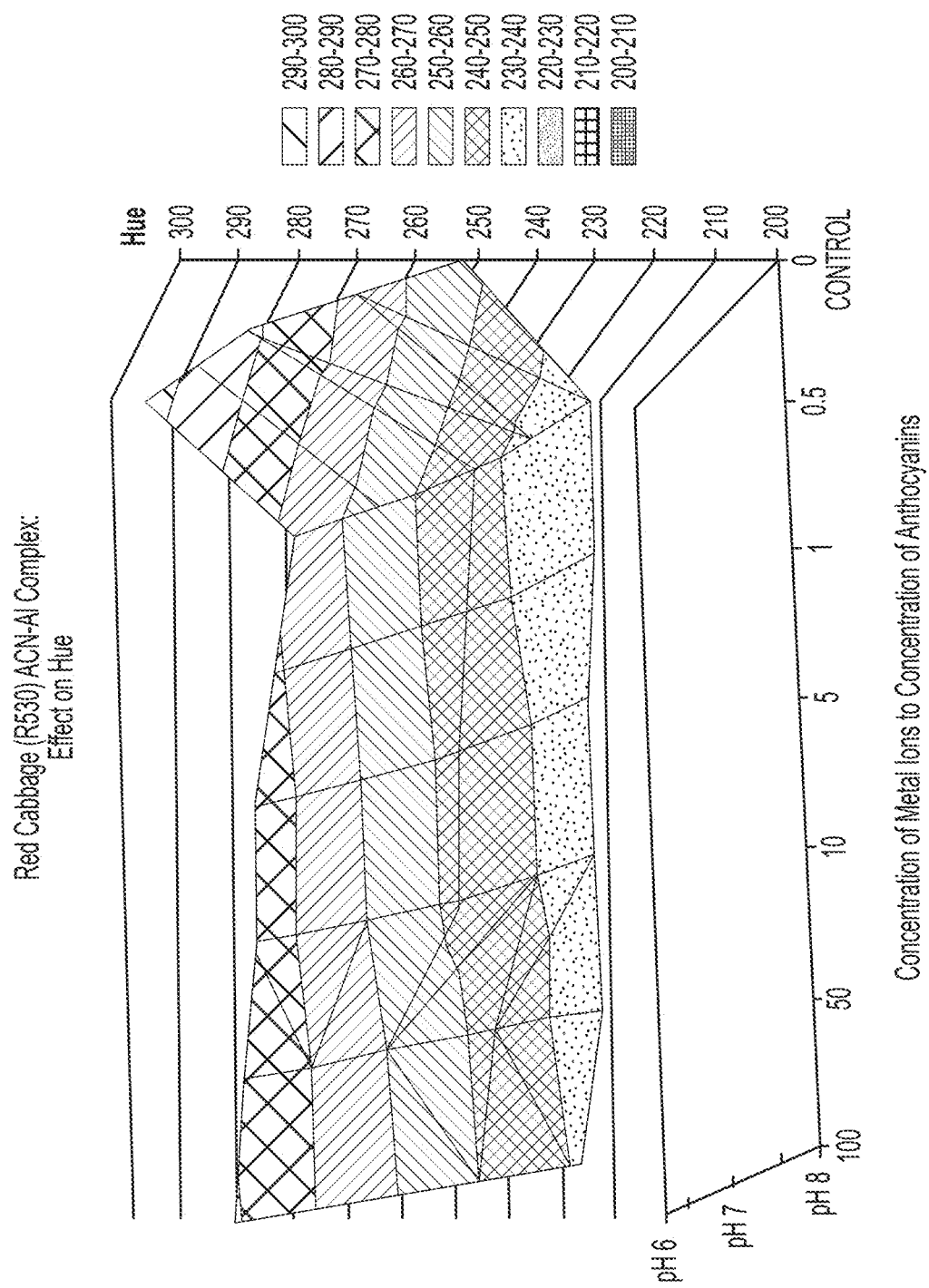
Figure 14C:
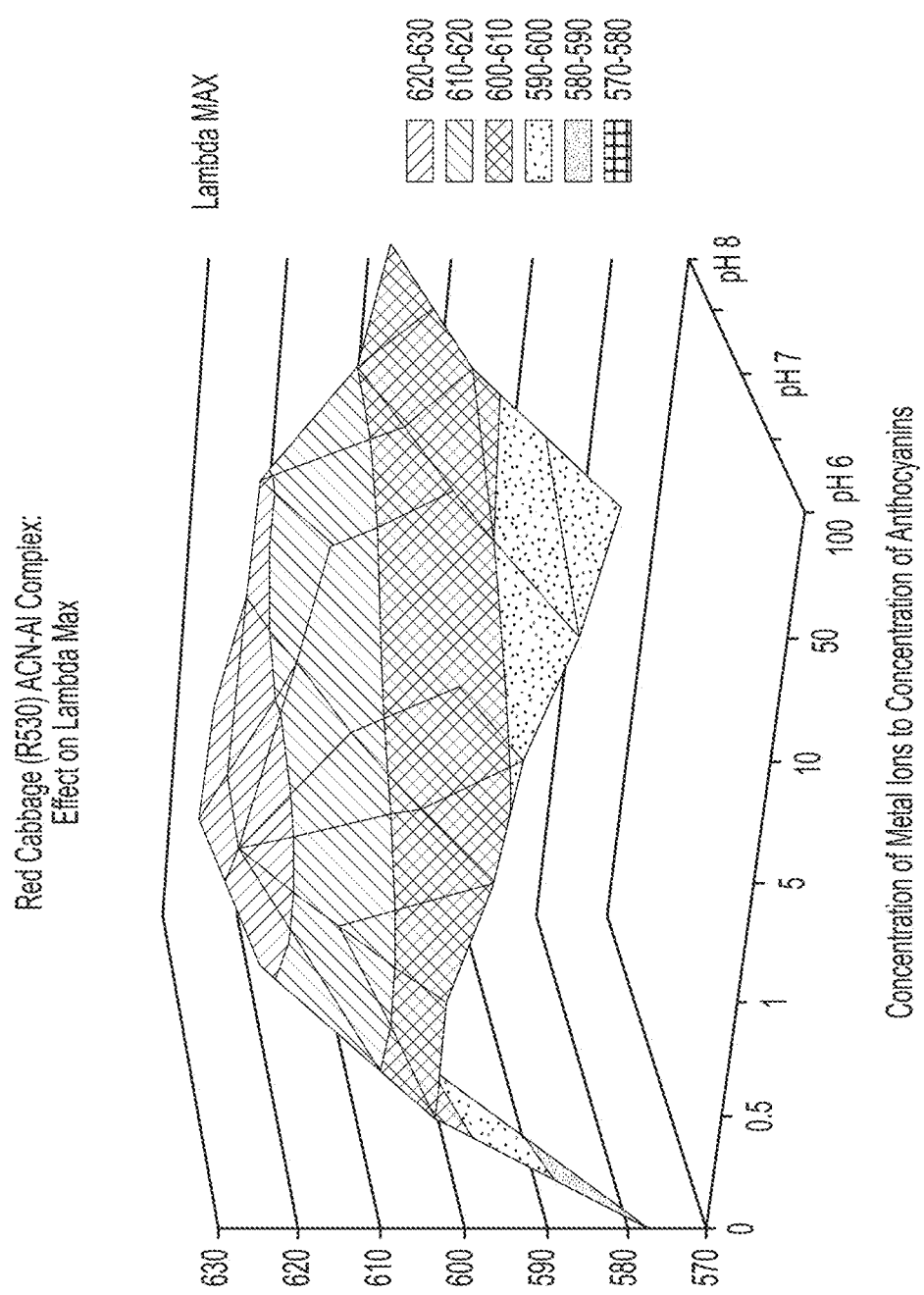

Tables 5-7 below show the effect $\Delta E$, Hue (h°), and $\lambda_{max}$, respectively, for metallo-anthocyanin complexes with $Al^{3+}$ and diacylated anthocyanins at various pH values and concentrations. These data are also presented in three-dimensions in FIGS. 14A-14C.

TABLE 5

$\Delta E$ for $Al^{3+}$ chelated diacylated anthocyanins.

| | Concentration ([Al$^{3+}$]:[ACN]) | | | | | |
|---|---|---|---|---|---|---|
| pH | Control | 0.5x | 1x | 5x | 10x | 50x | 100x |
| 6 | 50.8 | 28.6 | 27.9 | 28.6 | 29.2 | 30.3 | 30.8 |
| 6.5 | 39.2 | 20.0 | 19.8 | 21.2 | 21.5 | 25.4 | 26.6 |
| 7 | 27.6 | 11.4 | 11.7 | 13.8 | 13.8 | 20.4 | 22.4 |
| 7.5 | 21.5 | 11.4 | 11.8 | 13.5 | 14.3 | 17.6 | 26.6 |
| 8 | 15.3 | 11.4 | 11.9 | 13.3 | 14.9 | 14.9 | 30.8 |

TABLE 6

Hue for $Al^{3+}$ chelated diacylated anthocyanins.

| | Concentration ([Al$^{3+}$]:[ACN]) | | | | | |
|---|---|---|---|---|---|---|
| pH | Control | 0.5x | 1x | 5x | 10x | 50x | 100x |
| 6 | 294 | 267 | 271 | 275 | 276 | 279 | 281 |
| 6.5 | 288 | 254 | 257 | 261 | 261 | 268 | 270 |
| 7 | 282.5 | 242 | 243 | 247 | 247 | 257 | 259 |
| 7.5 | 268 | 237 | 238 | 241 | 241 | 246 | 249 |
| 8 | 253 | 233 | 233 | 235 | 235 | 235 | 238 |

TABLE 7

$\lambda_{max}$ for $Al^{3+}$ chelated diacylated anthocyanins.

| | Concentration ([Al$^{3+}$]:[ACN]) | | | | | |
|---|---|---|---|---|---|---|
| pH | Control | 0.5x | 1x | 5x | 10x | 50x | 100x |
| 6 | 578 | 605 | 605 | 601 | 599 | 594 | 591 |
| 6.5 | 589 | 614 | 616 | 607 | 604 | 599 | 597 |

TABLE 7-continued $\lambda_{max}$ for $Al^{3+}$ chelated diacylated anthocyanins.

| | Concentration ($[Al^{3+}]$:[ACN]) | | | | | |
|---|---|---|---|---|---|---|
| pH | Control | 0.5x | 1x | 5x | 10x | 50x | 100x |
| 7 | 599 | 622 | 626 | 613 | 608 | 603 | 602 |
| 7.5 | 606 | 624 | 626 | 618 | 615 | 607 | 605 |
| 8 | 612 | 626 | 625 | 622 | 621 | 610 | 607 |

In general, increasing the pH from 6 to 8 was found to decrease the ΔE for $Al^{3+}$ chelated anthocyanins. The solutions having a pH of 8 had the lowest ΔE for both metal ions and across all concentrations.

A lower concentration of metal ions was generally found to decrease ΔE, depending on the pH. For example, for $Al^{3+}$ at a pH of 8, the ΔE of the tested samples were as follows: 0.5x<1x<5x<10x≈50x<Control.

Figure 13:
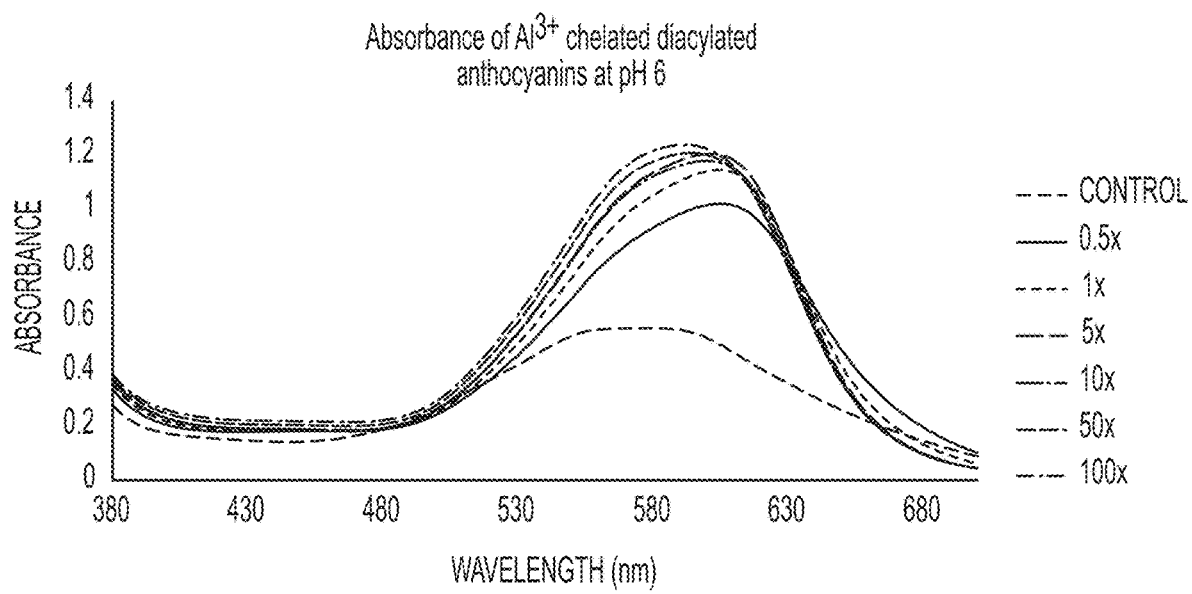
FIG. 13 depicts absorbance for $Al^{3+}$ chelated anthocyanins with metal ion concentrations of zero to 100 times the anthocyanin concentration at a pH of 6.

Moreover, the additional of $Al^{3+}$ metal ions at various concentrations was found to create bathochromic and hyperchromic shifts in absorbance, resulting in bluer and more intense colors relative to the control (FIG. 13).

Conclusion

By adjusting the pH and metal ion concentration depending on the metal ion, the color characteristics of a diacylated anthocyanin fraction can be developed into a blue or blue-purple color and achieve color characteristics similar to FD&C Blue No. 1. For example, increasing the pH to up to 8 was found to decrease ΔE for both $Fe^{3+}$ and $Al^{3+}$ chelates. Moreover, ΔE was found to improve at lower metal ion concentrations, e.g., less than 1x for $Fe^{3+}$ chelates and less than 10x for $Al^{3+}$ chelates. Indeed, the best blue colors were developed by increasing pH while maintaining a low metal ion concentration, e.g., 0.5x or less.

Example 5—Color of Metallo-Anthocyanin Complexes with Low Metal Ion Concentration As shown above, lower metal ion concentrations in metallo-anthocyanin complexes resulted in bluer color characteristics (see, e.g., Example 4).

This Example further observes the effect of pH and metal ion concentration on the color produced by anthocyanin compounds.

Materials and Methods

A concentrated red cabbage extract was fractionated based on anthocyanin structure using the methods described in Example 4.

A fraction comprising diacylated anthocyanins had a composition as shown in Table 8 below:

TABLE 8

| ACN | MW | % Area of HPLC | Absorbance | [ACN] (mg/L) |
|---|---|---|---|---|
| Cy-3-diG-5-G + p-coumaric&Ferulic | 1160 | 14.1 | 0.034 | 94.14 |
| Cy-3-diG-5-G + Sinapic&Ferulic | 1185 | 21.1 | 0.05 | 160.47 |
| Cy-3-diG-5-G + Sinapic&Sinapic | 1220 | 53.4 | 0.13 | 496.42 |
| Other anthocyanins (except Cy-3-diG-5-G) | 809 | 11.4 | 0.03 | 35.73 |
| Total | | 100% | 0.24 | 786.76 |

The fraction was diluted to an anthocyanin concentration of 50 μM in a buffer solution to a pH ranging from 6 to 8. For a pH of 6, a 0.5 M sodium acetate buffer was used. For a pH of 7 or 8, a 1 M Tris(hydroxymethyl)-aminomethane buffer was used. The fraction was chelated with $Fe^{3+}$ (i.e., $FeCl_3$ salt) or $Al^{3+}$ (i.e., $Al_2(SO_4)_3$ salt) at concentrations from 0.25 times ("1:0.25x") to one times ("1:1x") the anthocyanin concentration. Visible spectrometry was used to determine the absorbance and $\lambda_{max}$ of each sample.

Results $Al^{3+}$.

Figure 15A:
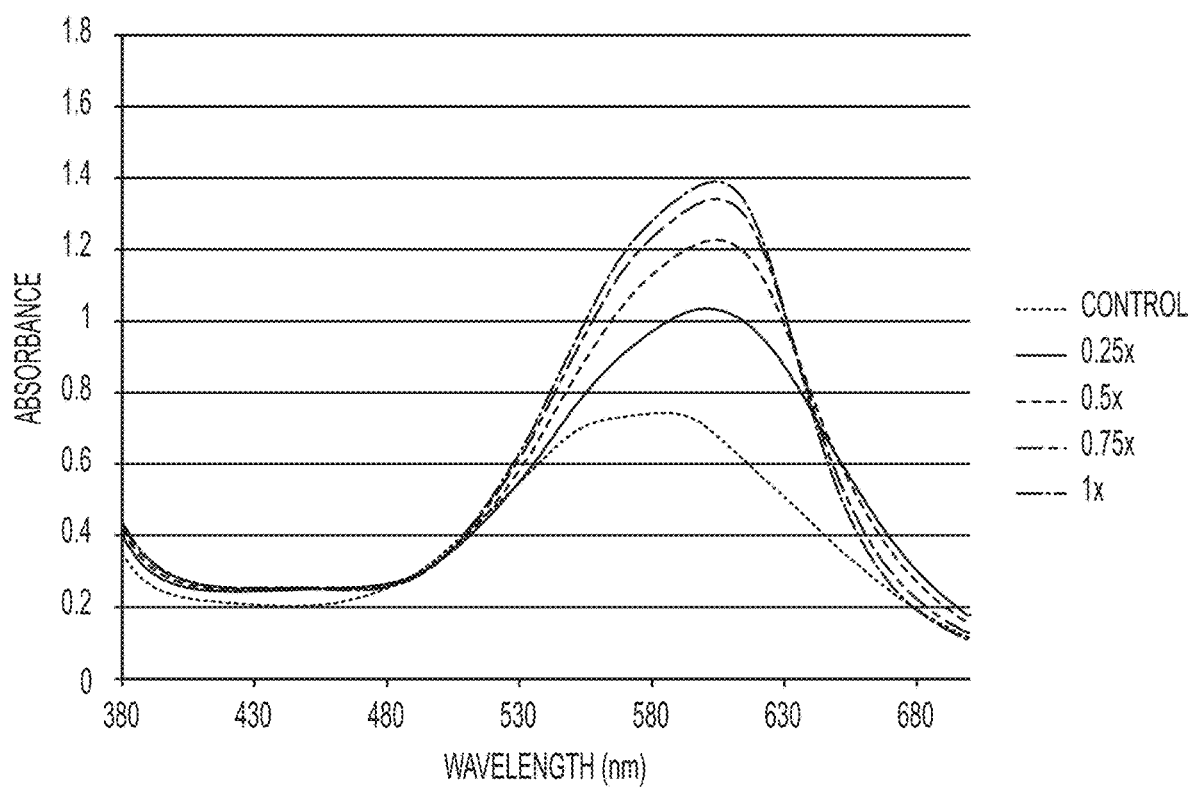
FIGS. 15A-15C depict the absorbance of a fraction of anthocyanins after treatment with $Al^{3+}$ at metal ion concentrations from zero to one times the anthocyanin concentration at various pHs.
Figure 15B:
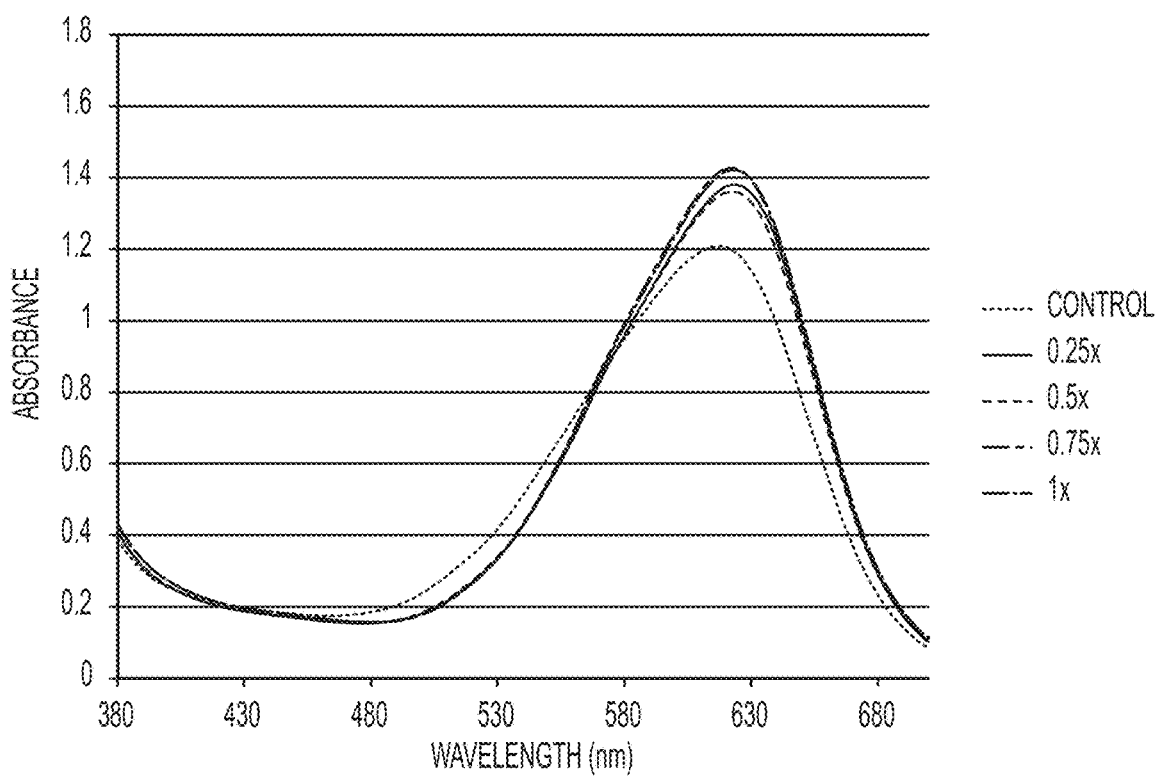
Figure 15C:
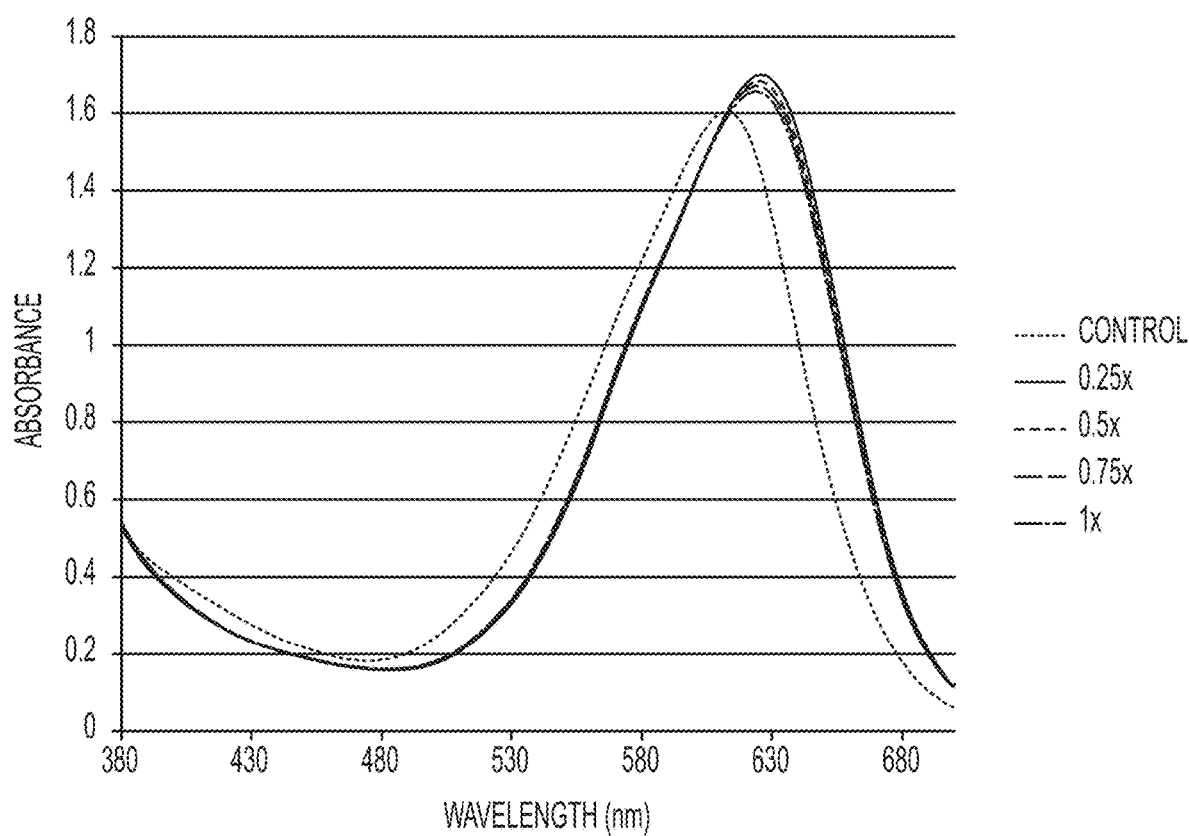
Figure 16A:
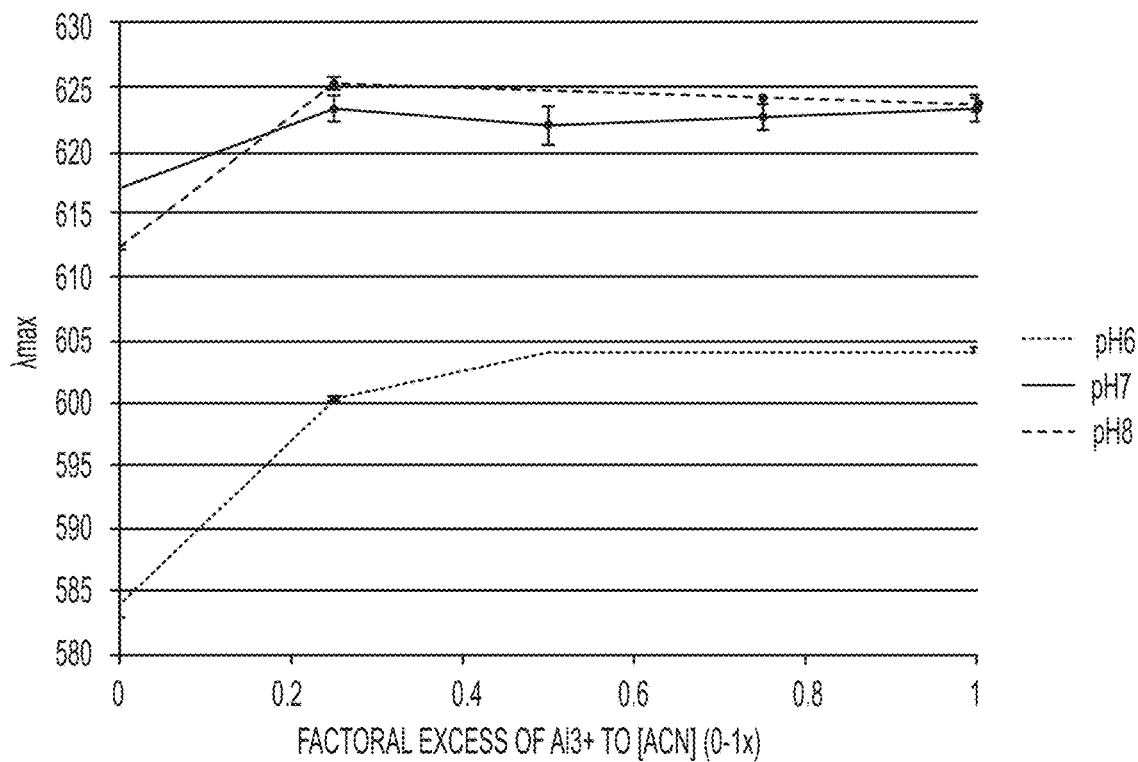
FIGS. 16A-16B provide the $\lambda_{max}$ and absorbance, respectively, of $Al^{3+}$ chelated diacylated anthocyanins at pHs of 6, 7, and 8.
Figure 16B:
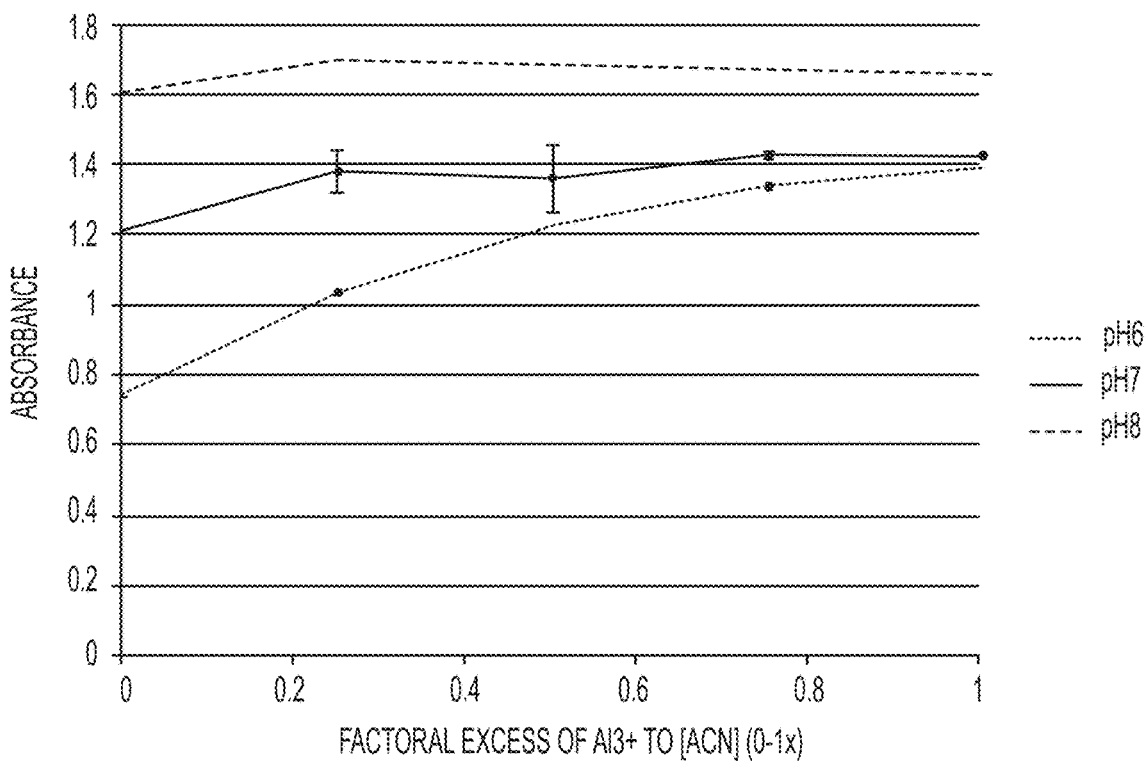

Increasing hyperchromic and bathochromic shift was observed with increasing $Al^{3+}$ concentration at an acidic pH of 6 (FIG. 15A). However, hyperchromic and bathochromic effects were about equal between the various $Al^{3+}$ concentrations at pH of 7 and 8 (FIGS. 15B-15C). Within each pH, $\lambda_{max}$ and absorbance were not found to vary significantly between the various low $Al^{3+}$ concentrations (FIGS. 16A-16B). All samples were blue in appearance.

$Fe^{3+}$.

Figure 17A:
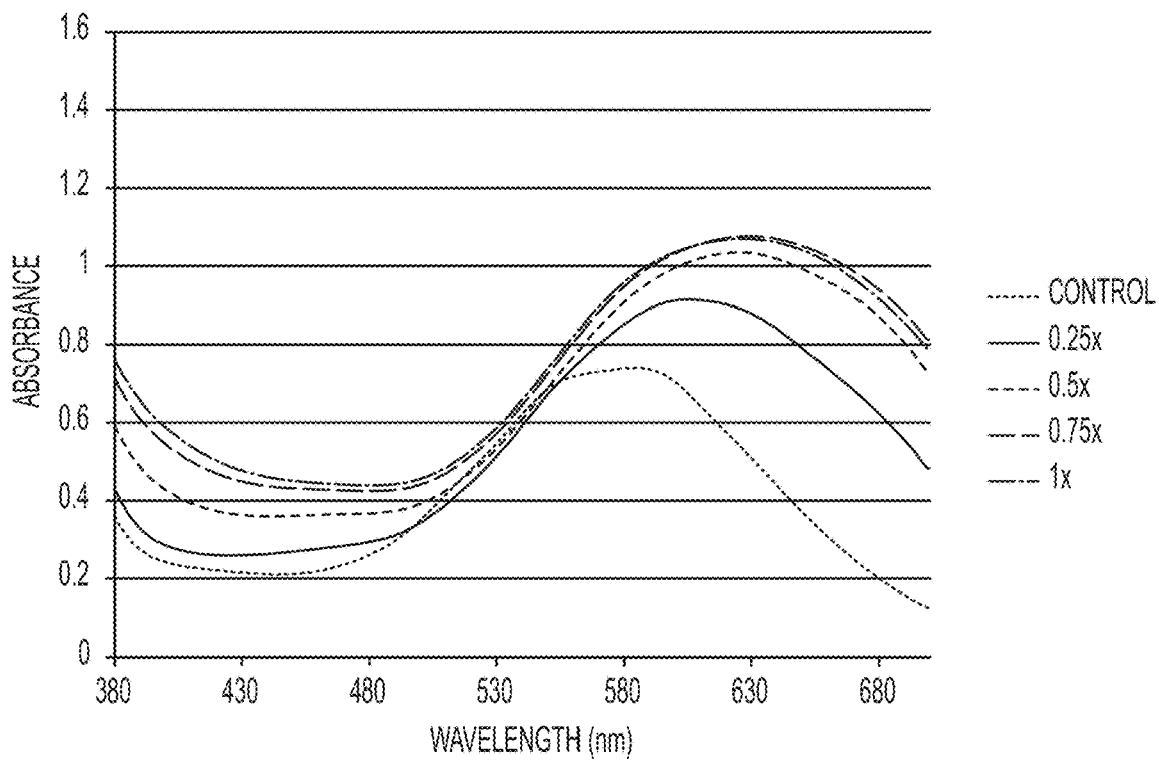
FIGS. 17A-17C depict the absorbance of a fraction of anthocyanins after treatment with $Fe^{3+}$ at metal ion concentrations from zero to one times the anthocyanin concentration at various pHs.
Figure 17B:
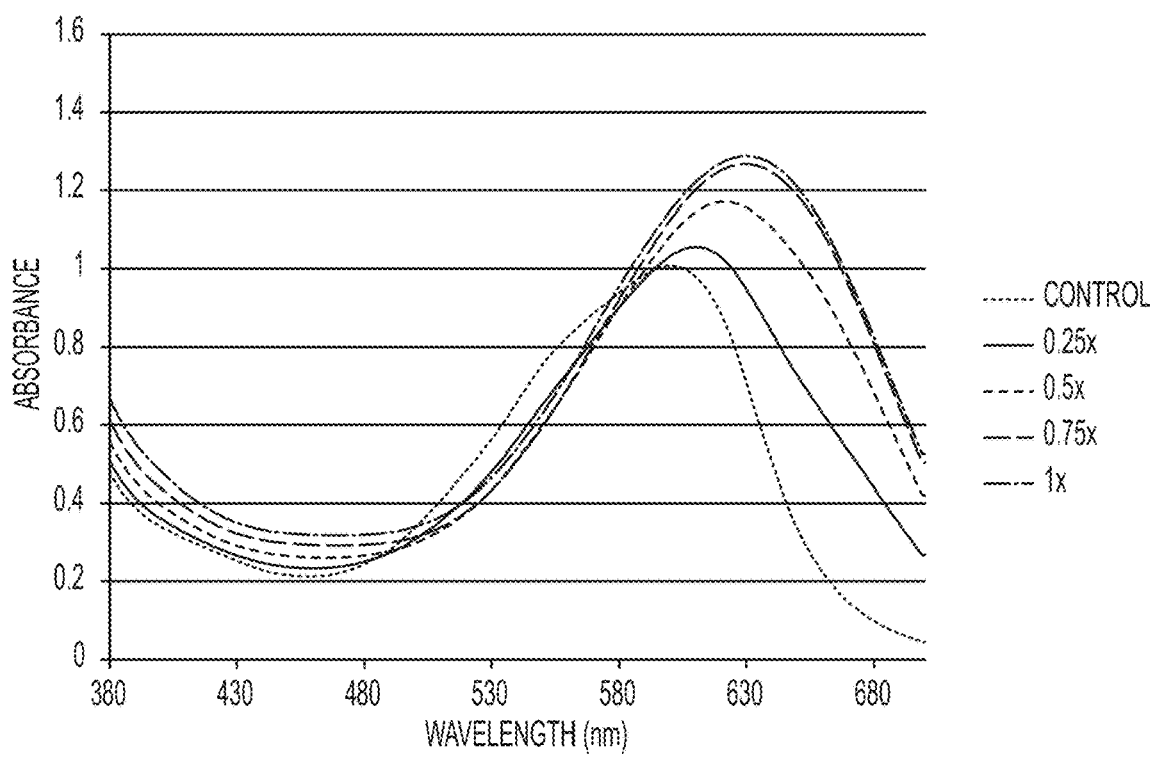
Figure 17C:
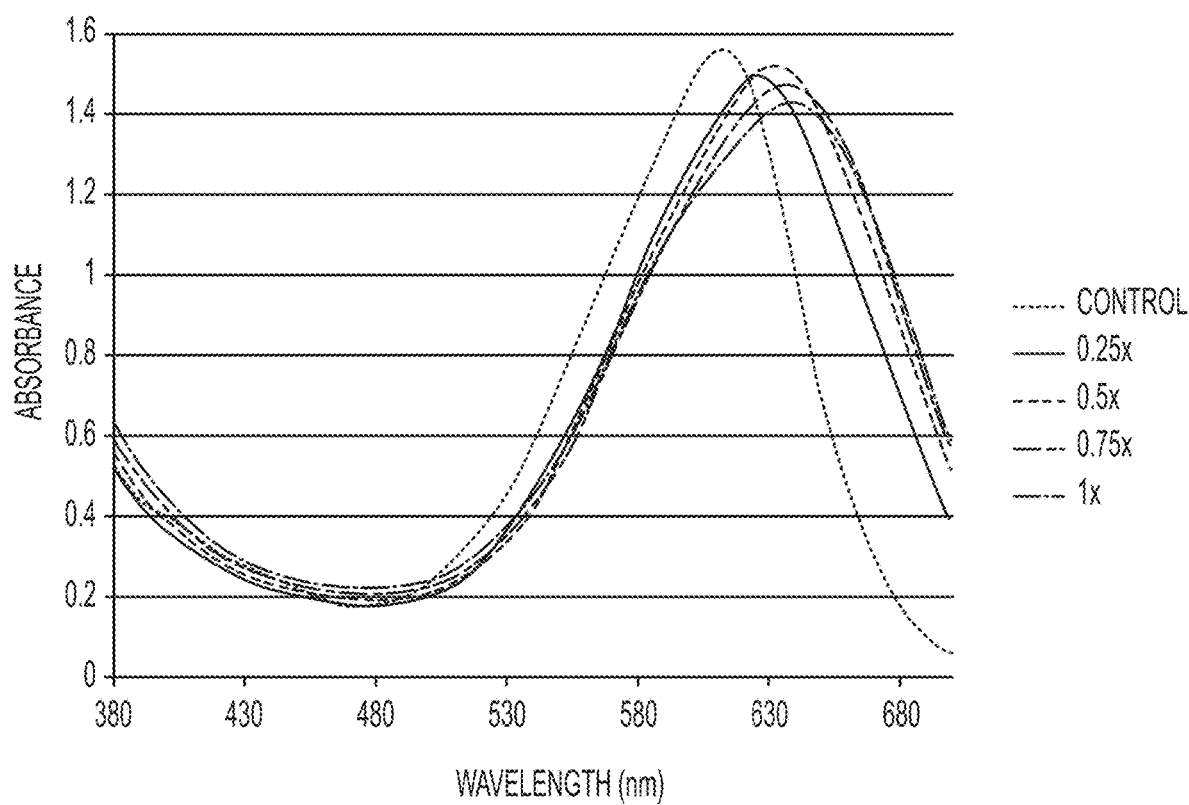
Figure 18A:
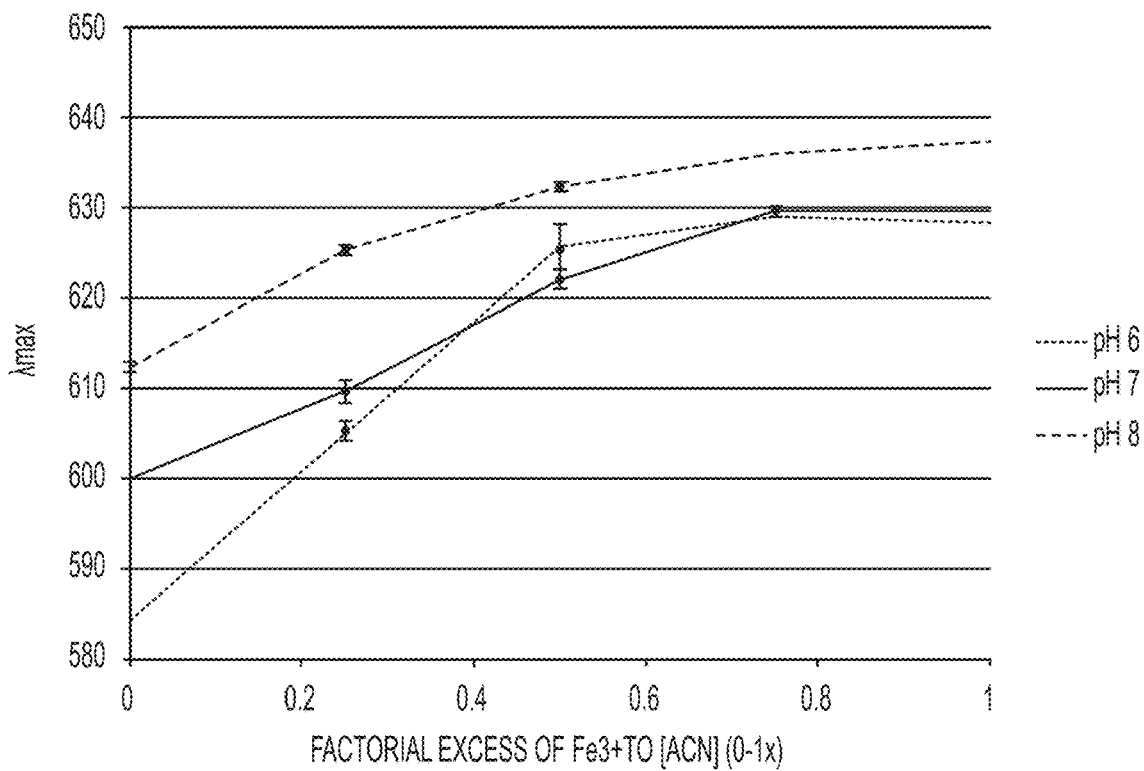
FIGS. 18A-18B provide the $\lambda_{max}$ and absorbance, respectively, of $Fe^{3+}$ chelated diacylated anthocyanins at pHs of 6, 7, and 8.
Figure 18B:
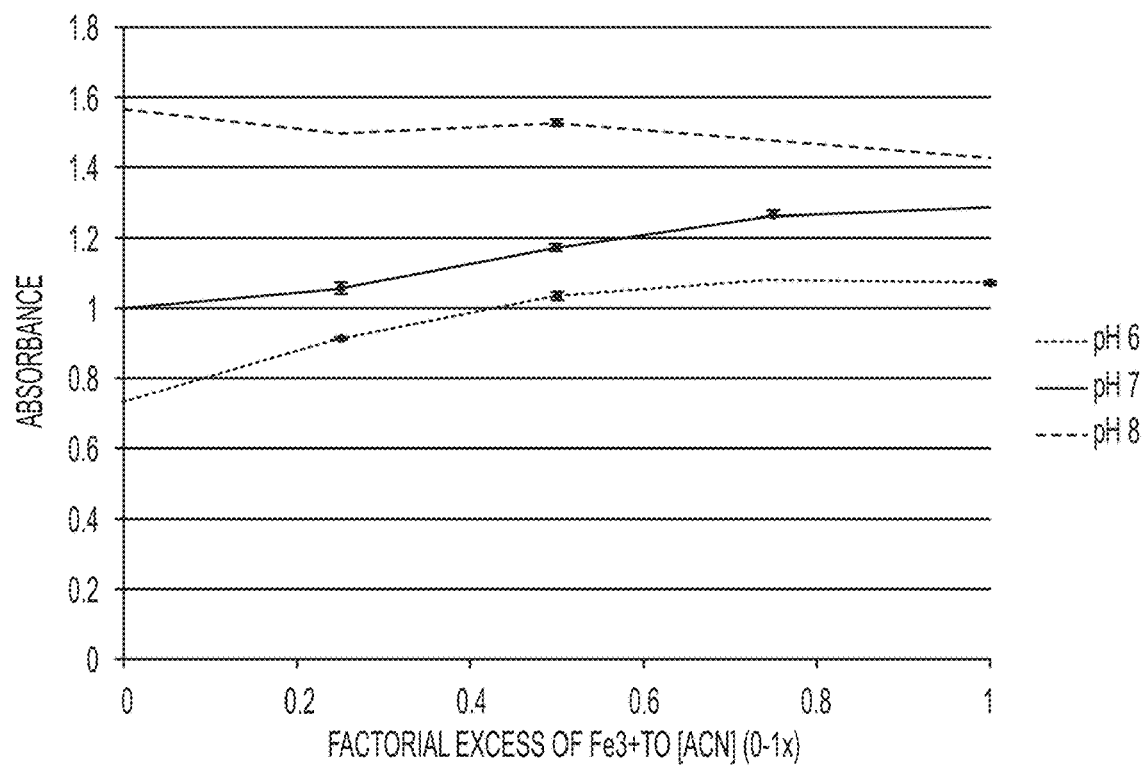

Increased absorbance was observed at increased pH (FIG. 17C). Hyperchromic shift was observed with increasing $Fe^{3+}$ concentration, particularly at a pH of 8 (FIGS. 17A-17C). Within each pH, $\lambda_{max}$ increased until a $Fe^{3+}$ concentration of 0.75 times the anthocyanin concentration (FIG. 18A). For a pH of 6 and 7, absorbance increased until a $Fe^{3+}$ concentration of 0.75 times the anthocyanin concentration, but showed little change at a pH of 8 (FIG. 18B). All samples were blue in appearance. Generally, the $Fe^{3+}$ chelates had larger bathochromic shifts than the $Al^{3+}$ chelates, having a $\lambda_{max}$ of about 630-636 nm, as compared to 623-625 nm. Absorbance was similar for both metal ions within the respective pH.

Conclusion

The metal ion and concentration thereof can affect the color characteristics of a diacylated anthocyanin fraction, and can including a metal ion at a low concentration can result in various shifts in the spectral data.

Example 6—Stability of Metallo-Anthocyanin Complexes with Low Metal Ion Concentration As shown above, lower metal ion concentrations in metallo-anthocyanin complexes resulted in bluer color characteristics (see, e.g., Examples 4 and 5). This Example provides the stability of such metallo-anthocyanin complexes.

Materials and Methods

A concentrated red cabbage extract was fractionated based on anthocyanin structure using the methods described in Example 4. The fractions were diluted to an anthocyanin concentration of 50 μM in a buffer solution to a pH ranging from 5 to 8. For a pH of 5 or 6, a 0.5 M sodium acetate buffer was used. For a pH of 7 or 8, a 1 M Tris(hydroxymethyl)-aminomethane buffer was used. The fractions were chelated with $Fe^{3+}$ (i.e., $FeCl_3$ salt) or $Al^{3+}$ (i.e., $Al_2(SO_4)_3$ salt) at concentrations from zero times ("1:0" or "Control") to ten times ("1:10") the anthocyanin concentration. 2 mL samples were stored in a darkened chamber at a temperature of 23.4° C.+/−2.1 for a total of 28 days. Visible spectrometry was used to determine the absorbance and $\lambda_{max}$ of each sample at various time points.

Results $Al^{3+}$.

Figure 19A:
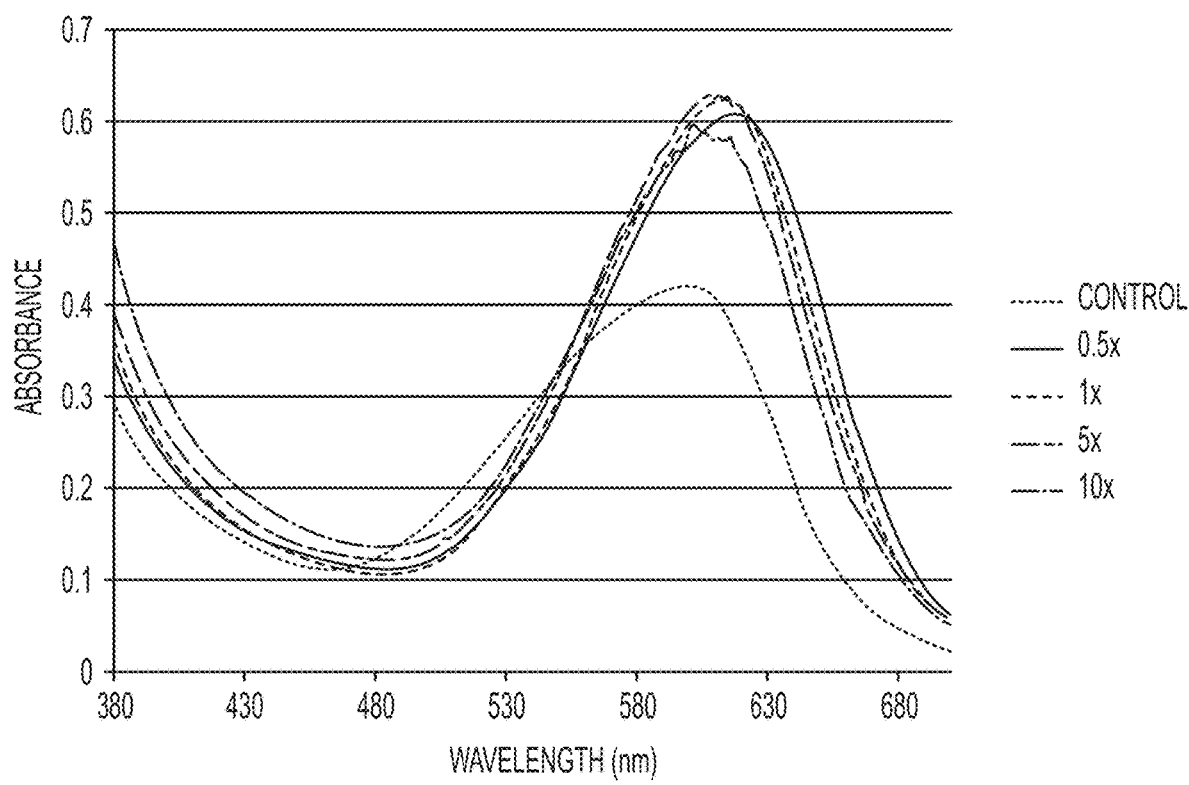
FIGS. 19A-19B depict the absorbance of a fraction of anthocyanins after treatment with $Al^{3+}$ at metal ion concentrations from zero to ten times the anthocyanin concentration and at a pH of 7.
Figure 19B:
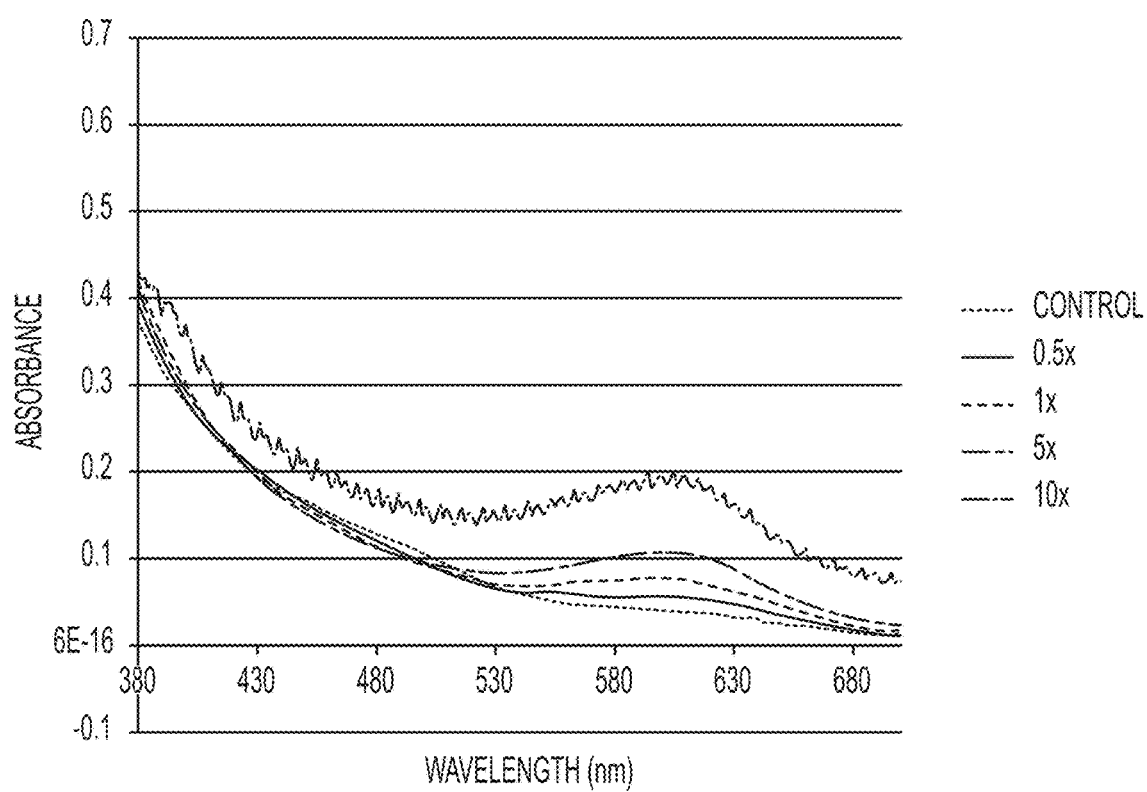
Figure 20A:
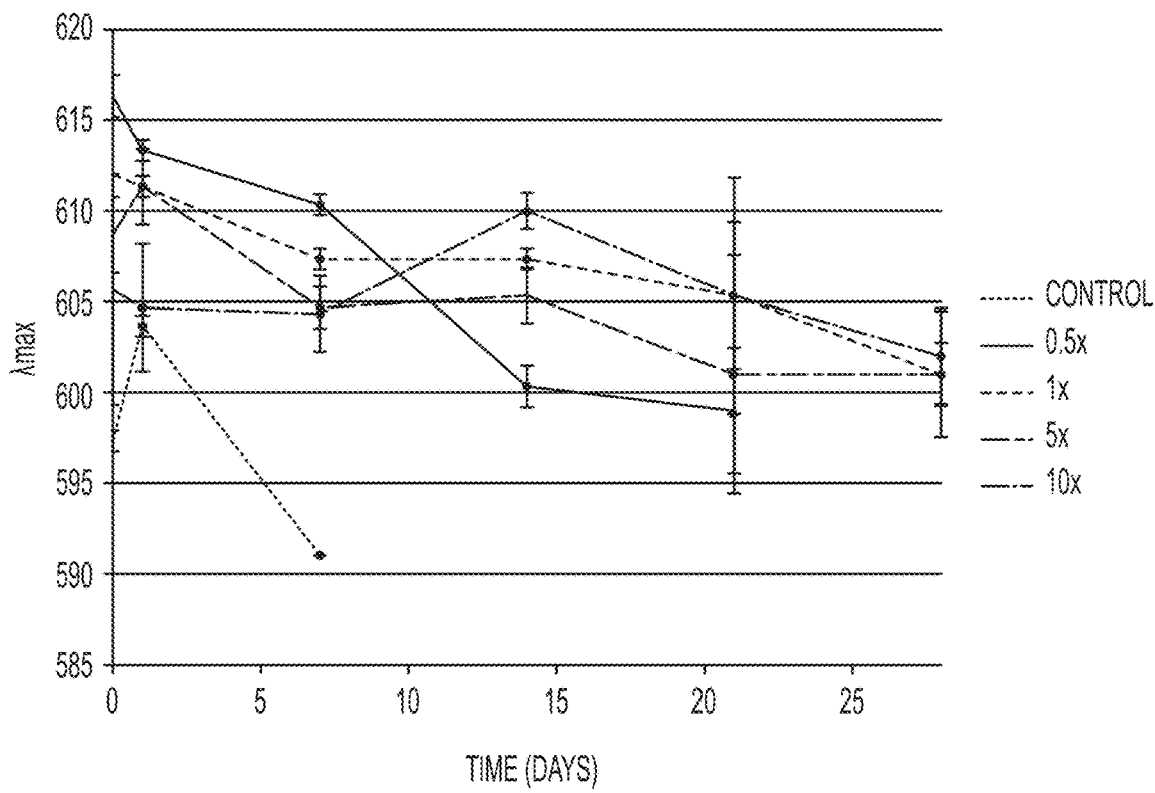
FIGS. 20A-20B depict the $\lambda_{max}$ and absorbance, respectively, of a fraction of anthocyanins after treatment with $Al^{3+}$ at metal ion concentrations from zero to ten times the anthocyanin concentration and at a pH of 7 over 28 days of storage.
Figure 20B:
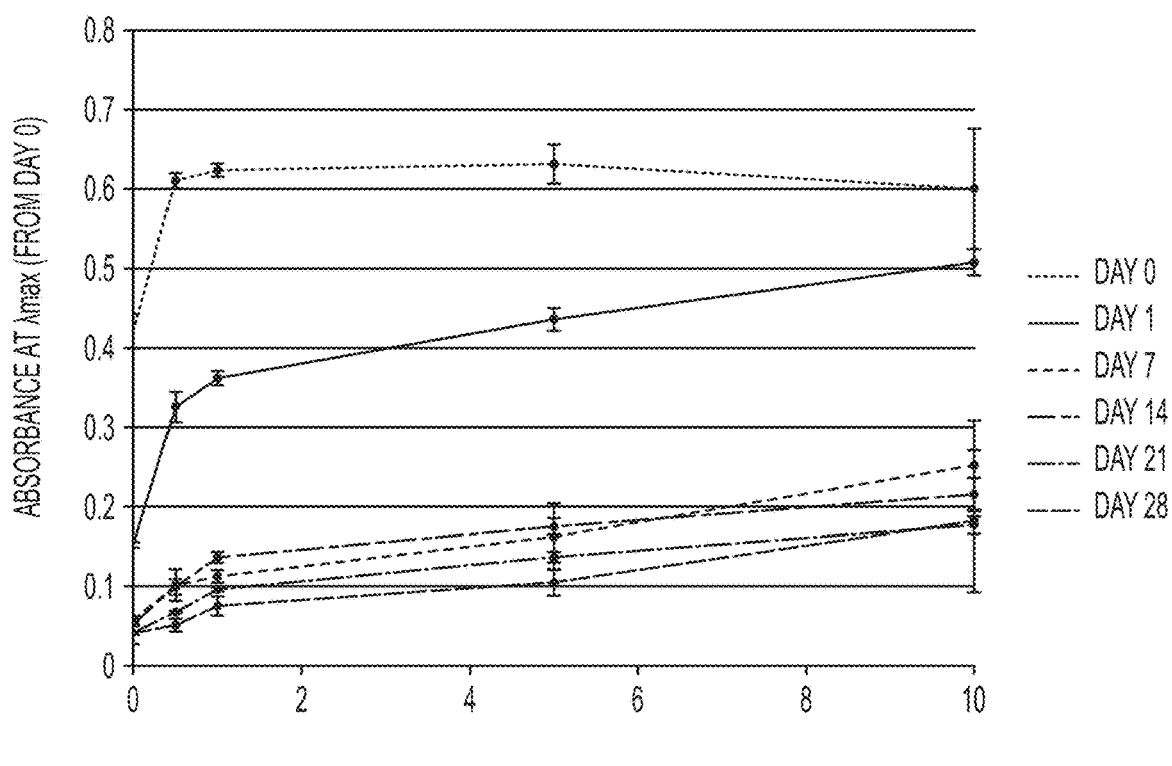
Figure 21A:
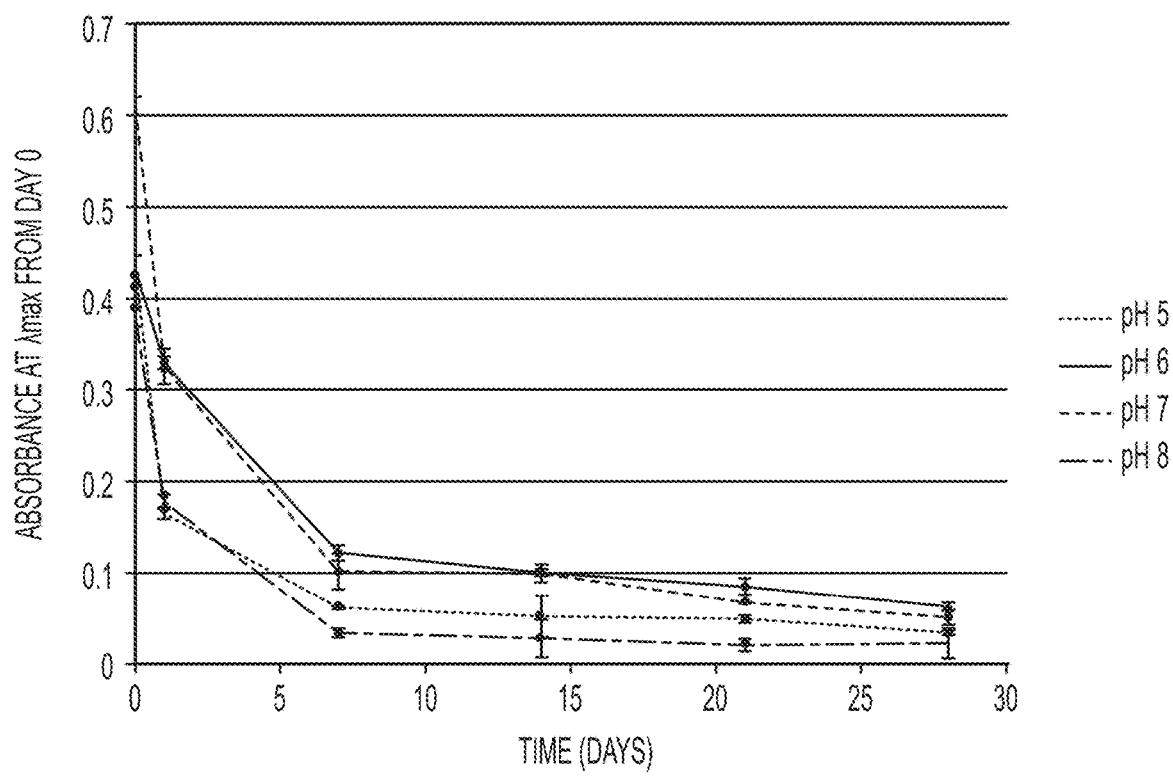
FIGS. 21A-21B depicts the absorbance (at the $\lambda_{max}$ wavelength of day zero) of $Al^{3+}$ chelates at pHs from 5 to 8 over 28 days of storage.
Figure 21B:
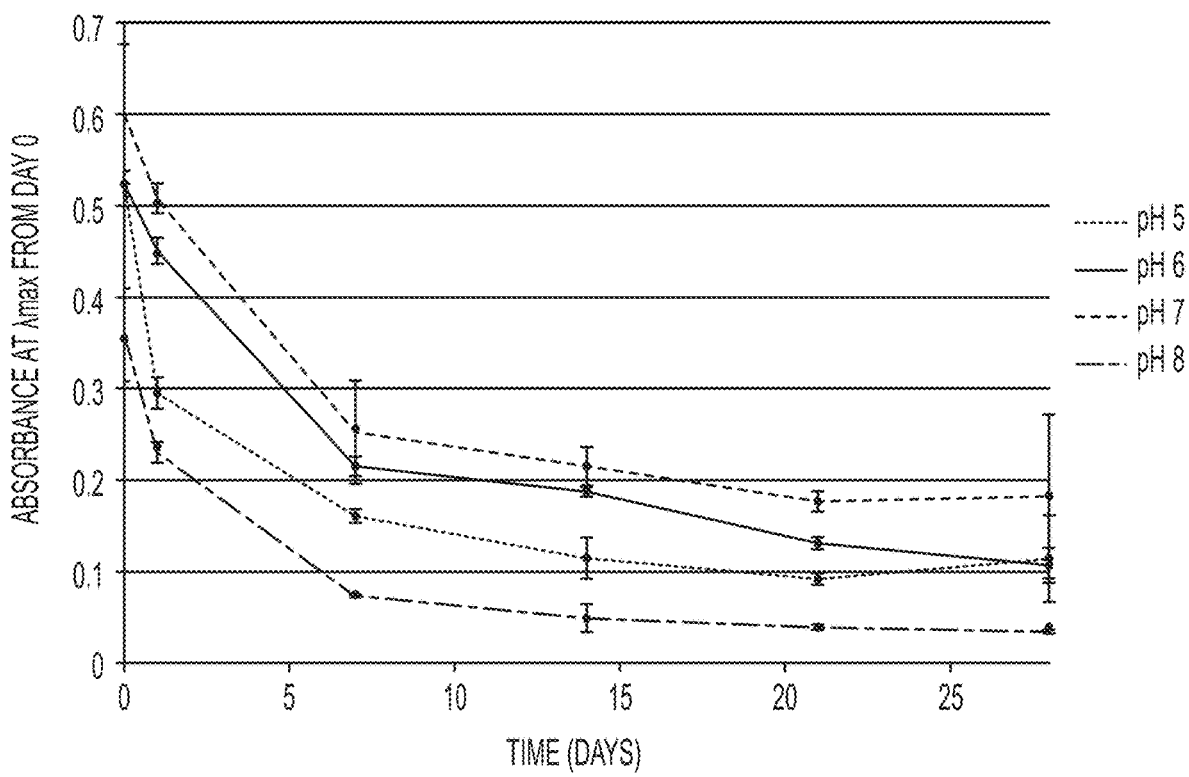

At a pH of 7, absorbance was substantially reduced over the 28 day period for all concentrations of metal ions (FIGS. 19A-19B). However, an increasing concentration of $Al^{3+}$ was found to increase stability, and the presence of $Al^{3+}$ improved stability as compared to the control (FIGS. 20A-20B). The highest absorbance was maintained at $Al^{3+}$ concentrations of five times the anthocyanin concentration and above (FIG. 20B), although precipitates were also observed in these samples during the 28 day period. Over time, $\lambda_{max}$ also decreased in all samples (FIG. 20A). The pH was also found to affect stability in $Al^{3+}$ chelates, with a pH of 7 providing the greatest stability (i.e., least change in absorbance), followed by a pH of 6 (FIGS. 21A-21B).

$Fe^{3+}$.

Figure 22A:
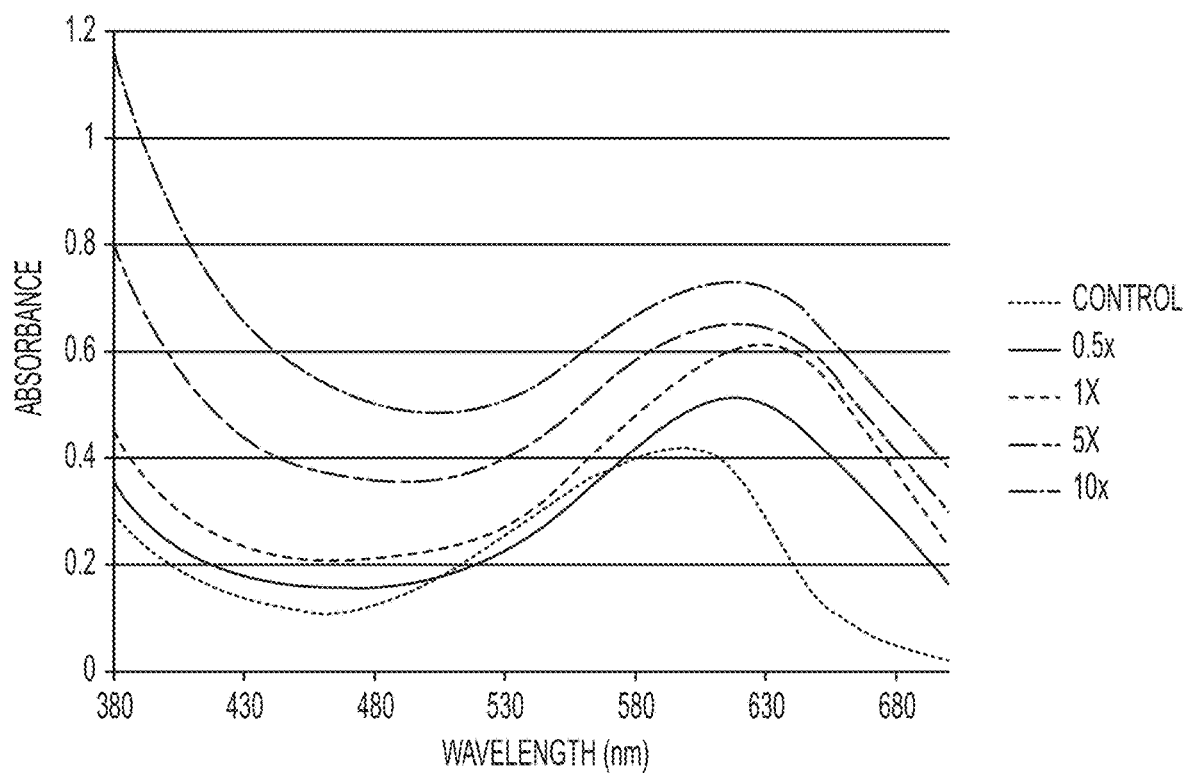
FIGS. 22A-22B depict the absorbance of a fraction of anthocyanins after treatment with $Fe^{3+}$ at metal ion concentrations from zero to ten times the anthocyanin concentration and at a pH of 7.
Figure 22B:
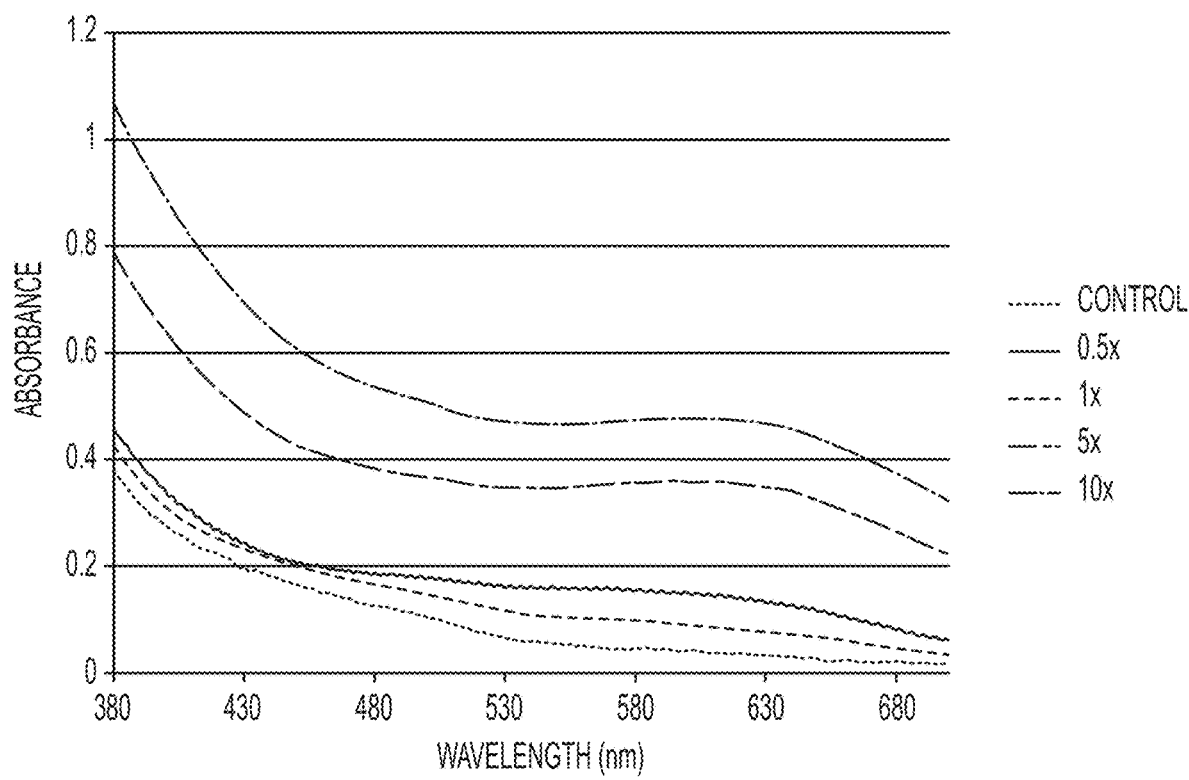
Figure 23A:
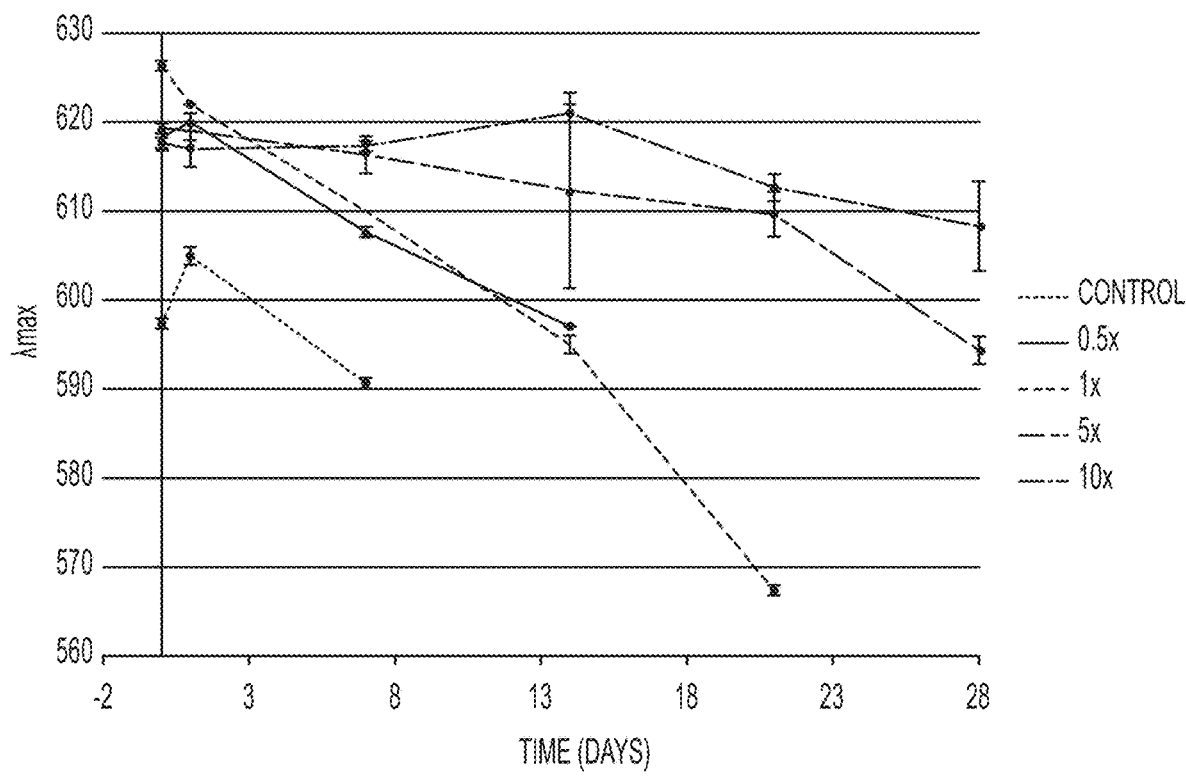
FIGS. 23A-23B depict the $\lambda_{max}$ and absorbance, respectively, of a fraction of anthocyanins after treatment with $Fe^{3+}$ at metal ion concentrations from zero to ten times the anthocyanin concentration and at a pH of 7 over 28 days of storage.
Figure 23B:
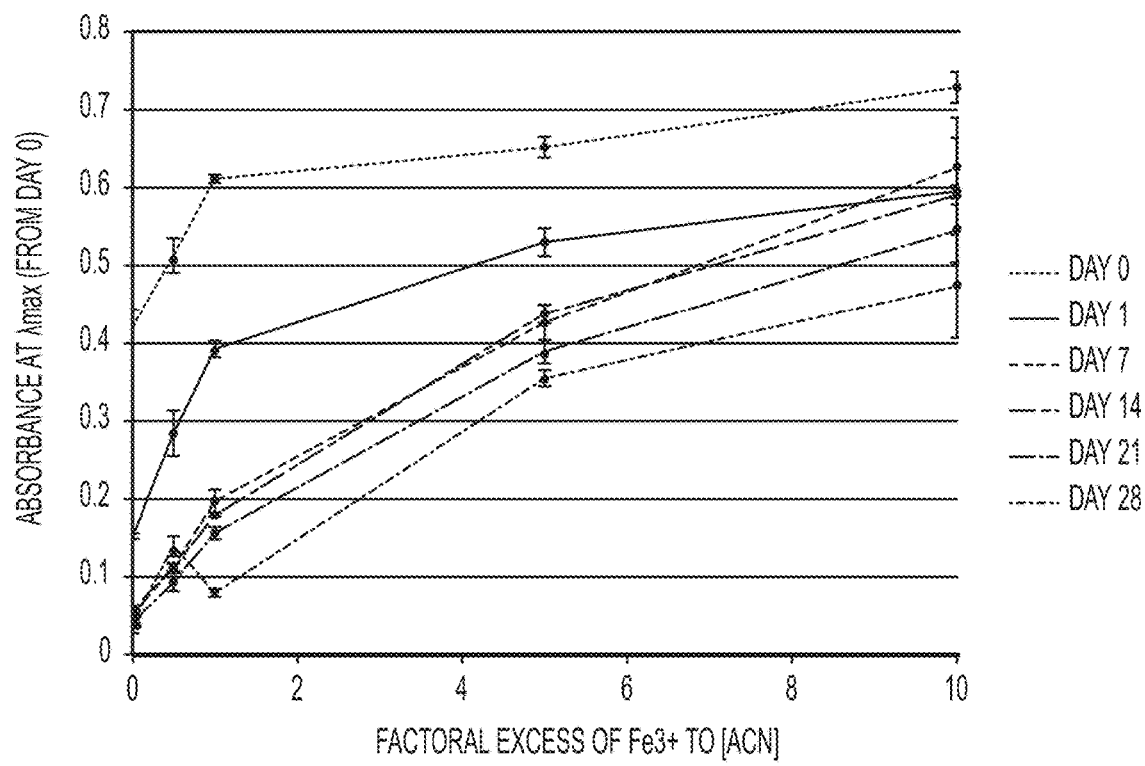
Figure 24A:
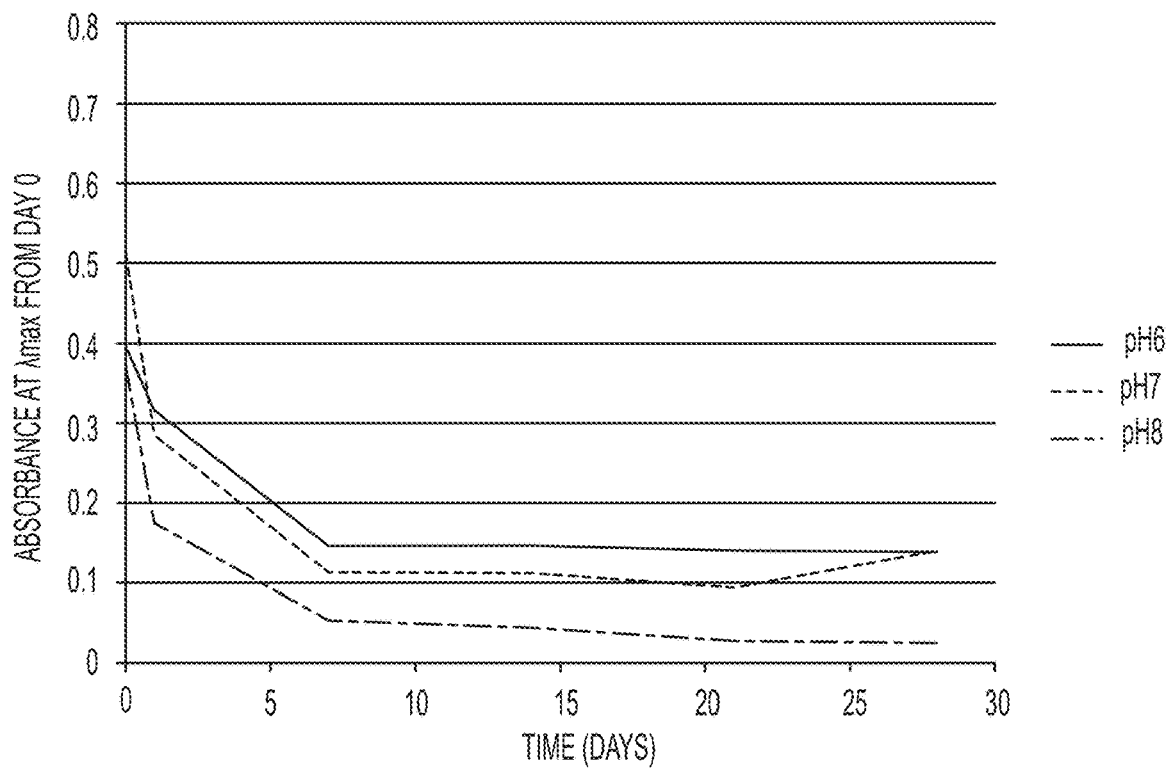
FIGS. 24A-24B depicts the absorbance (at the $\lambda_{max}$ wavelength of day zero) of $Fe^{3+}$ chelates at pHs from 5 to 8 over 28 days of storage.
Figure 24B:
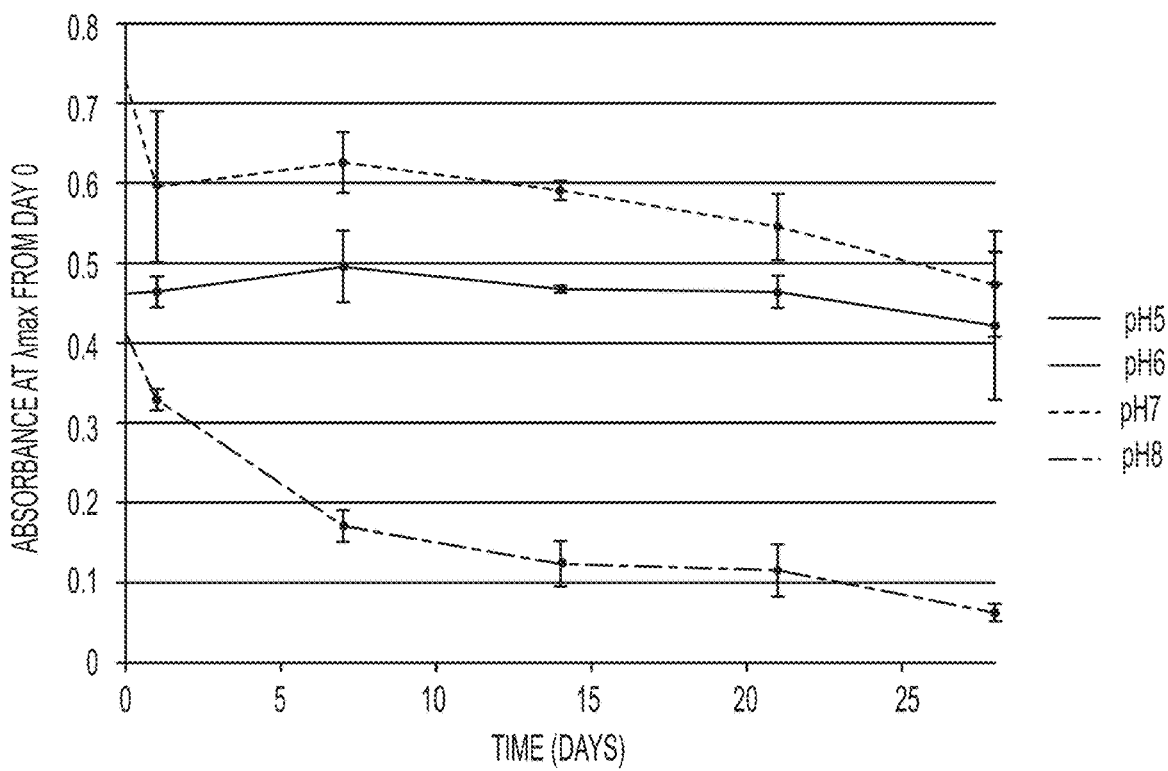

For $Fe^{3+}$ chelates at a pH of 7, absorbance was substantially reduced over the 28 day period for all concentrations of metal ions (FIGS. 22A-22B). An increasing concentration of $Fe^{3+}$ was found to increase stability, and the presence of $Fe^{3+}$ improved stability as compared to the control (FIGS. 23A-23B). Over time, $\lambda_{max}$ generally decreased in all samples (FIG. 23A) although it decreases less as higher metal ion concentrations. The shades of blue were visibly less attractive over time. The highest absorbance was maintained at $Fe^{3+}$ concentrations of ten times the anthocyanin concentration and above (FIG. 23B), although precipitates were also observed in samples having a $Fe^{3+}$ concentration of five times or above during the 28 day period. The pH was similarly found to affect stability in $Fe^{3+}$ chelates, with a pH of 6 or 7 providing the greatest stability (i.e., least change in absorbance) (FIGS. 24A-24B).

Conclusion

The $Al^{3+}$ chelates generally have better color stability than the $Fe^{3+}$ chelates over time. Regardless, a metal ion can improve the stability of a diacylated anthocyanin fraction over time, with greater concentrations of metal ions improving color stability.

Example 7—Affinity of Diacylated Anthocyanins for $Al^{3+}$ and $Fe^{3+}$ Metal Ions As shown above, the $Al^{3+}$ and $Fe^{3+}$ metal ions can improve the color characteristics and color stability of anthocyanin fractions (see, e.g., Examples 4-6). This Example provides the affinity of diacylated anthocyanins for such metal ions.

Materials and Methods

Red cabbage extract diluted to an anthocyanin concentration of 50 μM in a buffer solution to a pH of 7 using a 1 M Tris(hydroxymethyl)-aminomethane buffer. The extract was chelated with $Fe^{3+}$ or $Al^{3+}$ at concentrations from zero times ("1:0" or "Control") to five times ("1:5") the anthocyanin concentration. For some samples, $Al^{3+}$ was added first, then equilibrated for about 45 minutes. Subsequently, $Fe^{3+}$ was added at the same concentration and equilibrated for about 45 minutes. For other samples, this procedure was reverse (i.e., $Fe^{3+}$ was added first). Additionally, in some samples, $Al^{3+}$ and $Fe^{3+}$ were added simultaneously at the same concentration.

Visible spectrometry was used to determine the absorbance and $\lambda_{max}$ of each sample. The spectral data was collected at 380 to 700 nm.

Results

Figure 25A:
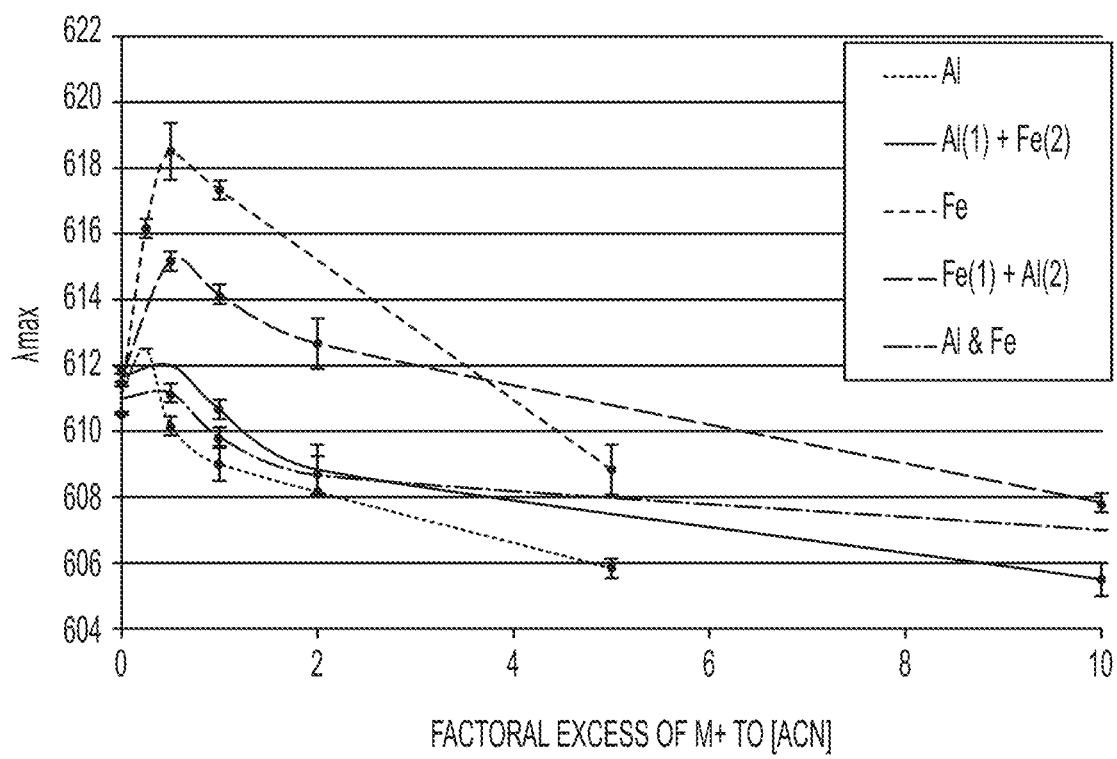
FIGS. 25A-25B depict the $\lambda_{max}$ and absorbance, respectively, of red cabbage extract treated with $Al^{3+}$ and/or $Fe^{3+}$ at metal ion concentrations from zero to 10 times the anthocyanin concentration and a pH of 7.
Figure 25B:
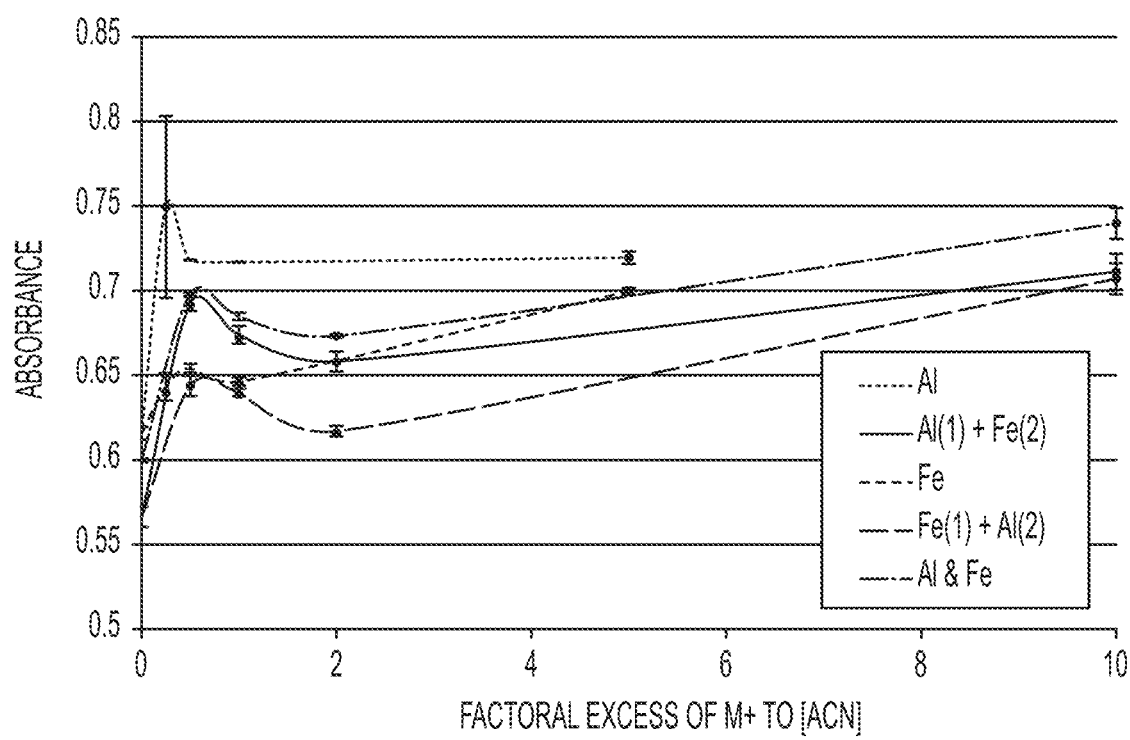

The anthocyanins in the red cabbage extract generally had stronger affinity for $Al^{3+}$ as compared to $Fe^{3+}$. For example, there was no significant change in $\lambda_{max}$ in a sample containing $Al^{3+}$ before ("Al") and after ("Al(1)+Fe(2)") $Fe^{3+}$ addition (FIG. 25A). However, there was a decrease in $\lambda_{max}$ in a sample containing $Fe^{3+}$ before ("Fe") and after ("Fe(1)+Al(2)") $Al^{3+}$ addition (FIG. 25A). Adding $Al^{3+}$ and $Fe^{3+}$ simultaneously ("Al & Fe") did not significantly affect $\lambda_{max}$. Absorbance was reduced by the addition of a second metal ion, regardless of which was added first (FIG. 25B).

Conclusion

Metallo-anthocyanin complexes can be formed between diacylated anthocyanins and $Al^{3+}$ and/or $Fe^{3+}$ to improve color characteristics and color stability, and the anthocyanins present in red cabbage extract generally have greater affinity for $Al^{3+}$ as compared to $Fe^{3+}$.

Example 8—Isolated Diacylated Anthocyanins Chelated with $Al^{3+}$ and $Fe^{3+}$ Metal Ions As shown above, the $Al^{3+}$ and $Fe^{3+}$ metal ions can improve the color characteristics and color stability of anthocyanin fractions (see, e.g., Examples 4-6). Moreover, diacylated anthocyanins were found to have improved color characteristics and stability as compared to other anthocyanins (see, e.g., Example 2). This Example provides the color characteristics and color stability of isolated diacylated anthocyanin derived from red cabbage extract when chelated with $Al^{3+}$ and $Fe^{3+}$ metal ions.

Materials and Methods

Figure 26:
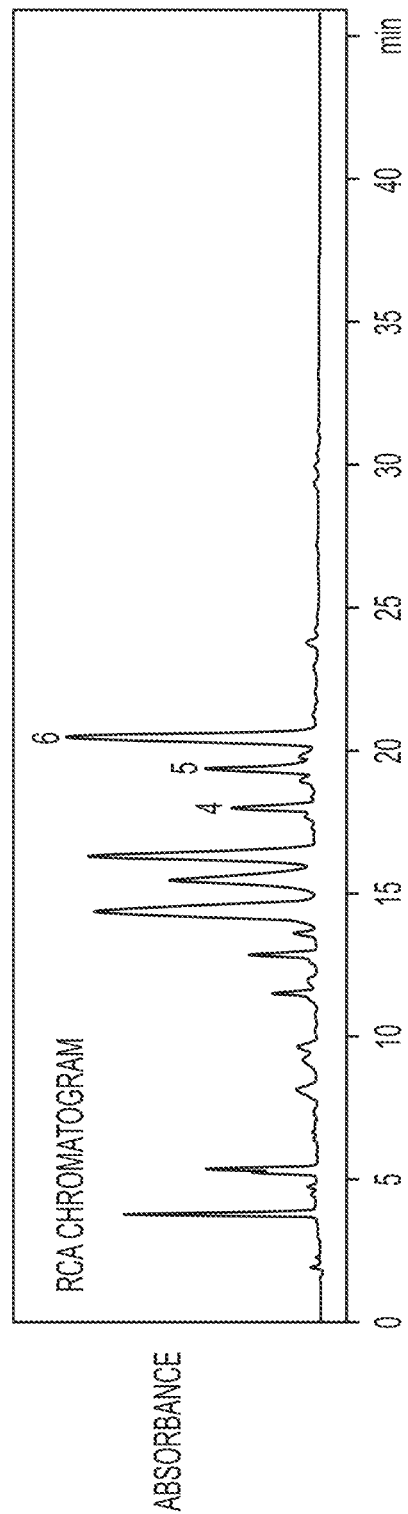
FIG. 26 provides a chromatogram of red cabbage extract, showing Peaks 4-6 corresponding to diacylated anthocyanins.

A concentrated red cabbage extract was fractionated based on anthocyanin structure using the methods described in Example 4. Subsequently, each diacylated anthocyanin ("peak") within the fraction was isolated using semi-preparative HPLC. As shown in FIG. 26, each fraction includes three peaks, each of which corresponds to a different acylated anthocyanin. The individual peaks corresponding to diacylated anthocyanins (Peaks 4-6 in FIG. 26) were obtained using reverse phase HPLC with a Phenomenex Luna PFP column with a 5 μm particle size, 100 Å pore size, and 250×21.2 mm column size. The flow rate was 10.0 mL/min over a run time of 50 min. The solvents were: Phase A: 4.5% formic acid in water; Phase B: acetonitrile. The binary gradient for the solvent was as follows: B: 0 min: 15% B, 0-30 min for 15-30% B. The composition of the fraction containing the three diacylated anthocyanin peaks is shown in Table 9 below. As indicated in Table 9, the fraction primarily included the diacylated anthocyanins Cy-3-diG-5-G+Coumaric&Sinapic ("Peak 4"), Cy-3-diG-5-G+Sinapic&Ferulic ("Peak 5"), and Cy-3-diG-5-G+Sinapic&Sinapic ("Peak 6"), but further included a small amount of other anthocyanins.

TABLE 9

| ACN | MW | % Area of HPLC | Absorbance | [ACN] (mg/L) |
|---|---|---|---|---|
| Cy-3-diG-5-G + Coumaric&Sinapic | 1160 | 18.5 | 0.11 | 300.3 |
| Cy-3-diG-5-G + Sinapic&Ferulic | 1185 | 25.4 | 0.15 | 469.9 |
| Cy-3-diG-5-G + Sinapic&Sinapic | 1220 | 48.8 | 0.28 | 1103.9 |
| Other anthocyanins (except Cy-3-diG-5-G) | 809 | 7.4 | 0.04 | 56.3 |
| Total | | 100% | 0.58 | 1930.3 |

The samples were diluted to an anthocyanin concentration of 50 μM in a buffer solution to a pH ranging from 6 to 8. For a pH of 6, a 0.5 M sodium acetate buffer was used. For a pH of 7 or 8, a 1 M Tris(hydroxymethyl)-aminomethane buffer was used. The fractions were chelated with $Fe^{3+}$ or $Al^{3+}$ at concentrations from zero times ("1:0" or "Control") to ten times ("1:10") the anthocyanin concentration. 2 mL samples were stored in a darkened chamber at a temperature of about 23° C. for 48 hours.

Visible spectrometry was used to determine the absorbance and $\lambda_{max}$ of each sample. The spectral data was collected at 250 to 700 nm with anthocyanin elution monitored at 520 nm. The CIELAB L*a*b* and CIELCH L*C*h° values for the solutions were calculated as described in connection with Example 3.

Results

Hue.

Figure 27A:
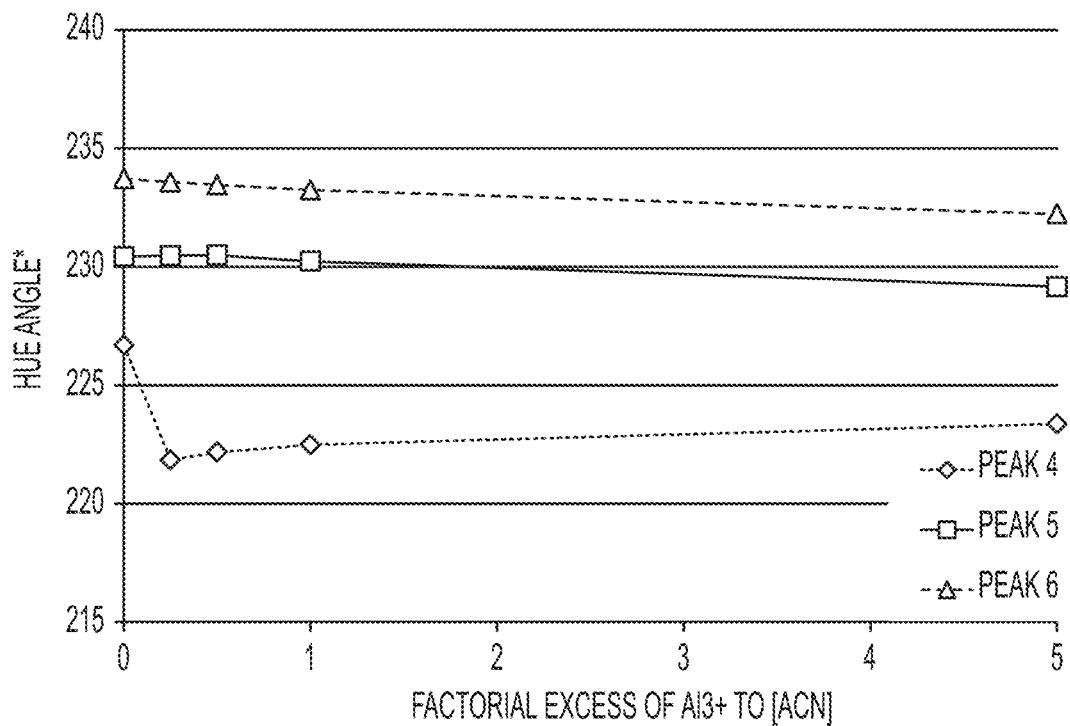
FIGS. 27A-27B depict the hue angles of metallo-anthocyanins comprising Peaks 4-6 at metal ion concentrations from zero to 5 times the anthocyanin concentration and a pH of 7.
Figure 27B:
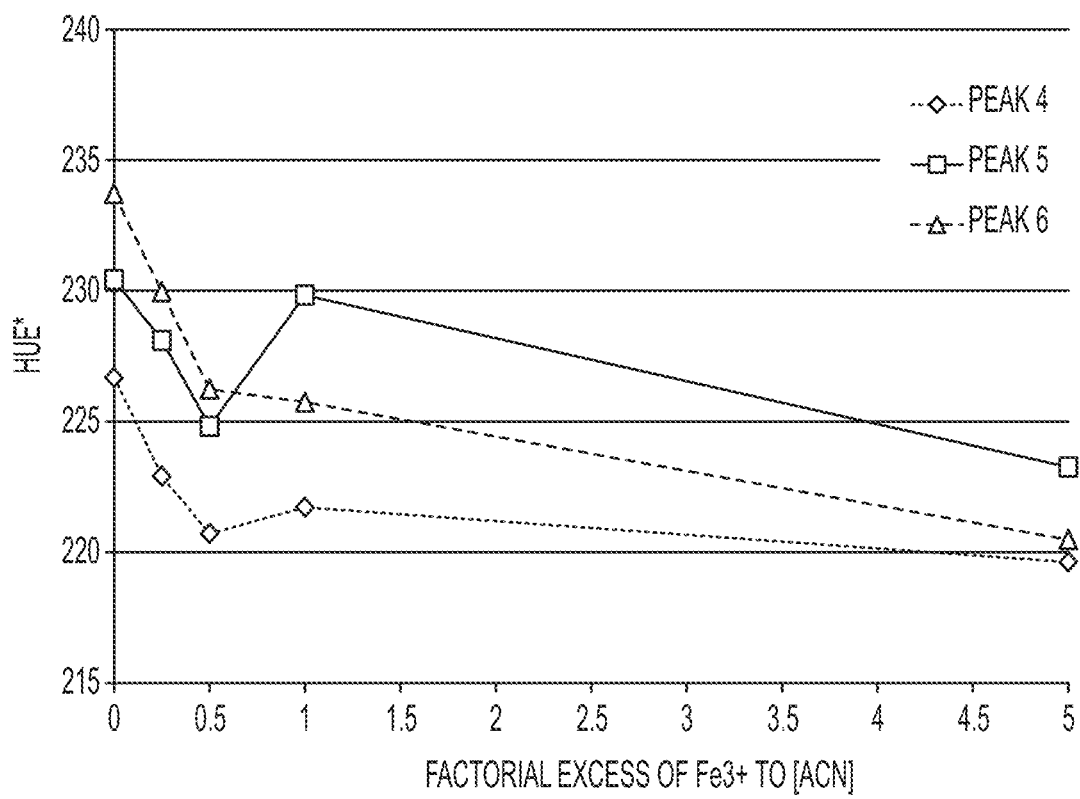
Figure 28A:
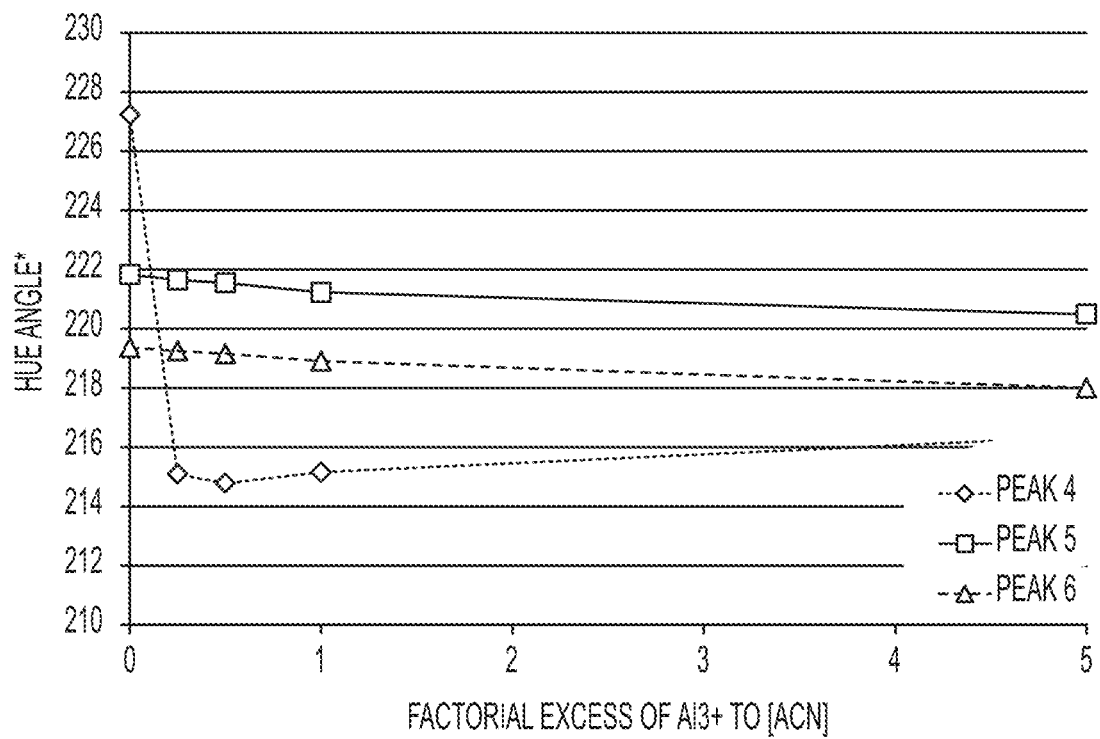
FIGS. 28A-28B depict the hue angles of metallo-anthocyanins comprising Peaks 4-6 at metal ion concentrations from zero to 5 times the anthocyanin concentration and a pH of 8.
Figure 28B:
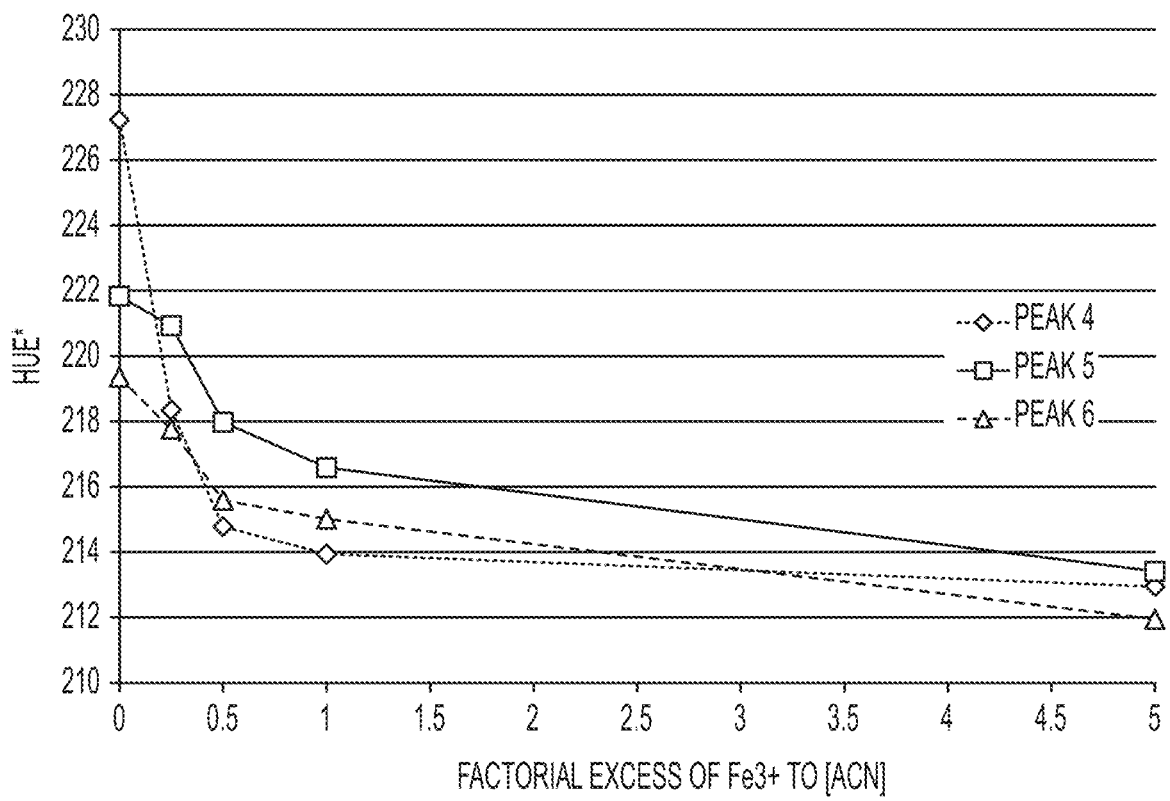

Each of the isolated diacylated anthocyanins exhibited hue angles similar to FD&C Blue No. 1 (i.e., from about 210 to about 230) when chelated with either $Al^{3+}$ or $Fe^{3+}$. At a pH of 7 and with $Al^{3+}$, Peak 6 had a greater hue angle than Peak 5, which had a greater hue angle than Peak 4 (FIG. 27A). Depending on the metal ion concentration, this pattern was also observed for $Fe^{3+}$ (FIG. 27B). At a pH of 8 and with either $Al^{3+}$ or $Fe^{3+}$, Peak 5 had a greater hue angle than Peak 6, which had a greater hue angle than Peak 4 (FIGS. 28A-28B).

Chroma.

Figure 29A:
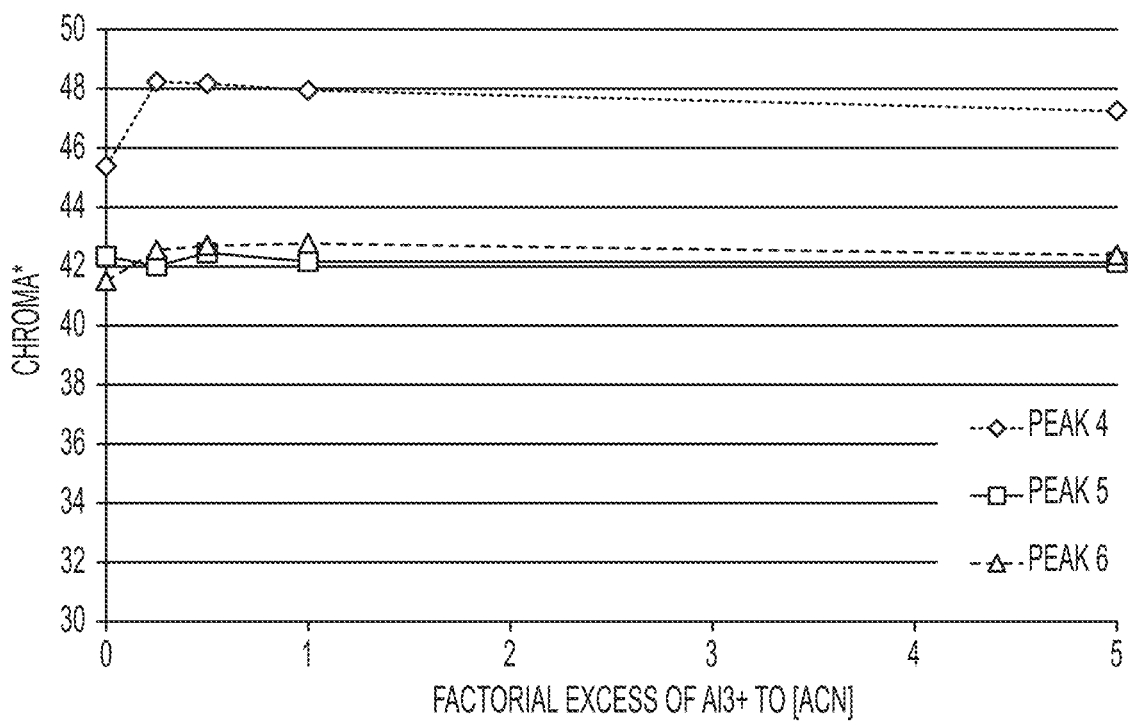
FIGS. 29A-29B depict the chroma of metallo-anthocyanins comprising Peaks 4-6 at metal ion concentrations from zero to 5 times the anthocyanin concentration and a pH of 7.
Figure 29B:
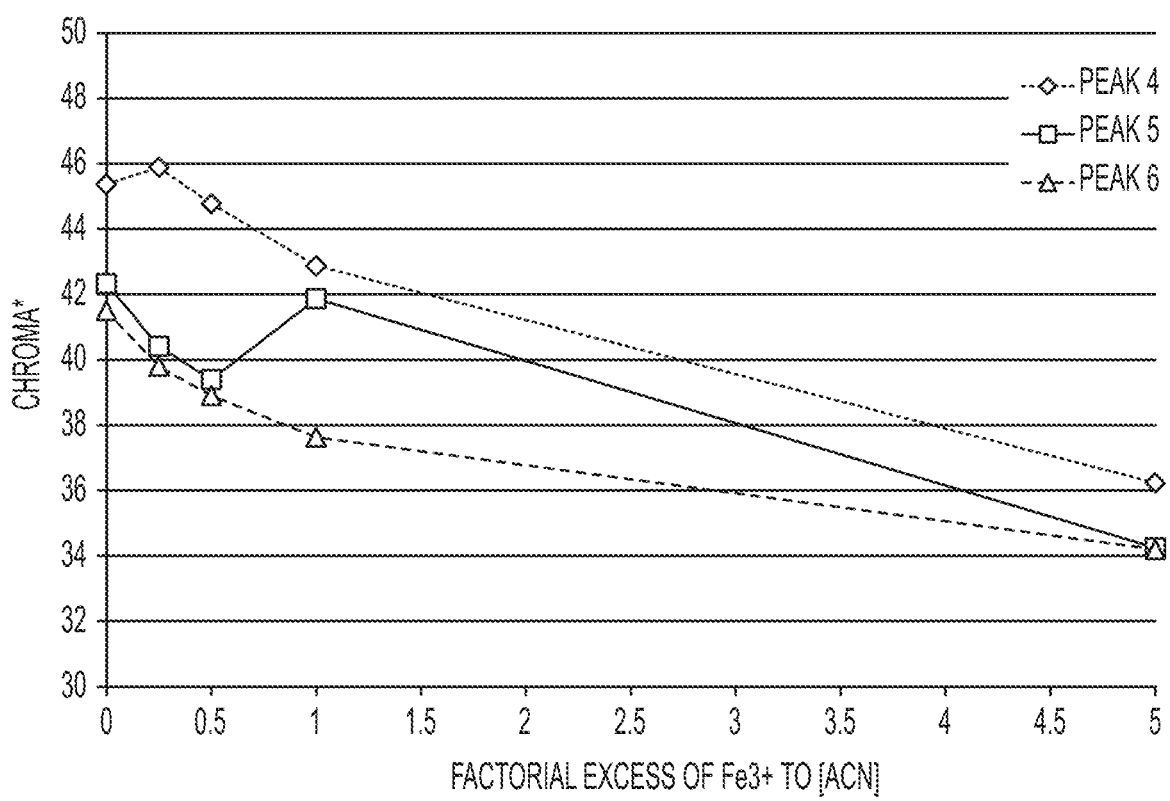
Figure 30A:
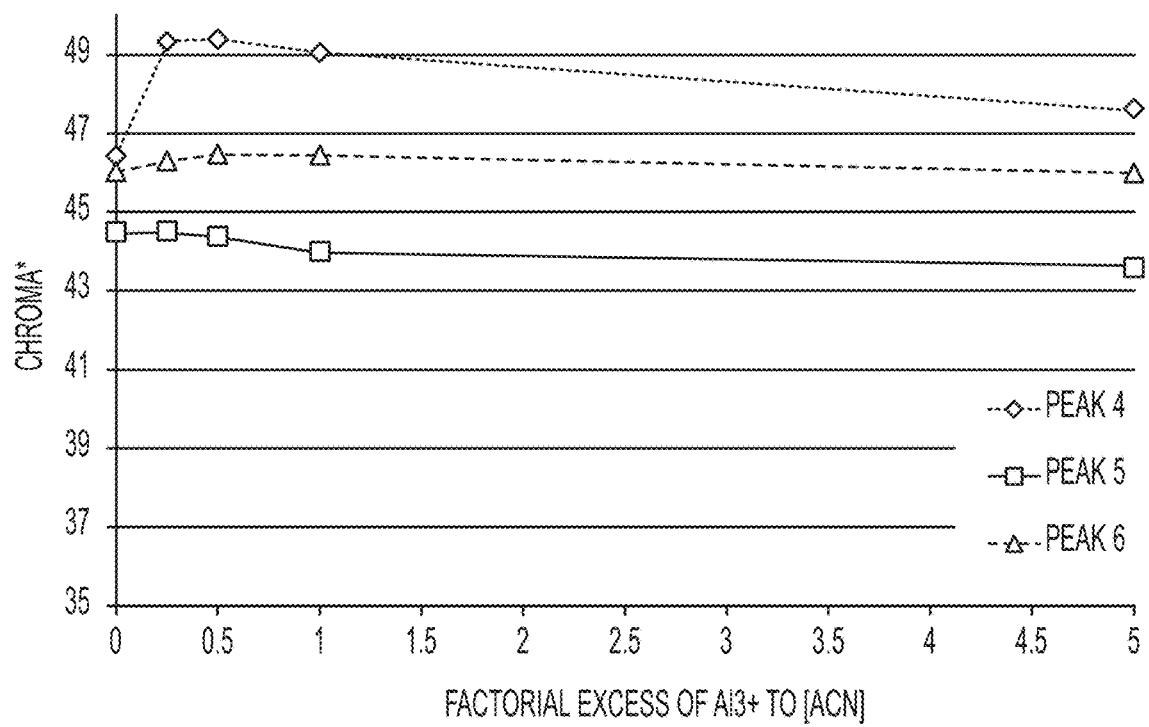
FIGS. 30A-30B depict the chroma of metallo-anthocyanins comprising Peaks 4-6 at metal ion concentrations from zero to 5 times the anthocyanin concentration and a pH of 8.
Figure 30B:
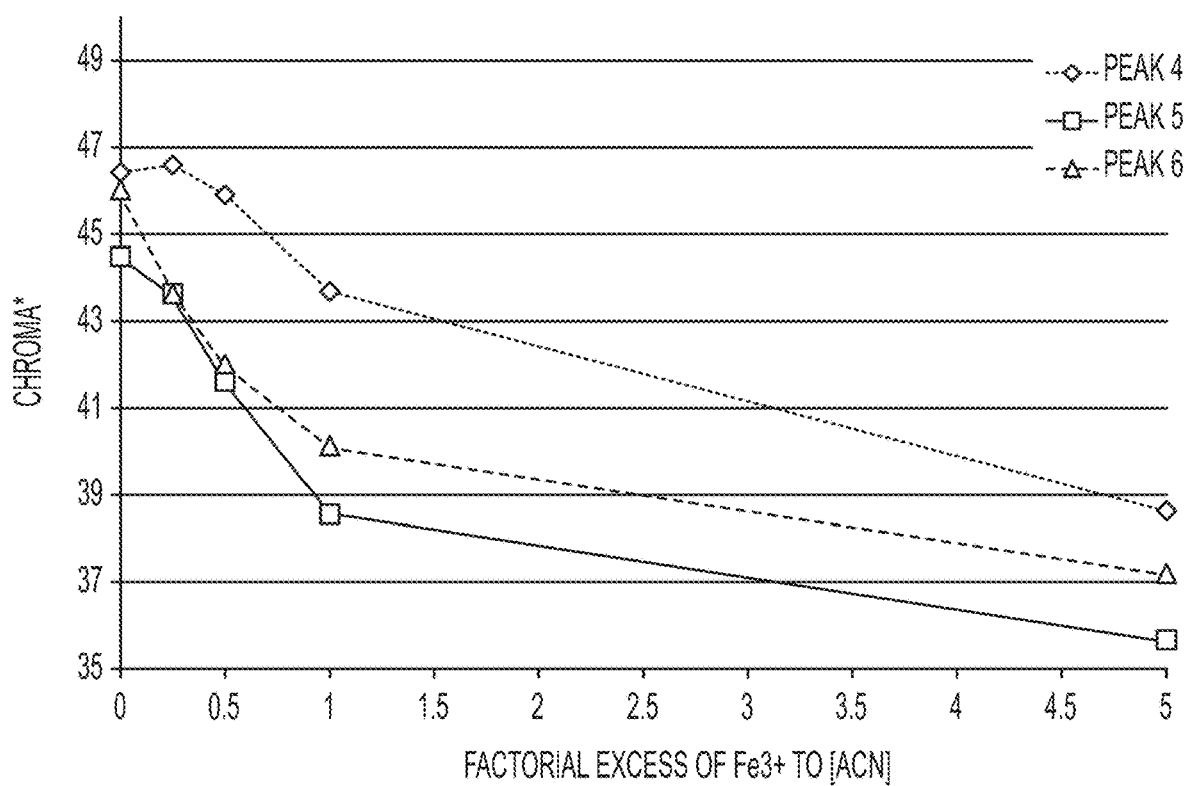

At a pH of 7 and with $Fe^{3+}$, Peak 4 had a greater chroma than Peak 5, which had a greater hue angle than Peak 6 (FIG. 29B). With $Al^{3+}$, the chroma of Peaks 5 and 6 were substantially similar (FIG. 29A). At a pH of 8 and with either $Al^{3+}$ or $Fe^{3+}$, Peak 4 had a greater chroma than Peak 6, which had a greater chroma than Peak 5 (FIGS. 30A-30B).

Bathochromic Response.

Tables 10 and 11 below provide the $\lambda_{max}$ of Peaks 4-6 at various pH levels, as well as the bathchromic shifts, when chelated with $Al^{3+}$ and $Fe^{3+}$, respectively. $\lambda_{max}$ (control) is the $\lambda_{max}$ of Peaks 4-6 at these pH levels when they have not been chelated with a metal ion. At a pH of 7, the bathochromic shift was greatest for Peak 5. At a pH of 8 and with $Al^{3+}$, the bathochromic shift was greatest for Peak 4. Moreover, samples with $Fe^{3+}$ generally had a greater bathochromic shift that those with $Al^{3+}$.

TABLE 10

($Al^{3+}$ chelates)

| pH | Peak | $\lambda_{max}$ (control) | $\lambda_{max}$ (treated) | Bathochromic Shift (nm) | [ACN]:[$Al^{3+}$] |
|---|---|---|---|---|---|
| 6 | 4 | 555.3 | 617.0 | 61.7 | 1:0.25 |
| 7 | 4 | 625.0 | 625.0 | 0.0 | 1:0.25 |
| 7 | 5 | 623.0 | 624.0 | 1.0 | 1:5 |
| 7 | 6 | 618.7 | 619.0 | 0.3 | 1:1 |
| 8 | 4 | 612.7 | 627.0 | 14.3 | 1:0.5 |
| 8 | 5 | 623.0 | 625.0 | 2.0 | 1:5 |
| 8 | 6 | 620.7 | 622.3 | 1.6 | 1:5 |

TABLE 11

($Fe^{3+}$ chelates)

| pH | Peak | $\lambda_{max}$ (control) | $\lambda_{max}$ (treated) | Bathochromic Shift (nm) | [ACN]:[$Fe^{3+}$] |
|---|---|---|---|---|---|
| 6 | 4 | 555.3 | 640.3 | 85.0 | 1:0.5 |
| 7 | 4 | 625.0 | 629.3 | 4.3 | 1:0.5 |
| 7 | 5 | 623.0 | 635.7 | 12.7 | 1:0.5 |
| 7 | 6 | 618.7 | 629.0 | 10.3 | 1:1 |
| 8 | 4 | 612.7 | 627.0 | 14.3 | 1:0.5 |
| 8 | 5 | 623.0 | 640.7 | 17.7 | 1:1 |
| 8 | 6 | 620.7 | 636.3 | 15.6 | 1:1 |

Hyperchromic Response.

Tables 12 and 13 below show the hyperchromic shift, as measured by the percentage increase in absorption, at a pH of 7 and 8, respectively. Peak 4 generally had a greater hyperchromic shift than Peaks 5 or 6. Moreover, samples with $Fe^{3+}$ generally had a greater hyperchromic shift that those with $Al^{3+}$.

TABLE 12

(pH of 7)

| | $Al^{3+}$ Chelates | | | $Fe^{3+}$ Chelates | | |
|---|---|---|---|---|---|---|
| ACN:M+ | Peak 4 | Peak 5 | Peak 6 | Peak 4 | Peak 5 | Peak 6 |
| 1:0.25 | 8.9 | −3.2 | 2.8 | 2.2 | −7.2 | −6.1 |
| 1:0.5 | 8.9 | −2.3 | 3.3 | 0.9 | −7.0 | −5.5 |
| 1:1 | 6.9 | −2.8 | 4.2 | 0.1 | −15.4 | −7.1 |
| 1:5 | 5.7 | −1.9 | 3.0 | −6.7 | −9.6 | −6.8 |

TABLE 13

(pH of 8)

| | $Al^{3+}$ Chelates | | | $Fe^{3+}$ Chelates | | |
|---|---|---|---|---|---|---|
| ACN:M+ | Peak 4 | Peak 5 | Peak 6 | Peak 4 | Peak 5 | Peak 6 |
| 1:0.25 | 4.6 | −0.3 | −0.2 | −3.8 | −3.6 | −9.2 |
| 1:0.5 | 5.0 | −1.4 | 0.6 | −1.1 | −7.2 | −12.7 |
| 1:1 | 3.0 | −2.9 | −0.2 | −3.7 | −9.2 | −14.7 |
| 1:5 | −3.0 | −3.6 | −2.1 | −8.5 | −13.0 | −19.8 |

Figure 31A:
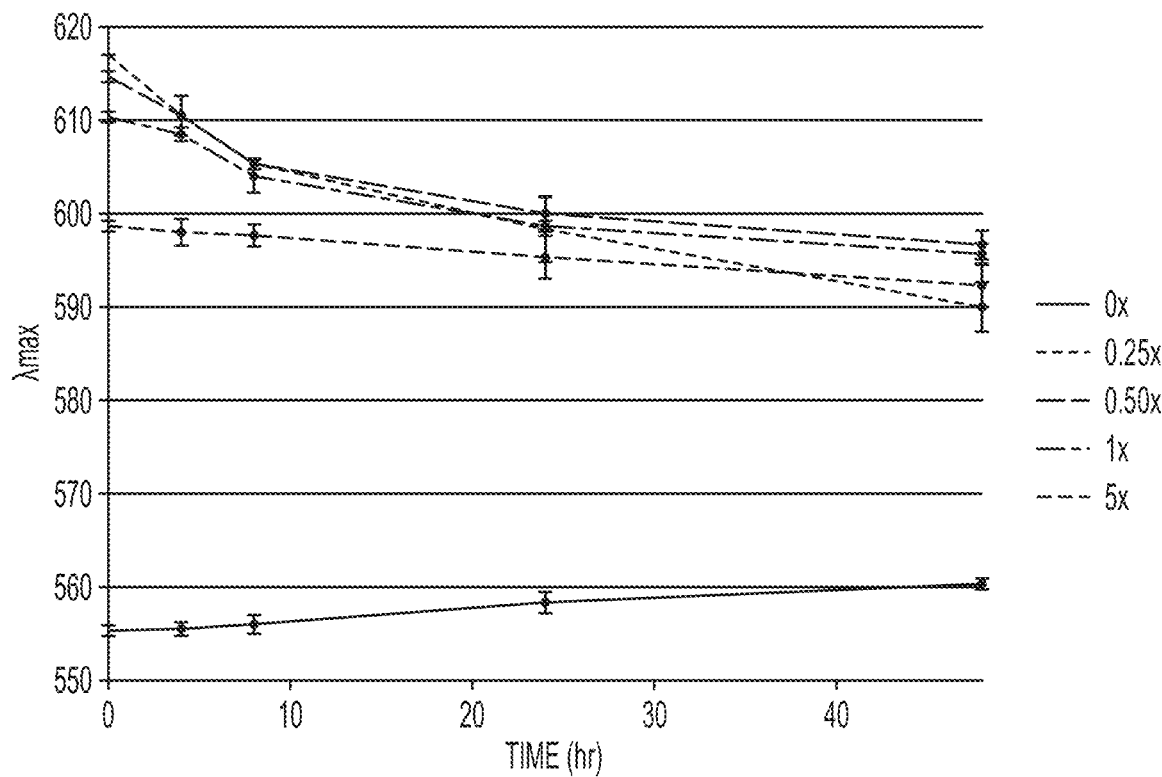
FIGS. 31A-31B depict $\lambda_{max}$ of Peak 4 at metal ion concentrations from zero to 5 times the anthocyanin concentration and a pH of 6 over 48 hours of storage.
Figure 31B:
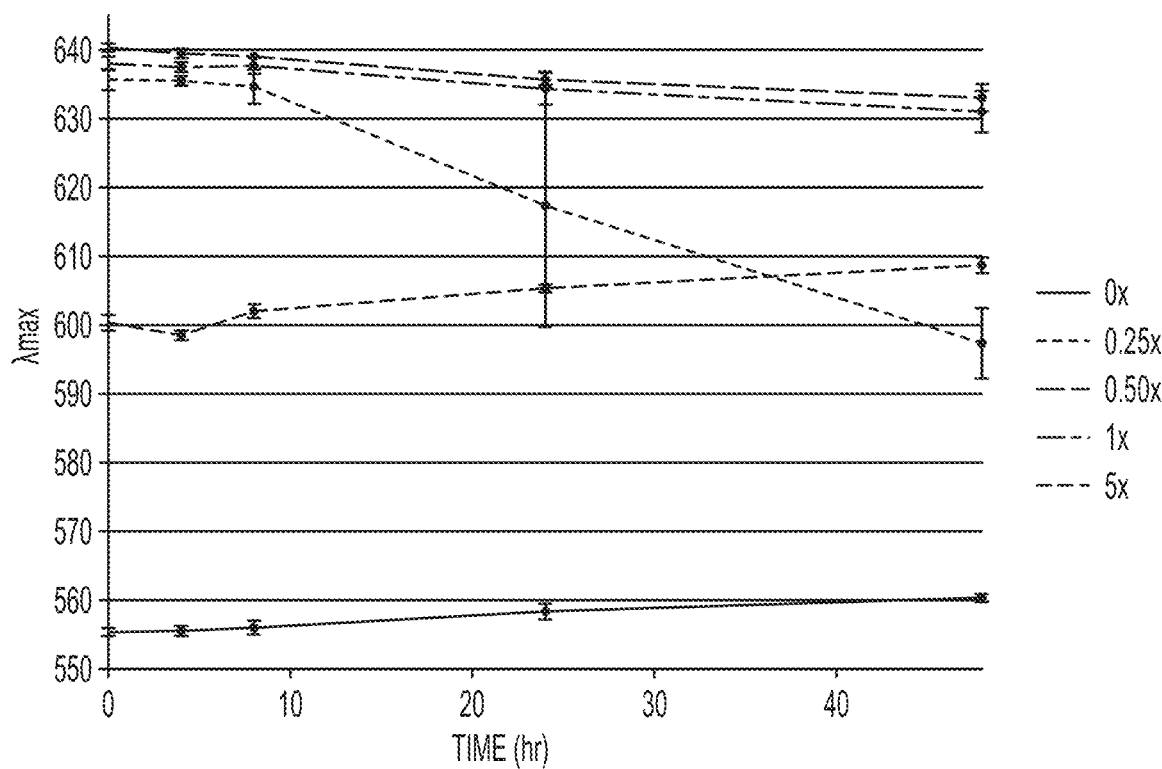
Figure 32A:
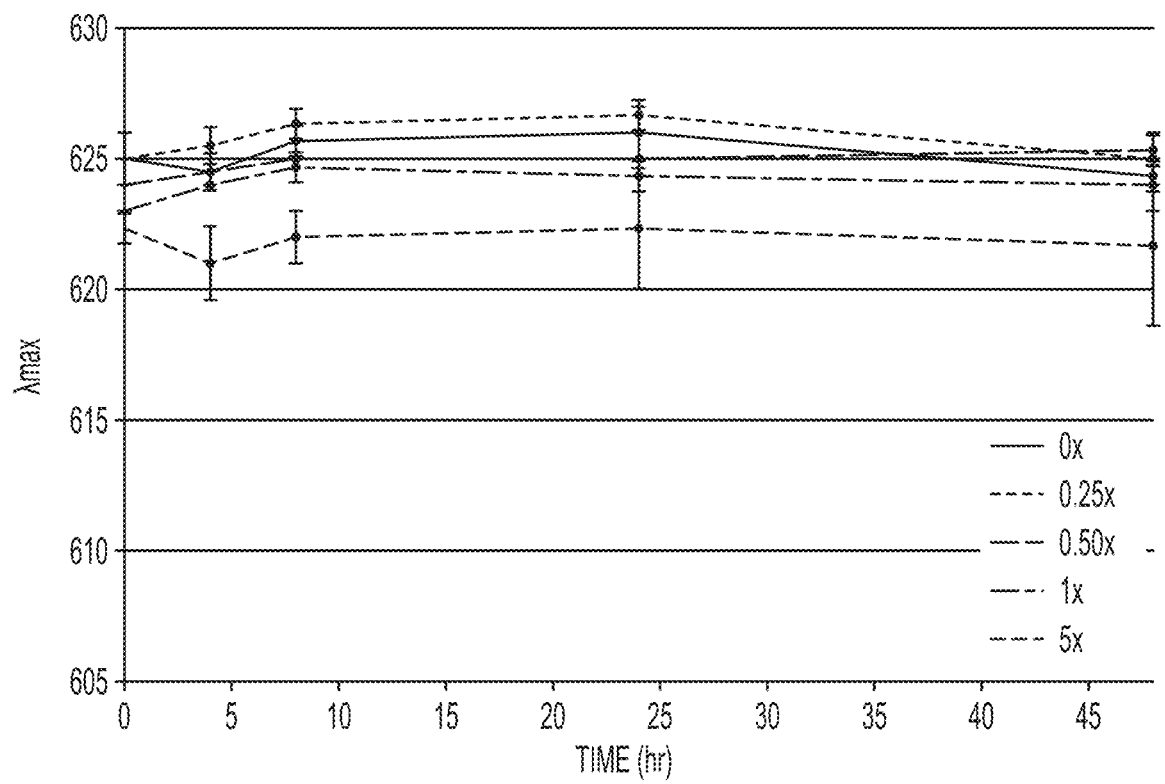
FIGS. 32A-32F depict $\lambda_{max}$ of Peaks 4, 5, and 6 at metal ion concentrations from zero to 5 times the anthocyanin concentration and at a pH of 7 over 48 hours of storage.
Figure 32B:
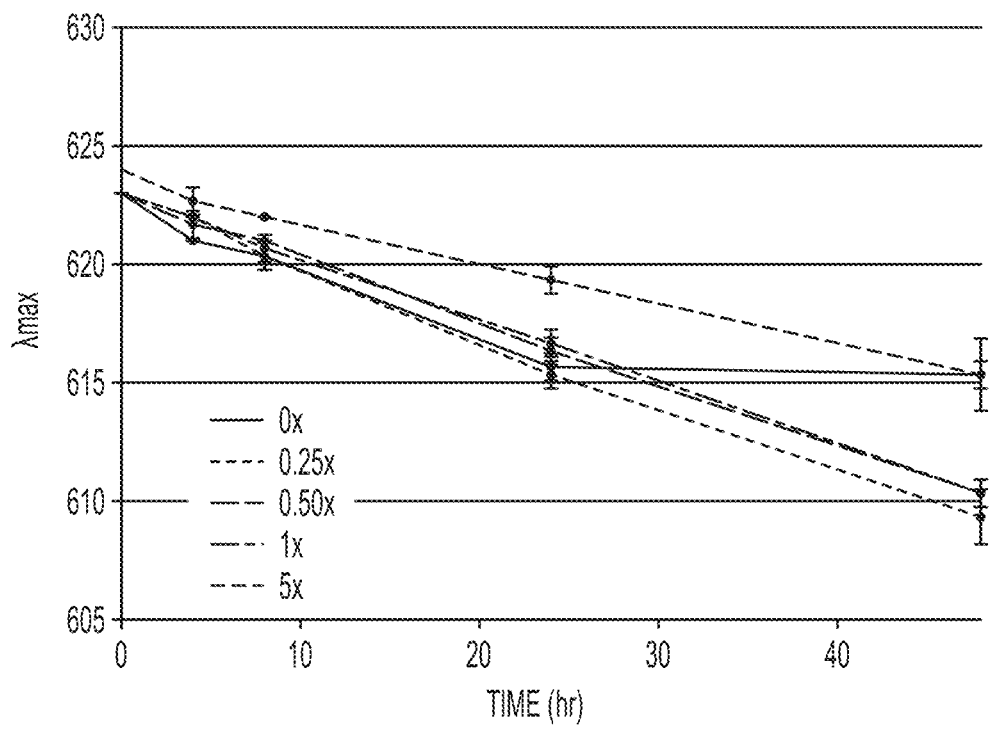
Figure 32C:
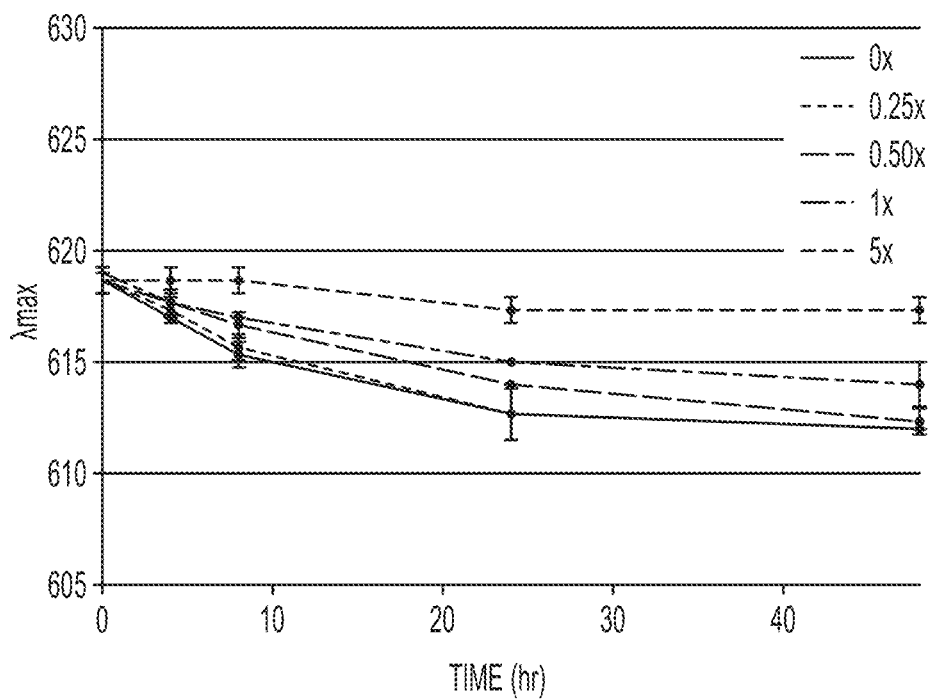
Figure 32D:
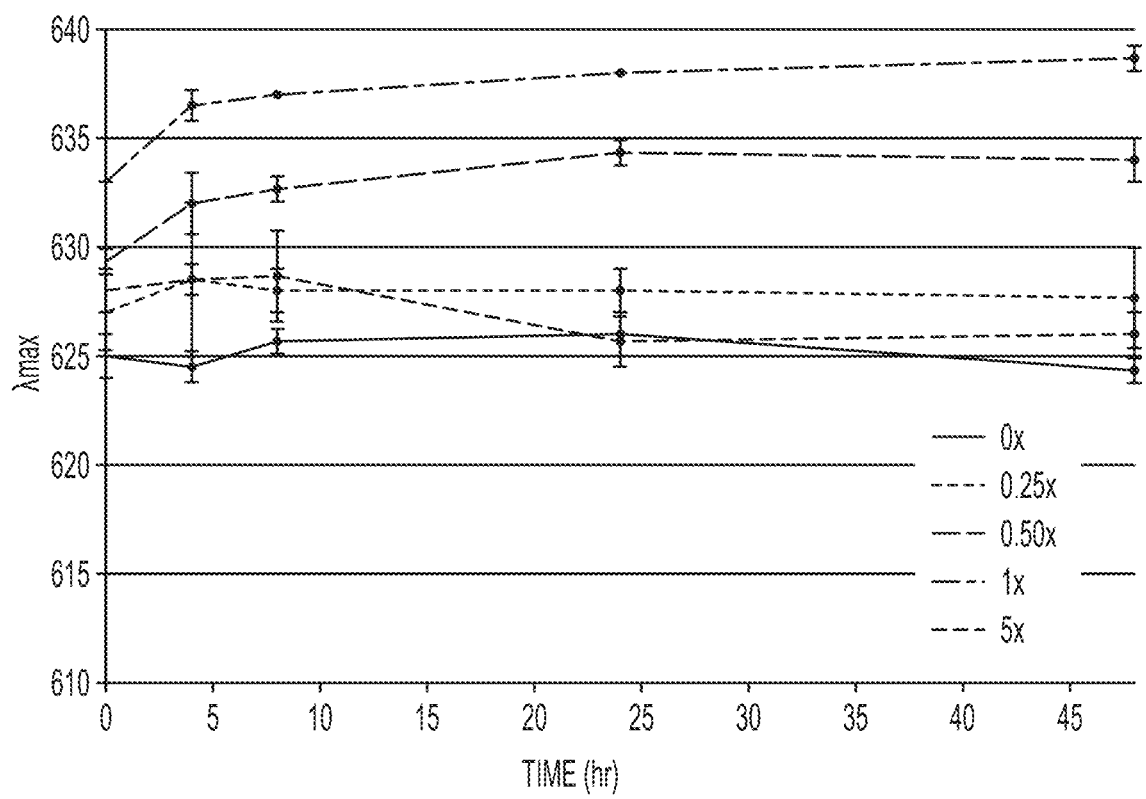
Figure 32E:
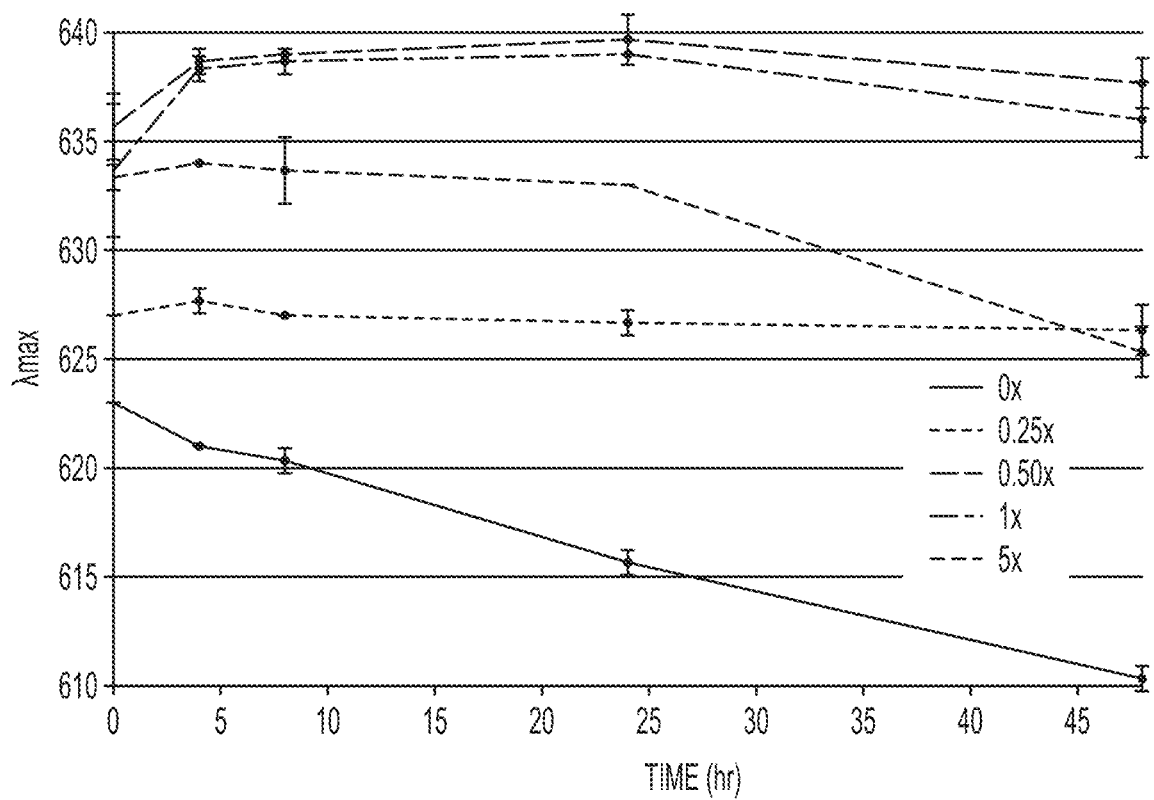
Figure 32F:
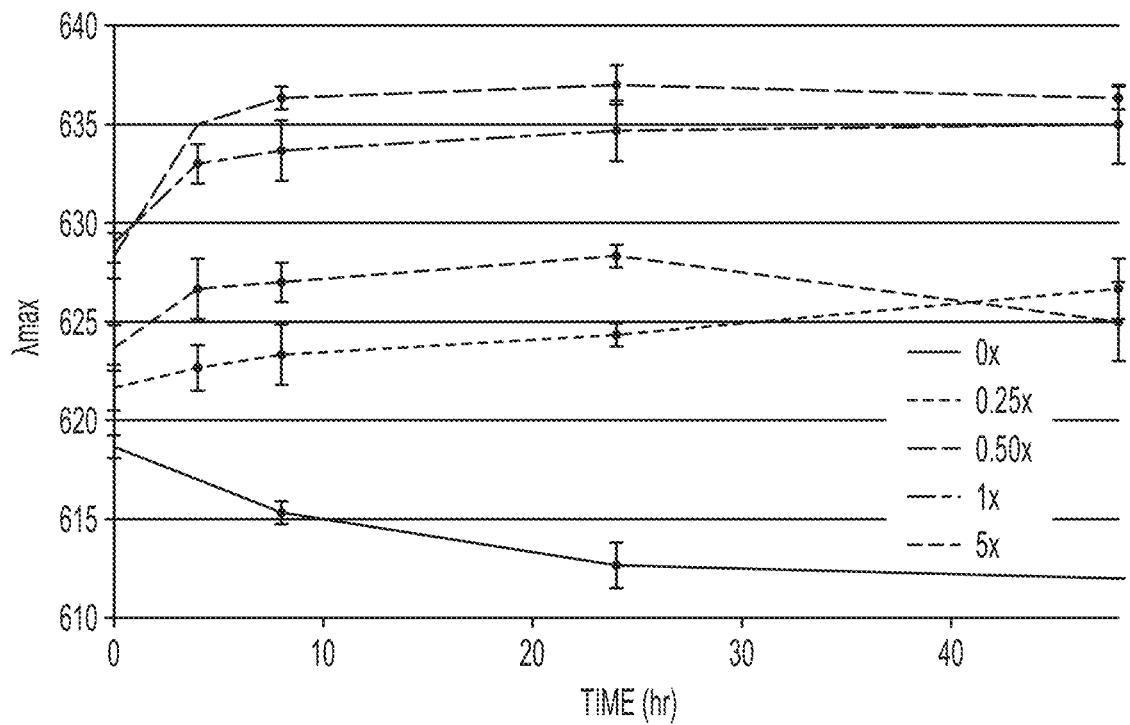
Figure 33A:
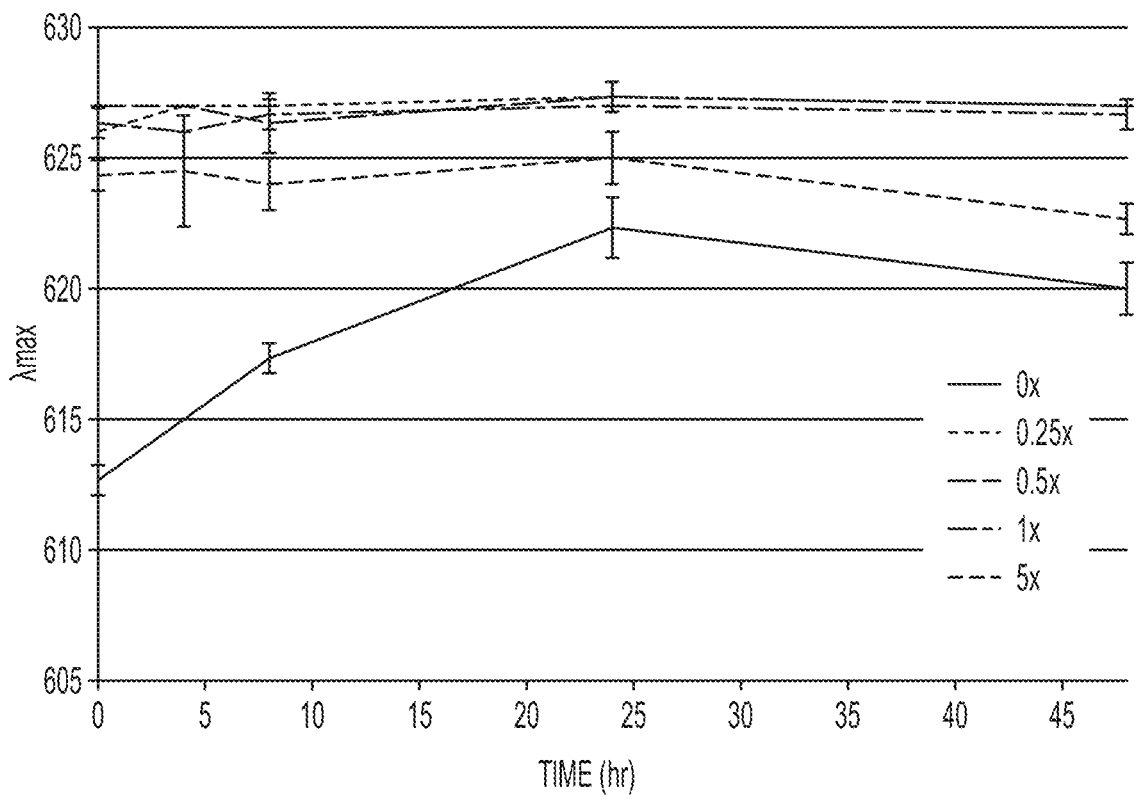
FIGS. 33A-33F depict $\lambda_{max}$ of Peaks 4, 5, and 6 at metal ion concentrations from zero to 5 times the anthocyanin concentration and at a pH of 8 over 48 hours of storage.
Figure 33B:
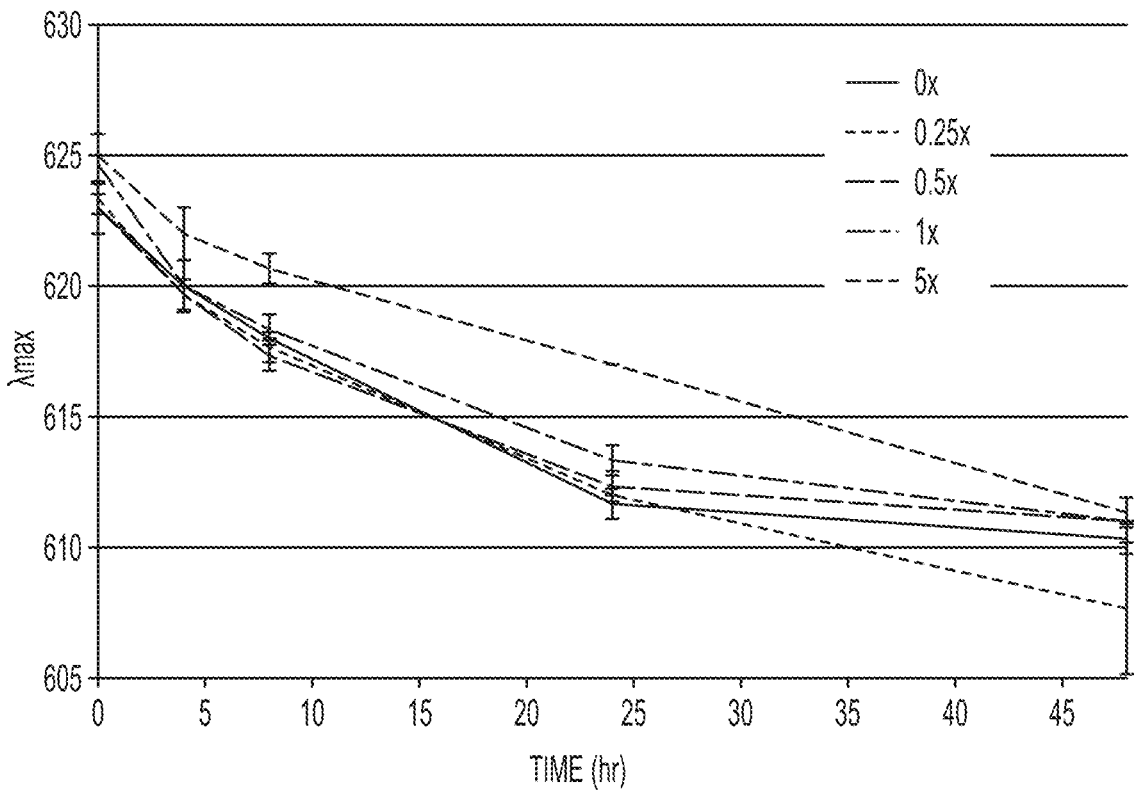
Figure 33C:
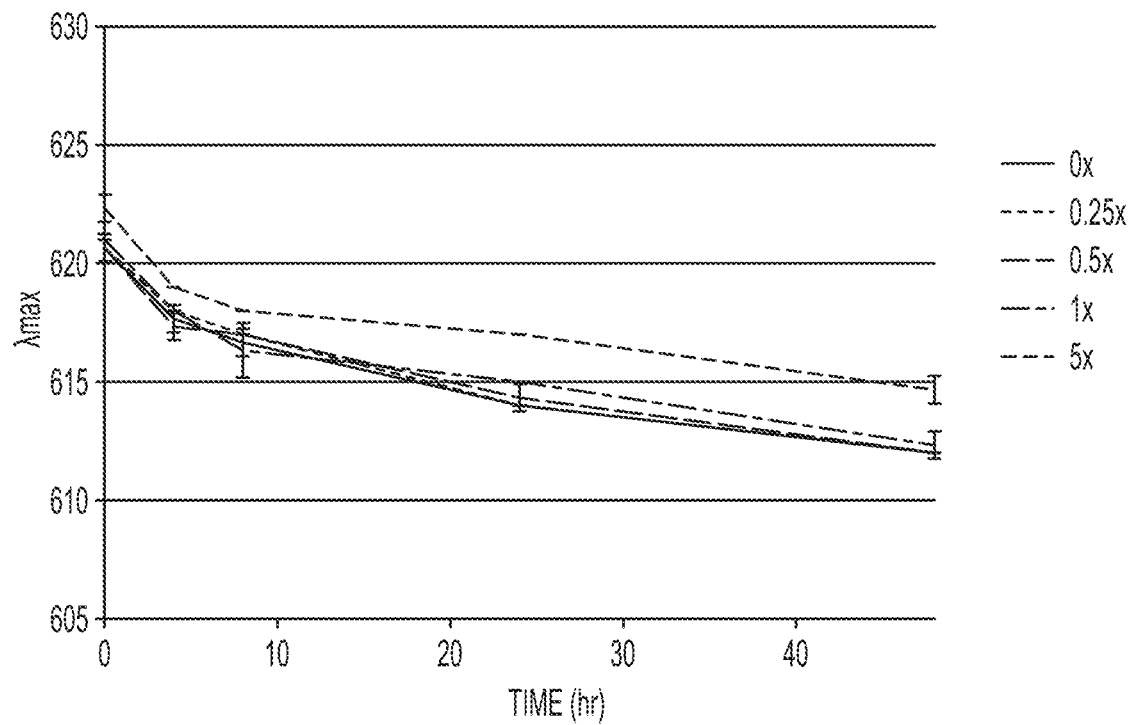
Figure 33D:
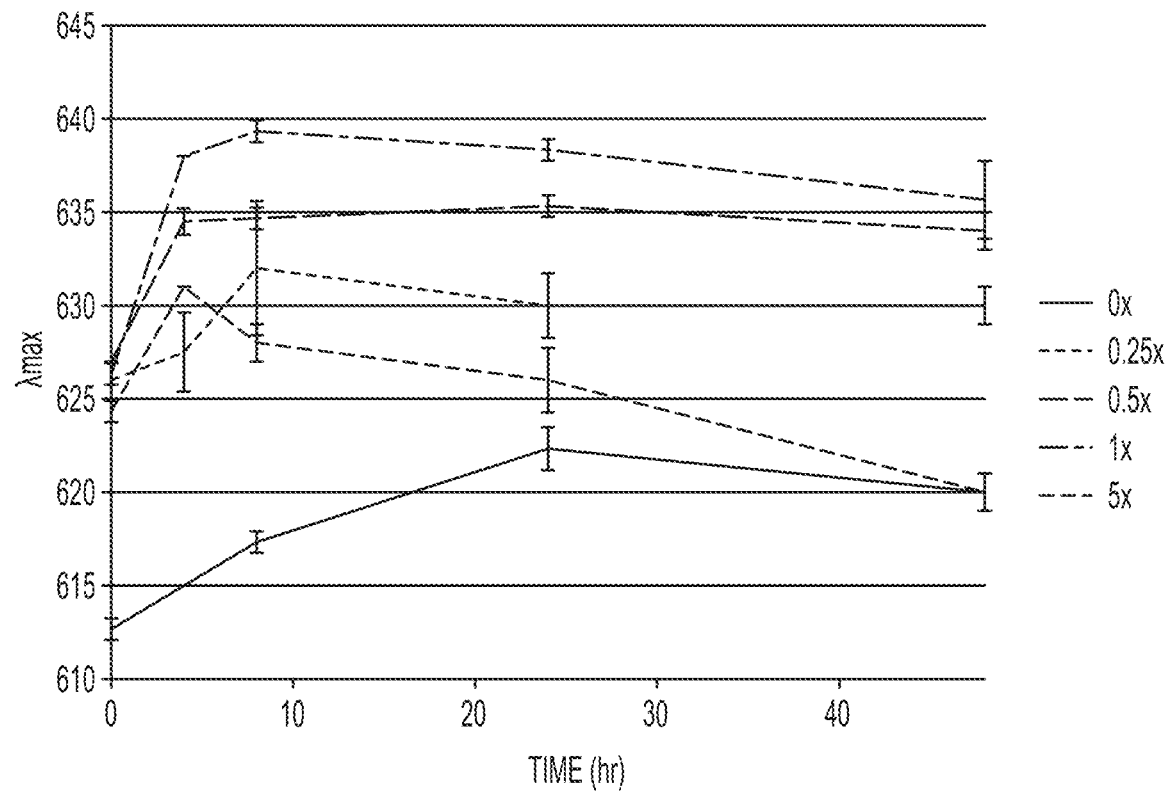
Figure 33E:
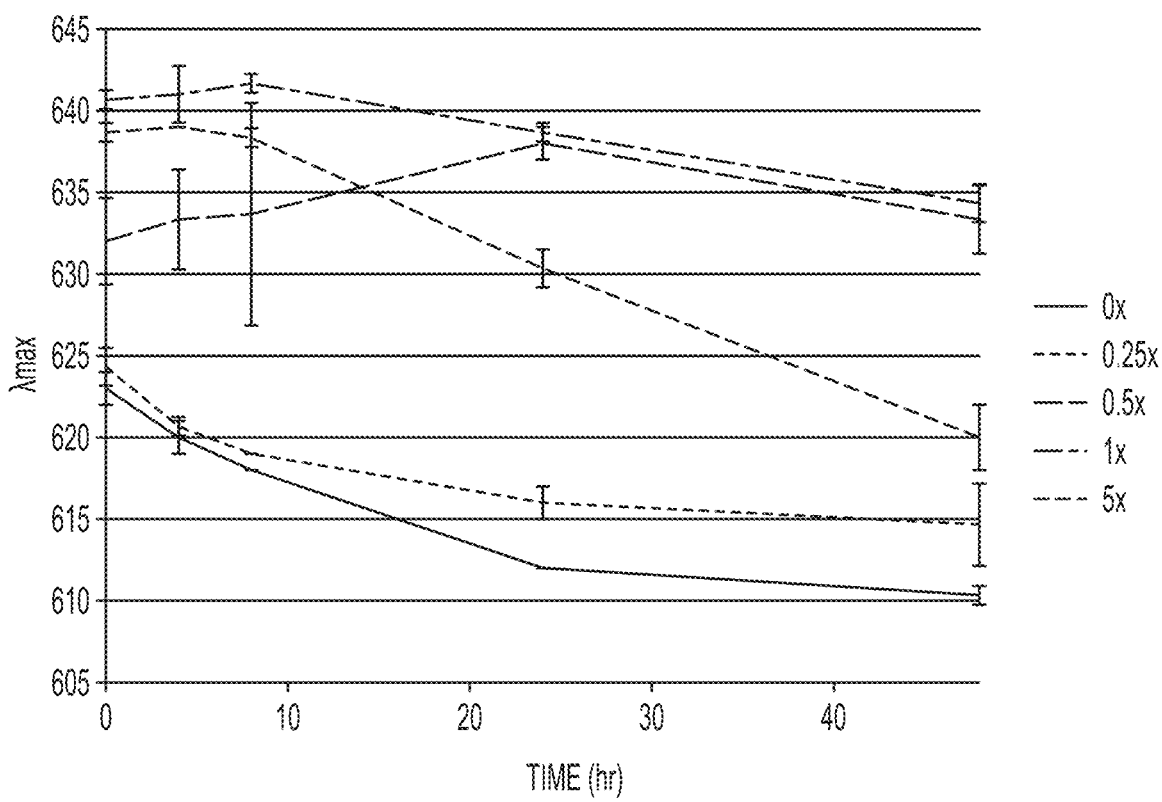
Figure 33F:
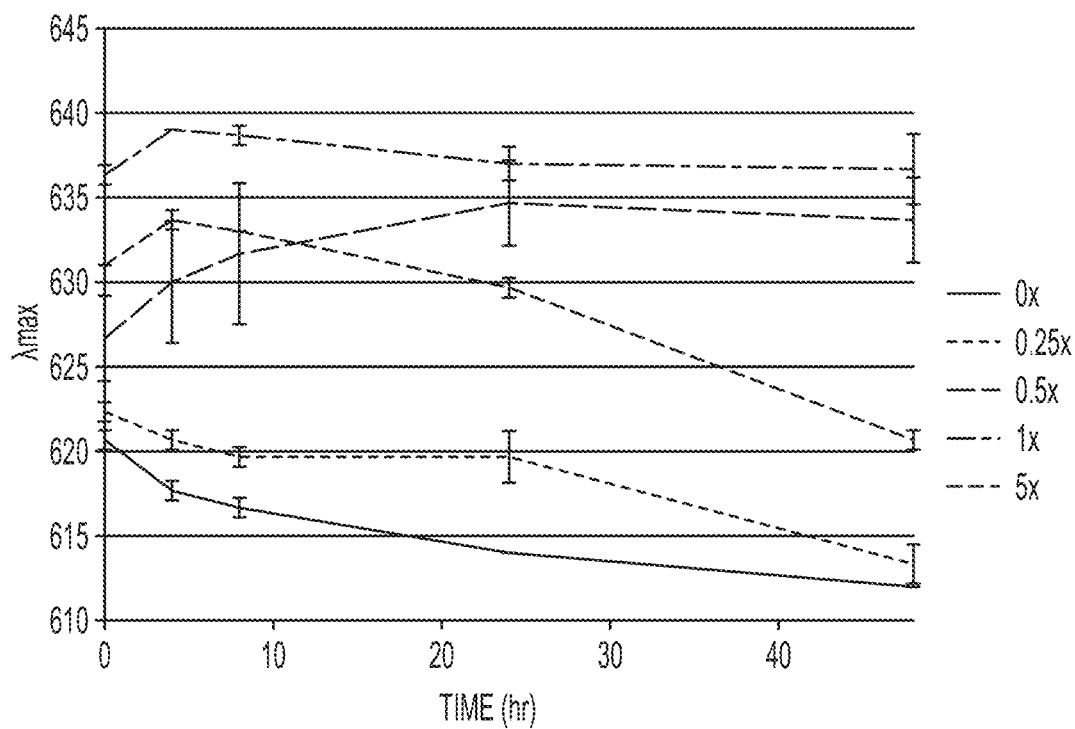

Stability. The color stability of the samples was observed over 48 hours. For Peak 4 at a pH of 6, $\lambda_{max}$ decreased over the time period for both $Al^{3+}$ and $Fe^{3+}$ chelates (FIGS. 31A-31B). Additionally, stability was observed for Peaks 4, 5, and 6 at a pH of 7 for both $Al^{3+}$ and $Fe^{3+}$ chelates (FIGS. 32A-32F). Peak 4 generally had the best stability (i.e., least decrease in $\lambda_{max}$), followed by Peak 6 and Peak 5 with both metal ions. Similarly, at a pH of 8, Peak 4 also generally had the best stability (FIGS. 33A-33F).

CONCLUSION

Metallo-anthocyanin complexes with isolated diacylated anthocyanins can provide natural blue colorant compositions having desirable color characteristics and color stability.

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods or steps.

Patents, patent applications publications product descriptions, and protocols are cited throughout, the disclosures of which are incorporated herein by reference in their entireties for all purposes.

What is claimed is:

1. A natural blue colorant composition, comprising:
a) a selectively isolated fraction of a natural juice or extract comprising at least one diacylated anthocyanin;
b) a buffer solution, wherein the buffer solution has a pH of from about 6.0 to about 8.0; and
c) a metal ion or salt thereof,
wherein the metal ion or salt thereof has a concentration of from about 0.25 to less than 0.5 times the concentration of the diacylated anthocyanin.

2. The natural blue colorant composition of claim 1, wherein the diacylated anthocyanin comprises a compound selected from the group consisting of

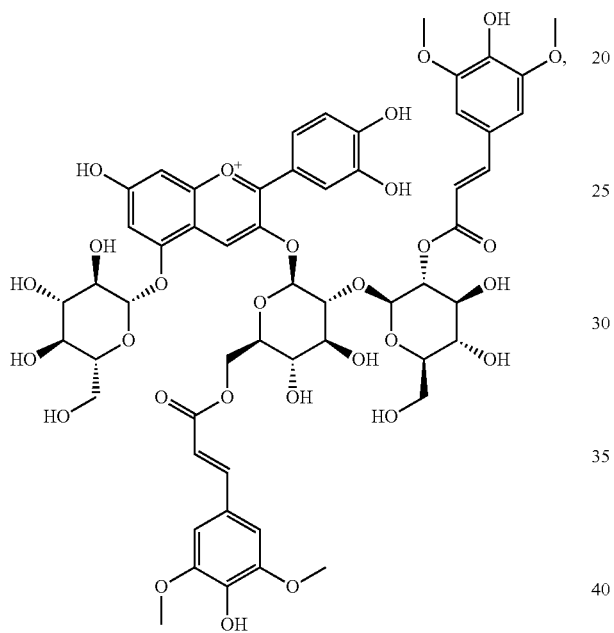

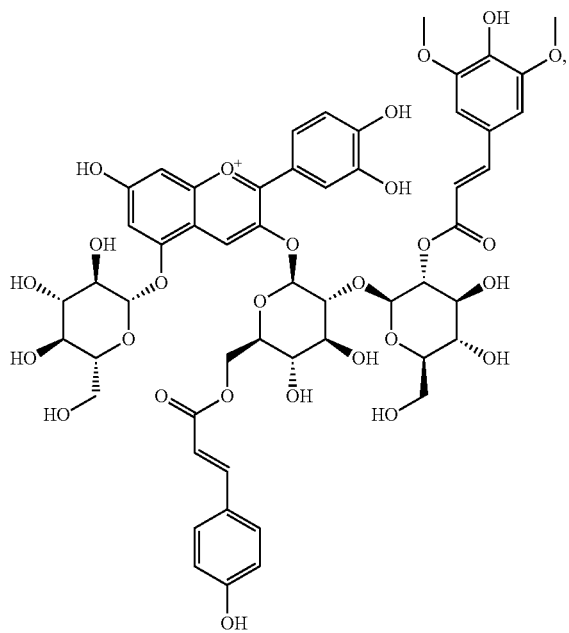 [SMILES: COc1cc(/C=C/C(=O)OC[C@H]2O[C@@H](Oc3cc4c(O[C@@H]5O[C@H](CO)[C@@H](O)[C@H](O)[C@H]5O)cc(O)cc4[o+]c3-c3ccc(O)c(O)c3)[C@H](O[C@@H]3O[C@H](CO)[C@@H](O)[C@H](O)[C@H]3OC(=O)/C=C/c3cc(OC)c(O)c(OC)c3)[C@@H](O)[C@@H]2O)ccc1O]

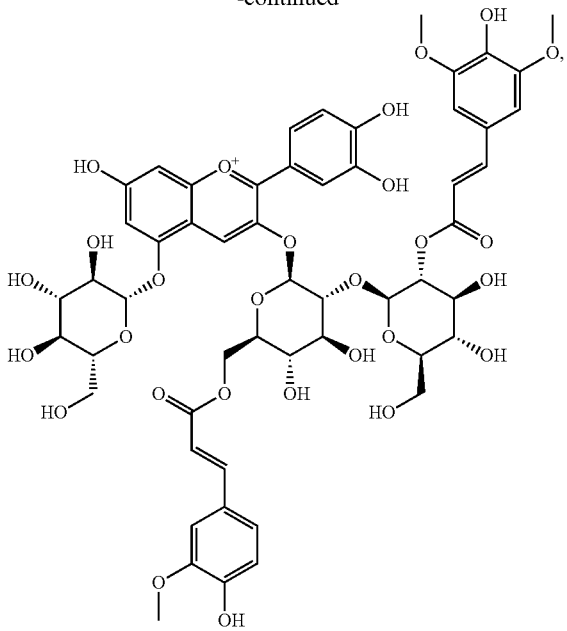

and salt forms thereof, and combinations thereof.

3. The natural blue colorant composition of claim 1, wherein the metal ion is a trivalent metal ion.

4. The natural blue colorant composition of claim 3, wherein the trivalent metal ion is selected from the group consisting of a $Fe^{3+}$, $Al^{3+}$, $Ga^{3+}$, and combinations thereof.

5. The natural blue colorant composition of claim 3, wherein the trivalent metal ion is $Fe^{3+}$, $Al^{3+}$, or a combination thereof.

6. The natural blue colorant composition of claim 1, wherein the pH is from about 7.0 to about 8.0.

7. The natural blue colorant composition of claim 1, wherein the diacylated anthocyanin has a concentration of from about 1 µM to about 200 µM.

8. The natural blue colorant composition of claim 1, wherein the buffer solution comprises a buffer selected from the group consisting of potassium phosphate, tris(hydroxymethyl)-aminomethane, sodium hydroxide, and combinations thereof.

9. The natural blue colorant composition of claim 1, wherein the natural blue colorant composition provides a color having a ΔE value of about 12 or less when compared to a color defined by L*a*b* values of 50 ppm and 100 ppm FD&C Blue No. 1 in an aqueous solution.

10. The natural blue colorant composition of claim 9, wherein the ΔE value is about 11 or less.

11. The natural blue colorant composition of claim 1, wherein the natural blue colorant composition exhibits color stability for greater than about 14 days.

12. The natural blue colorant composition of claim 1, wherein the fraction is obtained from a natural product, or an extract or juice thereof, selected from the group consisting of red cabbage, purple sweet potato, red potato, blue potato, red radish, black carrot, purple carrot, purple corn, red corn, red onion, purple broccoli, red broccoli, purple cauliflower, rhubarb, black bean, red leaf lettuce, black rice, eggplant, strawberry, raspberry, cranberry, lingonberry, red grape, apple, black currant, red currant, cherry, blueberry, elderberry, bilberry, crowberry, blackberry, chokeberry, gooseberry, acai, nectarine, peach, plum, blood orange, blue tomato, "Heavenly Blue" Morning Glory flower petal, "Better Times" Rose flower petal, and combinations thereof.

13. The natural blue colorant composition of claim 12, wherein the fraction is obtained from red cabbage.

14. A green colorant composition, comprising the natural blue colorant composition of claim 1 and one or more yellow colorants.

15. The green colorant composition of claim 14, wherein the yellow colorant is a natural yellow colorant.

16. A food product, comprising the natural blue colorant composition of claim 1.

17. The food product of claim 16, wherein the food product is a confectionary product.

18. The confectionary product of claim 17, further comprising a yellow colorant.

19. The confectionary product of claim 17, wherein the natural blue colorant composition is present in a coating applied to a surface of the confectionary product.

20. A natural blue colorant composition, comprising:
  a) a fraction of a natural juice or extract comprising at least one diacylated anthocyanin selected from the group consisting of

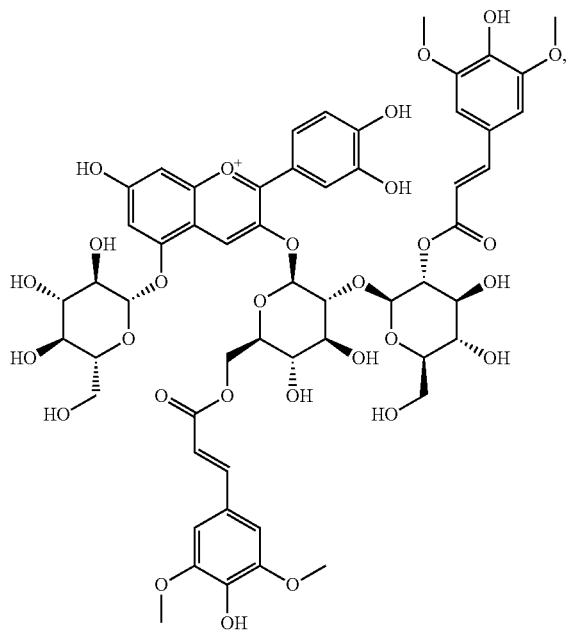 [SMILES: COc1cc(/C=C/C(=O)OC[C@H]2O[C@@H](Oc3cc4c(O[C@@H]5O[C@H](CO)[C@@H](O)[C@H](O)[C@H]5O)cc(O)cc4[o+]c3-c3ccc(O)c(O)c3)[C@H](O[C@@H]3O[C@H](CO)[C@@H](O)[C@H](O)[C@H]3OC(=O)/C=C/c3cc(OC)c(O)c(OC)c3)[C@@H](O)[C@@H]2O)ccc1O]

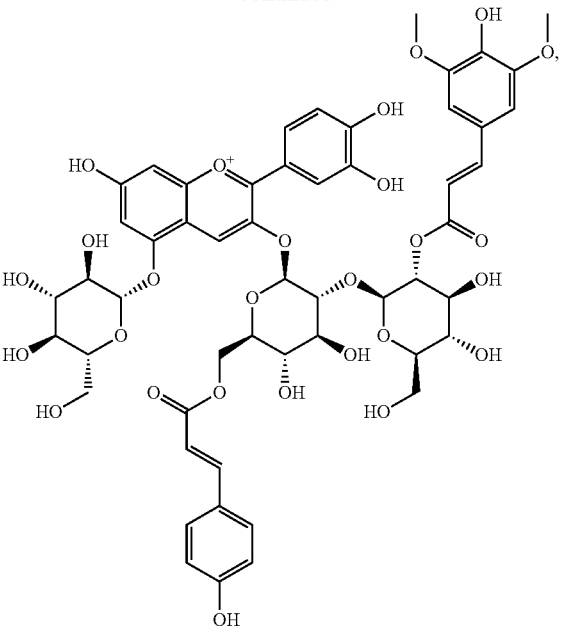 [SMILES: COc1cc(/C=C/C(=O)OC[C@H]2O[C@@H](Oc3cc4c(O[C@@H]5O[C@H](CO)[C@@H](O)[C@H](O)[C@H]5O)cc(O)cc4[o+]c3-c3ccc(O)c(O)c3)[C@H](O[C@@H]3O[C@H](CO)[C@@H](O)[C@H](O)[C@H]3OC(=O)/C=C/c3cc(OC)c(O)c(OC)c3)[C@@H](O)[C@@H]2O)ccc1O]

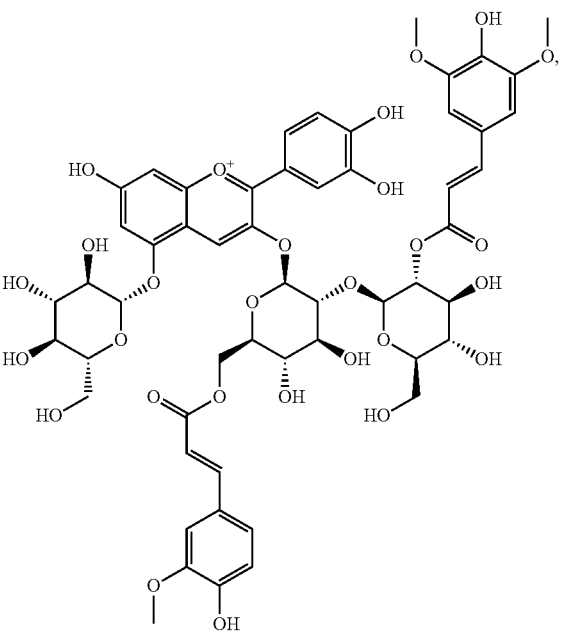 [SMILES: COc1cc(/C=C/C(=O)OC[C@H]2O[C@@H](Oc3cc4c(O[C@@H]5O[C@H](CO)[C@@H](O)[C@H](O)[C@H]5O)cc(O)cc4[o+]c3-c3ccc(O)c(O)c3)[C@H](O[C@@H]3O[C@H](CO)[C@@H](O)[C@H](O)[C@H]3OC(=O)/C=C/c3cc(OC)c(O)c(OC)c3)[C@@H](O)[C@@H]2O)ccc1O]

and salt forms thereof, and combinations thereof, wherein the diacylated anthocyanin has a concentration of from about 1 µM to about 200 µM;
  b) a buffer solution, wherein the buffer solution has a pH of from about 7.0 to about 8.0; and
  c) a metal ion comprising $Fe^{3+}$ or a salt form thereof, wherein the metal ion has a concentration of from about 0.25 to about 0.5 times the concentration of the diacylated anthocyanin.

21. A natural blue colorant composition, comprising:
  a) a fraction of a natural juice or extract comprising at least one diacylated anthocyanin selected from the group consisting of

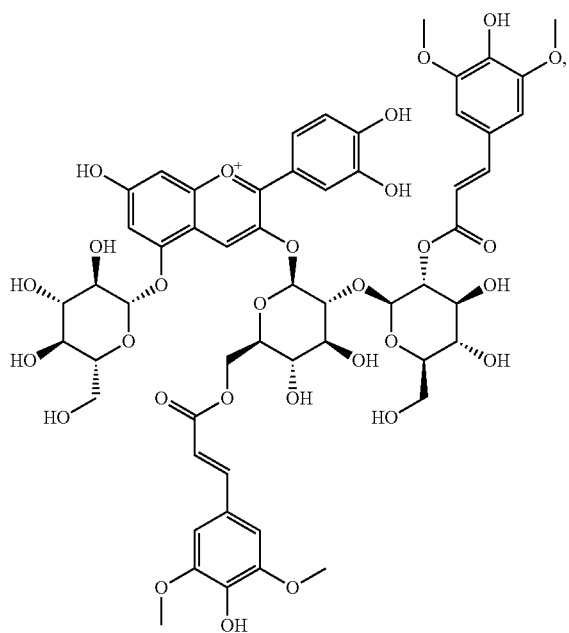

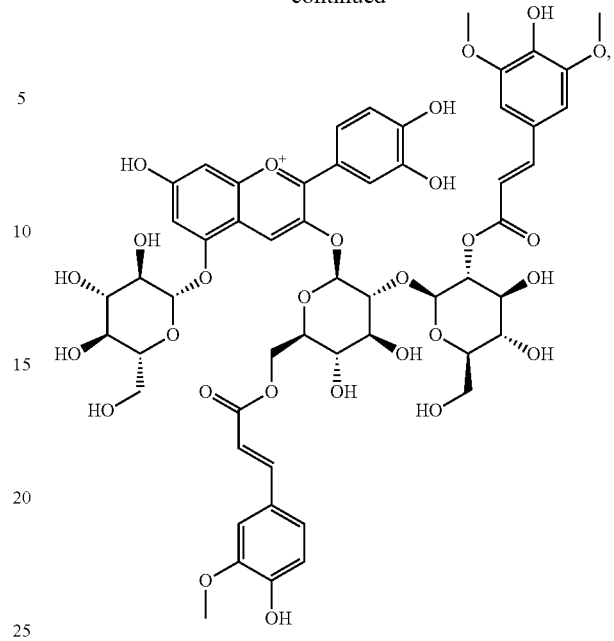

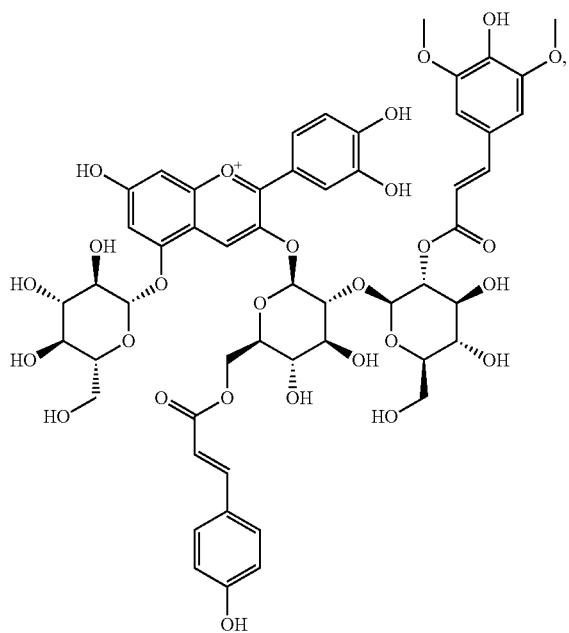

and salt forms thereof, and combinations thereof, wherein the diacylated anthocyanin has a concentration of from about 1 μM to about 200 μM;

b) a buffer solution, wherein the buffer solution has a pH of from about 7.0 to about 8.0; and c) a metal ion comprising $Al^{3+}$ or a salt form thereof, wherein the metal ion has a concentration of less than or equal to the concentration of the diacylated anthocyanin.

22. A method of preparing a natural blue colorant composition, comprising:

a) obtaining a fraction of a natural juice or extract comprising at least one diacylated anthocyanin from a natural product;

b) diluting the diacylated anthocyanin in a buffer solution having a pH of from about 6.0 to about 8.0; and c) admixing a metal ion or salt thereof in the buffer solution, wherein the metal ion or salt thereof has a concentration of from about 0.25 to about 0.5 times the concentration of the acylated anthocyanin.

23. The method of claim 22, wherein the diacylated anthocyanin comprises a compound selected from the group consisting of

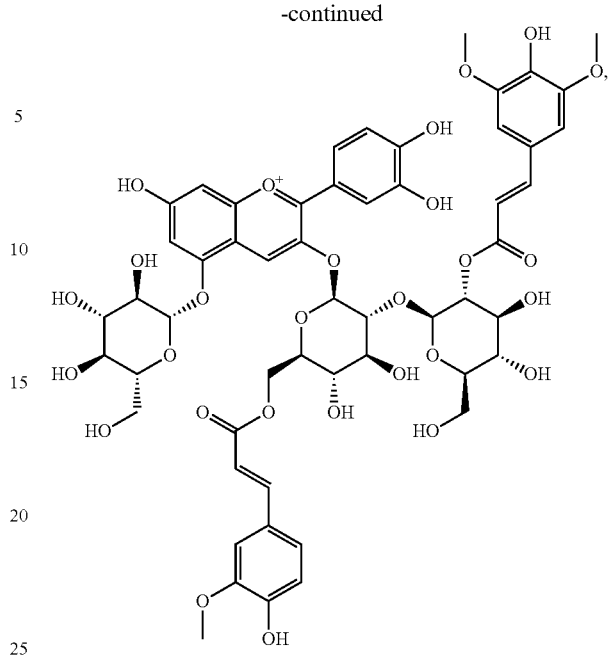

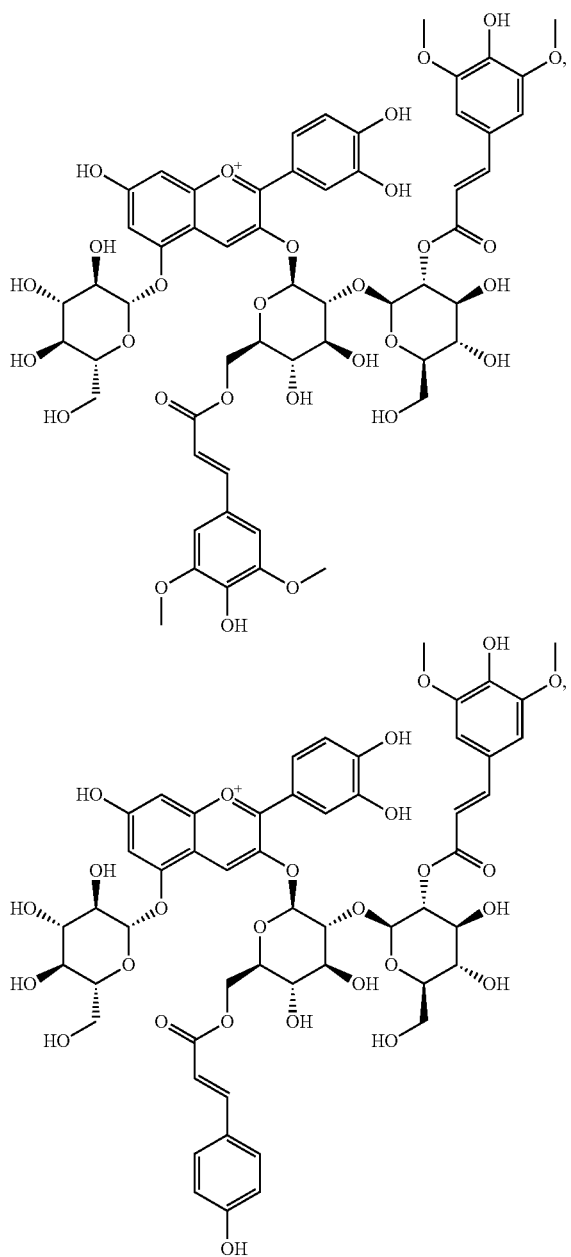

and combinations thereof.

24. The method of claim 22, wherein the natural product comprises red cabbage.

25. The method of claim 22, wherein the buffer solution has a pH of from about 7.0 to about 8.0.

26. The method of claim 22, wherein the metal ion or salt thereof comprises $Fe^{3+}$, $Al^{3+}$, or a combination thereof.

27. The method of claim 22, wherein the acylated anthocyanin has a concentration of from about 1 μM to about 200 μM.

28. The method of claim 27, wherein the metal ion or salt thereof has a concentration of less than about 10 times the concentration of the acylated anthocyanin.

29. The method of claim 28, wherein the metal ion or salt thereof has a concentration of less than or equal to the concentration of the acylated anthocyanin.

* * * * *